United States Patent [19]

Laggis et al.

[11] Patent Number: 5,109,515
[45] Date of Patent: Apr. 28, 1992

[54] USER AND APPLICATION PROGRAM TRANSPARENT RESOURCE SHARING MULTIPLE COMPUTER INTERFACE ARCHITECTURE WITH KERNEL PROCESS LEVEL TRANSFER OF USER REQUESTED SERVICES

[75] Inventors: George E. Laggis, Naperville; Paul F. Meyer, Wheaton, both of Ill.

[73] Assignee: AT&T Bell Laboratories, Murray Hill, N.J.

[21] Appl. No.: 101,391

[22] Filed: Sep. 28, 1987

[51] Int. Cl.⁵ ............................................. G06F 15/16
[52] U.S. Cl. ................................... 395/725; 364/280; 364/280.6; 364/284; 364/281.3; 364/DIG. 1
[58] Field of Search ... 364/200 MS File, 900 MS File; 340/825.31, 825.3, 825.5

[56] References Cited

U.S. PATENT DOCUMENTS

| | | | |
|---|---|---|---|
| 4,004,277 | 1/1977 | Gouvil | 364/200 |
| 4,274,139 | 6/1981 | Hodgkinson et al. | 364/200 |
| 4,333,144 | 6/1982 | Whiteside et al. | 364/200 |
| 4,363,094 | 12/1982 | Kaul et al. | 364/200 |
| 4,511,759 | 4/1985 | Irlande | 178/2 R |
| 4,530,051 | 7/1985 | Johnson | 364/200 |
| 4,547,880 | 10/1985 | DeVita | 370/91 |
| 4,575,793 | 3/1986 | Morel | 364/200 |
| 4,577,272 | 3/1986 | Ballew | 364/200 |
| 4,586,134 | 4/1986 | Norstedt | 364/200 |
| 4,591,982 | 5/1986 | Buonomo | 364/200 |
| 4,604,686 | 8/1986 | Reiter et al. | 364/200 |
| 4,604,694 | 8/1986 | Hough | 364/200 |
| 4,608,663 | 8/1986 | Gordon | 364/900 |
| 4,633,245 | 12/1986 | Blount et al. | 340/825.03 |
| 4,635,189 | 1/1987 | Kendall | 364/200 |
| 4,646,235 | 2/1987 | Hirosawa et al. | 364/200 |
| 4,660,168 | 4/1987 | Grant | 364/900 |
| 4,677,588 | 6/1987 | Benjamin et al. | 364/900 |
| 4,742,447 | 5/1988 | Duvall | 364/200 |
| 4,754,395 | 6/1988 | Weisshaar | 364/200 |
| 4,780,821 | 10/1988 | Crossley | 364/200 |
| 4,811,216 | 3/1989 | Bishop | 364/200 |
| 4,819,159 | 4/1989 | Shipley | 364/200 |
| 4,825,354 | 4/1989 | Agrowol et al. | 364/200 |
| 4,835,674 | 5/1989 | Collins et al. | 364/200 |
| 4,849,877 | 7/1989 | Bishop | 364/200 |
| 4,868,738 | 9/1989 | Kish | 364/200 |
| 4,882,674 | 11/1989 | Quint | 364/900 |
| 4,901,231 | 2/1990 | Bishop | 364/200 |

OTHER PUBLICATIONS

The Integrator, Mini Micro Systems by Michael Durr (Novell Advanced Netware) Jan. 1985 pp. 117-120.

(List continued on next page.)

*Primary Examiner*—Thomas C. Lee
*Assistant Examiner*—Eric Coleman
*Attorney, Agent, or Firm*—David Volejnicek

[57] ABSTRACT

A computer network (FIG. 1) comprises a plurality of personal computers (PCs 10), groups of which are each logically connected to a different one of a plurality of intermediate computers (11). At least one of the intermediate computers is connected to a mainframe computer (12). File and resource serving and locking services are provided transparently to PC user programs (200). Certain user service requests ("open file" and "exit" calls) on each PC to the PC operating systems means (20,22) are trapped by an operating system kernel-level patch (21), and corresponding requests are sent to a kernel-level driver (31) on the associated intermediate computer. The driver collects requests from all PCs associated with the intermediate computer and funnels them to a user level request server (32) on the intermediate computer. The request server performs requested file and resource serving and locking services in an effort to make requested files or resources available on or through the intermediate computer to the PC's operating system. The request server calls upon a NETSVR process (33) to find requested files and resources on other intermediate computers and to transfer requested files to its intermediate computer. The request server calls upon an APISVR process (34) to obtain requested files unavilable on intermediate computers (11) from a database (13) of the mainframe computer. The request server returns notices of its successor failure to the patch through the driver. In response to the notices, the patch forwards the trapped user requests to the PC operating system to service the requests. The PC operating system views and uses the associated intermediate computer as a peripheral device to satsify user file or resource requests.

10 Claims, 32 Drawing Sheets

OTHER PUBLICATIONS

M. J. Bach, The Design of the UNIX® Operating system Prentice Hall 1986 pp. 312—329, 413-433.

P. Jackson, "UNIX Variant Opens a Path to Managing Multiprocessor Systems", *Electronics*, Jul. 28, 1983, pp. 118-124.

R. A Yost et al. "R*: A Distributed Data Sharing System", *Distributed Systems, vol. II: Distributed Data Base Systems*, W. W. Chu (ed.), Artech House, Inc. (1986), pp. 462-476.

D. D. Clark et al., "Design of Distributed Systems Supporting Local Autonomy", *Digest of Papers, VLSI: New Architectural Horizons, Compcon 80*, San Francisco, California, (Feb. 25-28, 1980), pp. 438-444.

M. A. Bach, *The Design of the UNIX® Operating System*, Prenctice-Hall, Inc., 1986, pp. 412-433.

"PC networks build on wide range of approaches", *Computer Design*, vol. 23, No. 14 (12-1984), pp. 184, 186.

"Method to Establish a Network Connection Dynamically", *IBM Technical Disclosure Bulletin*, vol. 29, No. 2 (7-1986), pp. 892-900.

A New Era in PC and Mainframe Connection, Clark Information Technologies product description brochure.

NetCommander/The Sub—LAN: A Simple Network Solution For Departmental Computing, Digital Products, Inc. product brochure.

Print Director/The Ultimate In Printer Sharing, Digital Products, Inc. product brochure.

URUS TM . . . The New Dimension in PC-Mainframe Enabling Technology, Clark Information Technologies Corp. product flyer.

PLAN Series TM Local Area Networks for Personal Computers, Nestar Systems, Inc. product description brochure, 1987.

Gateway—3287, Digital Products, Inc. product description flyer.

Mandatory Requirements for Successful Sharing of Laser Printers, Digital Porducts, Inc. Product Bulletin, vol. 2, No. 2.

The AT&T Starlan Network, AT&T product description brochure.

AT&T Escort Connectivity Software, AT&T product overview flyer.

"AT&T Escort TM Software Lets PC Drive Mainframe", AT&T Technical Report, Mar./Apr. 1987.

PC Interface AT&T Personal Computer 6300 User's Guide, AT&T, 1985.

PC Interface AT&T 3B2/300 Administrator's Guide, AT&T, 1984.

M. J. Bach, The Design of the UNIX® Operating System, Prectice-Hall, Inc., 1986, pp. 312-329.

USER AND APPLICATION PROGRAM TRANSPARENT RESOURCE SHARING MULTIPLE COMPUTER INTERFACE ARCHITECTURE WITH KERNEL PROCESS LEVEL TRANSFER OF USER REQUESTED SERVICES

This application is submitted with a microfiche appendix consisting of two (2) microfiches and 175 frames.

TECHNICAL FIELD

The invention relates to computers in general, and particularly relates to interfacing of computers within a network.

BACKGROUND OF THE INVENTION

It is the function of a computer's operating system to provide services to users, that is, to application-level programs. Often, however, the operating system of a computer is limited in the type of services it can provide. For example, many small, "personal" computer (PC) operating systems are unable to provide users with services that are not available directly on the PC itself. An example of such services are networking services such as resource sharing.

Conventionally, it has sometimes been possible to make such locally-unavailable services available to PC users, by means of one of two approaches.

One approach requires the user to dictate to the operating system particular step that it must undertake to obtain those services. This approach requires that the user program be aware of the environment of the PC, and the interfaces to that environment, so that is may provide the necessary dictates to the operating system. A significant disadvantage thereof is that the user program ceases to be portable, but must be changed each time the environment and interfaces change, to account for those changes. Another significant disadvantage is that the user is now effectively responsible for providing its own services—yet relieving the user of this responsibility is the purpose of having an operating system in the first place!

The second approach involves connecting to the operating system an "adjunct" that is capable of providing some of these locally-unavailable services, and which receives user request for locally-unavailable services and satisfies them instead of the operating system. That is, with respect to the unavailable services, the adjunct acts as a separate operating system from the user's viewpoint. However, it is a disadvantage of this approach that known adjuncts have typically required that users be aware of their existence and interact with them separately, and perhaps differently, from the operating system, thus placing at least some of the same burdens on users as does the first-described approach. Another disadvantage is that the adjunct replaces the operating system for purpose of providing the locally-unavailable services, and hence must duplicate significant portions of the functionality of the operating system—a condition that is wasteful of generally-scarce PC memory space. A further disadvantage of this approach is that known adjuncts are limited in the types of services they can provide: for example, one known adjunct is capable of providing only printer services that are available locally on a single computer that is directly connected to the PC.

The last-mentioned disadvantage is serious because it does not allow the PCs to take advantage of networking. Interconnection of computers into networks has many advantages. It allows users of individual computers to communicate with each other, and also allows individual computers to provide specialized resources and capabilities that can be shared in use by other computers.

The providing of networking capabilities in just any manner would not be a panacea, however! Particularly, interfacing of PCs with large, "mainframe", computers is typically detrimental to the performance of both. PCs are typically dedicated to a single user, and hence tend to have a fast user response, while mainframes tends to have high processing power and speed. But interfacing of numerous PCs to a mainframe computer generally slows down the PCs' response time due to the conflicts, and consequent waiting periods, experienced by PCs in contending for input and output (I/O) access to a limited number of mainframe I/O ports. Likewise, interfacing of numerous PCs to a mainframe computer generally slows down the mainframe's processing power, because of the processing power and time consumed by I/O transfers demanded by the PCs.

This problem is typically not solved by merely providing a windowing environment to users, because a human user must still interact with both the mainframe and a PC in order to decide which of the two machines he or she must interact with in order to obtain needed resources. A further disadvantage of requiring a user—human or program—to interact with both a PC and a mainframe computer is that the user must know not only how to interact with the mainframe, but also how to do so indirectly through the PC.

SUMMARY OF THE INVENTION

This invention is directed to solving the problems and disadvantages of the prior art. According to the invention, in an apparatus that includes an operating system means (illustratively the MS-DOS ® operating system plus the PC Interface) for providing services to users such as application programs, there is provided an arrangement which is distinct from the operating system means and which (a) traps a user request for a service directed to the operating system means, (b) ensures accessibility of the service to the operating system means, significantly without intervention of the user, and then (c) passes the trapped request to the operating system means. The operating system means may then respond to the request in a conventional manner and satisfy it.

Because the arrangement ensures accessibility of requested services to the operating system means, procuring availability of the services to the means if they are not available, it enables the operating system means to provide services that the means were not designed to provide, and thereby extends the repertoire of services available to users. Illustrative services of this nature are networking services such as resource and file sharing and locking services.

Because the arrangement undertakes its actions without user intervention, requested services are provided to users transparently, that is, without the user needing to be aware of the intervention of the arrangement in the providing of requested services, without changing the operating environment of the user, and without any different kind of action being required of the user than the kind of action required to obtain services that the operating system means are designed to provide and are capable of providing without intervention of the arrangement.

Because the arrangement does not provide the requested services to the user directly, but merely enables the operating system means to provide the services, the arrangement does not change the operating environment of the user and avoids duplicating functionality of, the operating system means. Rather, the arrangement merely supplements the functionality of the operating system means.

Illustratively, the arrangement has a first computer (illustratively a personal computer) that includes the operating system means, and a second computer (illustratively a UNIX ® operating system-based computer) that is communicatively connected to the first computer. First means (illustratively a patch in the operating system of the first computer) trap a program's request to the operating system means for service and notify the second computer of the request, without intervention of the requesting program. Second means (illustratively a device driver, and a request server, and individual serving process in the second computer) respond to receipt of the notice by ensuring accessibility of the service to the operating system means, also without intervention of the requesting program, and then notify the first means of the accessibility. The first means in turn respond to receipt of the notice by passing the trapped request to the operating system means.

Inclusion of only the request-trapping mechanism in the first computer results in only minimal—and consequently relatively simple and inexpensive—changes having to be made to the first computer, while it allows the bulk of the functionality and equipment—and hence complexity and cost—of the arrangement to be included in a separate computer. Then, by including in the second means an entity (illustratively the driver) which receives request notices from the first means of a plurality of computers and passes them to an accessibility-ensuring entity (illustratively the request server and the individual serving processes), and which receives notices of requested service accessibility from the accessibility-ensuring entity and passes them back to the requesting first means, advantageously it is made possible to share the principal cost and functionality of the arrangement amongst a plurality of first computers and thus to significantly lower the per-computer cost of providing this functionality.

Furthermore, the second computer illustratively comprises a plurality of computers one of which includes the second means and is communicatively connected to the others. Thus, the benefits of the arrangement are spread over a whole network of computers, and networking services may be provided thereby to users of the first computers.

According to the disclosed illustrative embodiment of the invention, there is provided an interface between PCs and a mainframe computer that buffers their interactions to both offload the PCs' I/O requests from the mainframe computer and to offload the mainframe computer from slowing down the PCs. The interface is a third tier of computers intermediate between the PCs and the mainframe computer and comprising at least one computer. The computers of the third-tier are networked to provide file and resource serving and locking services to the PCs. On behalf of the PCs, the third-tier computers download files from a mainframe-resident database, search the middle tier for the location of files requested by a PC user, move the files within the third tier to a point where requesting PC users can access them, provide access by any PC user to any resource connected at any point to the third tier, and provide exclusivity of access by a PC user to any resource or file. The file serving services avoid the need for every user to have a port into the mainframe. The resource serving services enable users to share resources. And the locking services prevent two or more users who are simultaneously attempting to use a file or resource from colliding. Significantly, the interface provides these services to the PC users transparently, that is, both human PC users and PC application programs interact only with the PC, and do so conventionally without change to their PC environment.

These and other advantages and features of the present invention will become apparent from the following description of an illustrative embodiment of the invention taken together with the drawing.

DETAILED DESCRIPTION

Figure 1:
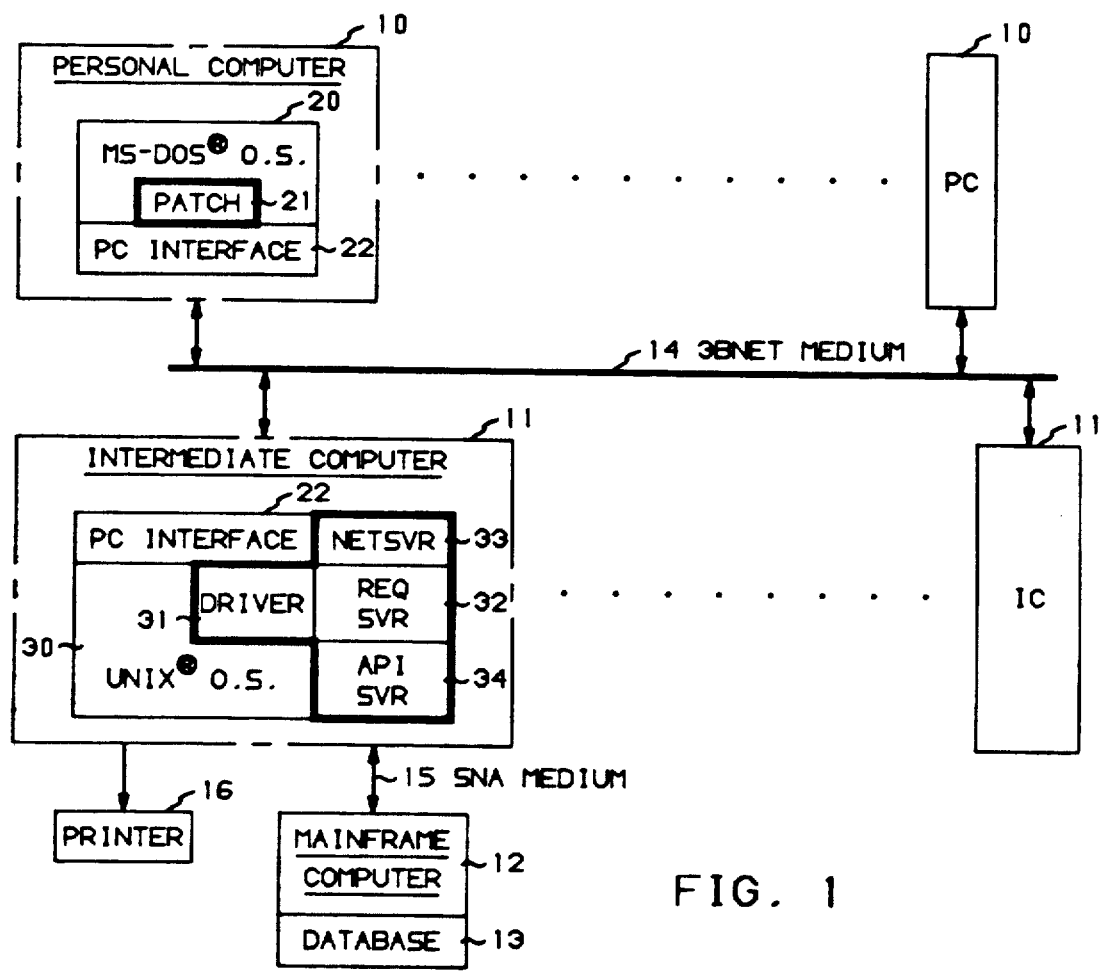
FIG. 1 is a block diagram of a system of computers including an illustrative embodiment of the invention.

General System Description (FIG. 1)

FIG. 1 shows an illustrative computer network. It comprises a multiplicity of personal computers 10, a plurality of intermediate, or "departmental server"-type computers 11, and a mainframe computer 12 that includes a database 13. The personal and the intermediate computers are interconnected by a communication medium 14 into a network. Each intermediate computer 11 is associated with a plurality of PCs 10 and serves those PCs 10. An intermediate computer 11 provides resources—such as a printer 16 or another device, or access to a communication network line—for use by its PCs 10. One or more of the intermediate computers 11 are connected to the mainframe computer 12 each by a communication medium 15.

Alternatively, the network may include a plurality of mainframe computers each connected to one or more intermediate computers.

While the above-described network may comprise any desired equipment, illustratively, PCs 10 are AT&T 6300 PCs operating under control of the MS-DOS operating system 20, intermediate computers 11 are AT&T 3B2 computers operating under control of the UNIX operating system 30, mainframe computer 12 is an IBM or IBM-compatible machine such as an IBM® System/370, network communication medium 14 is the AT&T 3BNET network, and medium 15 interconnecting an intermediate computer 11 with mainframe computer 12 is a Systems Network Architecture (SNA) link. Illustratively, a PC 10 and an intermediate computer 11 communicate with each other over the 3BNET by means of the PC Interface 22 of Locus Computing Corporation. Because PC Interface 22 operates at operating system kernel level and provides certain operating system types of services which the MS-DOS operating system 20 is unable to provide, PC Interface together with the MS-DOS operating system may be considered to constitute the operating system means of a PC 10.

Alternatively, medium 14 is the STARLAN network and interface 22 is the AT&T STARLAN client/server software.

Intermediate computers 11 provide network file and resource serving, network resource and file locking, and mainframe database services each to a plurality of PCs 1 and to each other. Database services are provided by partitioning database 13 into flat files, retrieving the files from mainframe computer 12, and distributing them among intermediate computers 11. The files may then be moved among intermediate computers 11 and accessed thereon without need for interaction with mainframe computer 12. File serving services are provided by searching all intermediate computers 11 for presence of a requested file and, when it is found, moving the file to the intermediate computer 11 that serves the requesting PC 10, so that the requesting user may access the file. The files may thus be provided to a user and be passed from user to user without user interaction with mainframe computer 12. Resource serving services are similarly provided, by searching all intermediate computers 11 for presence of a requested resource and providing a logical link between the intermediate computer 11 serving the requester and the intermediate computer 11 having the resource, so that the request may be transferred from the former to the latter computer 11 and be satisfied thereon. Resource sharing among PCs 10 is thus enabled, avoiding the need for every PC 10 to have its own resources such as a printer, a backup storage device, and a port into mainframe computer 12. Locking services are provided to limit use of a file to only one user at a time, thereby to keep two or more users from colliding.

The UNIX operating system 30 automatically provides sequential, exclusive, access to resources controlled thereby, so resource locking need not be explicitly implemented. However, in a system where exclusivity of resource access is not automatically provided, resource locking services may be provided in a manner identical to file locking services.

The principal components that provide the above services in a user-transparent manner are a PC operating system (MS-DOS) patch 21 on each PC 10, and an intermediate computer operating system (UNIX) driver 31, an application-level request server 32 and application level NETSVR 33 and APISVR 34 on each intermediate computer 11. Patch 21 intercepts user requests to operating system 20 for file and resource services and transmits them via interface 22 to its associated intermediate computer 11. Driver 31 interfaces patches 21 of a plurality of PCs 10 to request server 32. It passes requests collected from PCs 10 to request server 32, and passes request server 32 responses back to the requesting PCs 10. And request server 32 provides the requested services, calling upon application processes such as NETSVR 33 and APISVR 34 to search intermediate computer 11 for presence of requested files and resources thereon, to obtain locally-unavailable files and resources from other intermediate computers 11 and from mainframe computer 12, and to lock and unlock files and resources. Specifically, request server 32, NETSVR 33, and APISVR 34 ensure the accessibility of requested files and resources to operating system 20 and interface 22.

Figure 2:
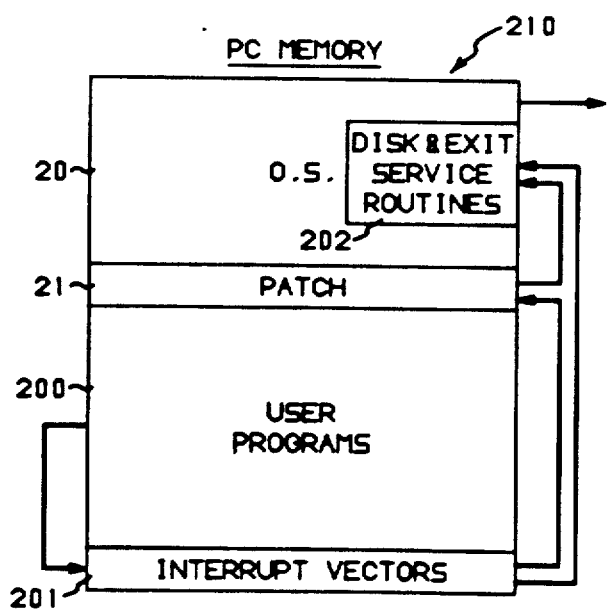
FIG. 2 is a block diagram of the memory of a personal computer of FIG. 1.
Figure 3:
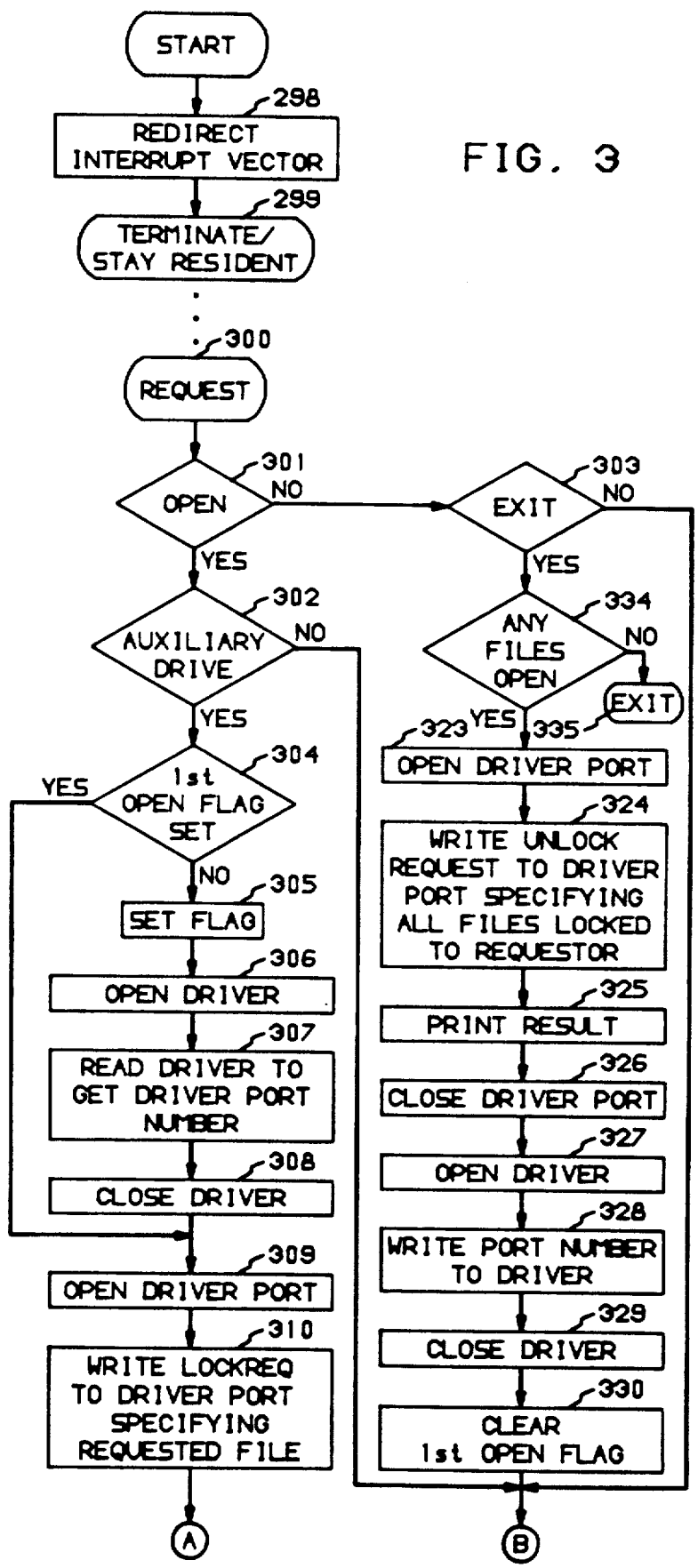
FIGS. 3-4 are a flow diagram of the patch of a personal computer of FIG. 1.
Figure 4:
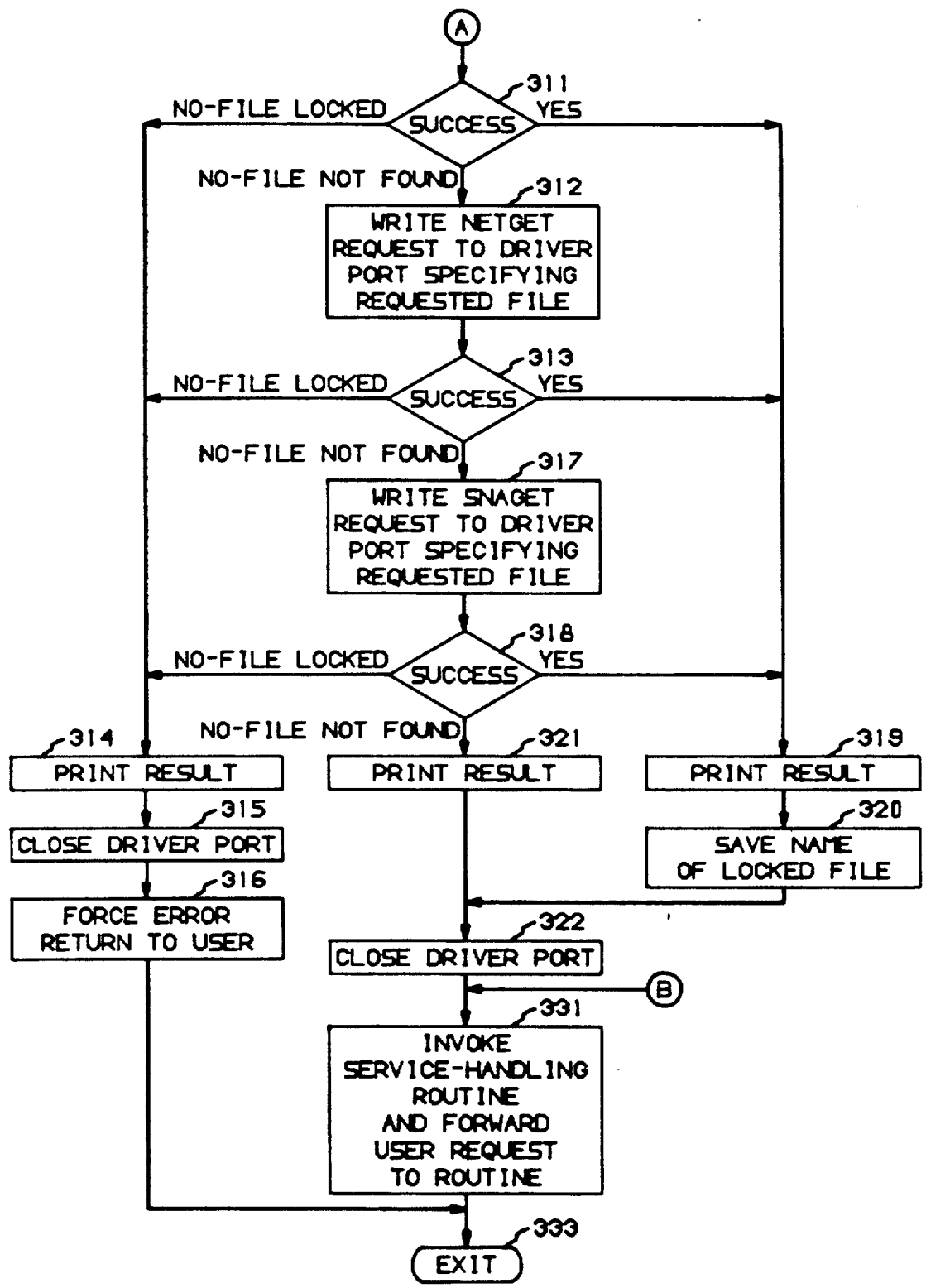

Patch (FIGS. 2-4)

Interface 22, and therethrough an intermediate computer 11, is logged into a PC 10 as an extra disk drive, in a conventional manner. Illustratively, the PC's operating system 20 views interface 22, and therethrough intermediate computer 11, as a virtual auxiliary disk drive. Consequently, as shown in FIG. 2, calls by user program 200 on PC 10 for services that are to be provided by intermediate computer 11 are mapped into the PC's operating system interrupt vectors 201 that point to exit and disk service routines 202 in operating system 20—DOS BIOS service routines in this illustrative example.

Calls for both file and resource services are thus mapped to service routines 202, because resources other than printer 16 are treated in this illustrative example as files on PCs 10. However, calls for printer services are handled on a PC 10 by PC Interface 22.

One of the above-mentioned interrupt vectors 201—the one that file (and hence also resource) "open" and "exit" calls are mapped into—is redirected at initialization to point at patch 21 instead of to the one of the PC operating system routines 202 that services these calls. Patch 21 is thus enabled to trap service requests.

Patch 21 is a PC memory 210-resident program. At PC 10 initialization, when the PC's operating system 20 is booted, it is caused through automatic execution of the DOS autoexec.bat file to load the program text of patch 21 into user memory space like any user program 200. Turning to FIG. 3, initial execution of patch 21, initiated by the DOS autoexec.bat file, causes operating system 20 to redirect the "open" and "exit" call vector 201 to point to patch 21 in PC memory 210, at step 298. Patch 21 also causes operating system 20 to map the memory space occupied by patch 21 into operating system 20 kernel space, by means of the "Terminate-stay resident" system call, at step 299. This ensures that patch 21 process remains resident in memory 210 and its space is not reclaimed by operating system 20 for other use.

Considering FIGS. 3 and 4, when the "open" and "exit" call vector 201 invokes patch 21, at step 300, in response to a user (that is, an application-level) program 200 request for a service, patch 21 examines the request to determine if it is an "open" call directed to a predetermined auxiliary disk drive or an "exit" call, at steps 301-303. If not, patch 21 merely invokes the service-handling routine of operating system 20 that would have been invoked by the vector in the absence of patch 21, and passes the unchanged trapped request to the routine for processing as in a conventional system, at step 331. Patch then exits, at step 333.

If it is determined at steps 301 and 302 that the trapped request is an "open" call to an auxiliary disk drive, patch 21 checks an internal flag to determine, at step 304, whether is has previously opened driver 31 on the associated intermediate computer 11. If not, patch 21 sets the flag, at step 305, and then performs an operating system 20 call that is identical to the "open" call that invoked patch 21 in all respects but that the filename of the file requested by user process 200 is replaced by the filename of driver 31 on the associated intermediate computer 11, at step 306. The filename is /DEV/PC in this illustrative example. This call serves to "open" driver 31 in a conventional manner.

Operating system 20 responds to the call in a conventional manner. It performs the "open" via interface 22 and returns a file descriptor for use in accessing driver 31. Patch 21 now uses the driver file descriptor to read driver 31, at step 307. It performs a "read" operating system call to operating system 20, passing it the file descriptor as an argument. Operating system 20 performs the "read" conventionally via interface 22, and returns to patch 21 the read information. This information is a filename—a minor number—of a port of driver 31 that driver 31 has assigned to this requesting PC 10.

Having obtained a port number at step 307, patch 21 now causes driver 31 to be closed by performing a "close" operating system call to operating system 20, at step 308, and passing the driver's file descriptor as an argument. Operating system 20 responds to the call in a conventional manner.

Alternatively, the above steps 304-308 may be avoided if, at the time when a PC 10 logs into intermediate computer 11, a port number is automatically assigned to PC 10, and PC 10 retains that port number for all accesses to driver 31.

Following step 308, or if patch 21 determines at step 304 that it has opened driver 31, patch 21 opens the assigned port, at step 309, by performing an "open" operating system call to operating system 20 and passing the filename of the assigned port as an argument. Operating system 20 responds conventionally. It performs the open operation and returns a file descriptor for use in accessing the assigned port.

Patch 21 now performs a "write" operating system call to operating system 20, at step 310, passing the port's file descriptor, a LOCKREQ request, and the filename of the file that the user requested to open, as arguments. Operating system 20 once again performs the "write" operation conventionally. It writes the request into the driver port through interface 22. When driver 31 responds to the request, operating system 20 returns to patch 21 a completion code. Patch 21 checks the completion code, at step 311. The code indicates to patch 21 whether the request succeeded or failed.

If the request succeeded, it means that the user-requested file exists on local intermediate computer 11 and, that it has been locked to the requesting user. Patch 21 causes operating system 20 to print this information on the PC's screen, at step 319. It then saves the filename of the locked file, at step 320, adding it to a list of all filenames that this user processor 200 has opened.

Patch 21 then closes the port, at step 322, by performing a "close" operating system call to operating system 20 and passing the filename of the port as an argument. Operation system 20 responds to the call in a conventional manner.

Finally, patch 21 invokes the service-handling routine of operating system 20 that would have been invoked by interrupt vectors 201 and forwards the original user program 200 request to operating system 20, at step 331, and then exits, at step 333. Operating system 20 responds to the user request conventionally, by opening the requested file on the auxililary disk drive by means of interface 22.

If the returned completion code indicates at step 311 that the request failed because the requested file was found to be locked to some other user, patch 21 causes this information to be printed on the PC's screen, at step 314. Patch 21 then closes the driver port, at step 315, by performing a "close" operating system call to operating system 20 and passing the filename of the port as an argument. Operating system 20 responds to the call in a conventional manner. Patch 21 then forces an error return to the user, at step 316: it sends an error code to the requesting user and dumps the user request. Patch 21 then exits, at step 333.

If the returned completion code indicates at step 311 that the request failed because the file was not found on local intermediate computer 11, patch 21 writes a new request to the port, at step 312. It performs a "write" operating system call to operating system 20 and passes the port's file descriptor, a NETGET request, and the filename requested by the user, as arguments. Operating system 20 once again performs the "write" operation conventionally.

The NETGET request causes request server 32 of local intermediate computer 11 to issue a call through NETSVR 33 for the named file or resource across network 14 to all intermediate computers 11. When request server 32 returns a response to the NETGET request, operating system 20 returns to patch 21 a completion code. Patch 21 checks the completion code, at step 313. The completion code indicates whether the NETGET request succeeded or failed.

If the request succeeded, it means that the file or resource has been found on a remote intermediate computer 11, and, if it is a file, has been locked to the requesting user. It is a file, it also means that it has been delivered to local intermediate computer 11. Once again, patch 21 causes this information to be printed, at step 319; saves the filename of the resource or locked file, at step 320; closes the port by performing a close operating system call to operating system 20 and passing as an argument the port's filename, at step 322;

invokes the service-handling routine and forwards the original user request to operating system 20, at step 331; and then exits, at step 333.

If the returned completion code indicates at step 313 that the request failed because, even though the file was found, it was locked to someone else, patch 21 again causes information regarding the fact that the file is locked and the identity of the present file owner to be printed, closes the driver port by performing a "close" call to operating system 20, and forces an error return to the user, at steps 314-316, before exiting at step 333.

If the returned completion code indicates at step 313 that the request failed because the file or resource was not found on any of intermediate computers 11, patch 21 again writes a new request to the port, at step 317. It performs a "write" call to operating system 20, passing the port's file descriptor, a SNAGET request, and the user-requested filename, as arguments. Operating system 20 once again performs the write operation conventionally.

The SNAGET request results in an attempt to request server 32 to obtain the requested file from database 13 of mainframe computer 12 through APISVR 34. When request server 32 returns a response to the SNAGET request, operating system 20 returns a completion code that, once again, indicates to patch 21, at step 318, whether the SNAGET request succeeded or failed.

If the request was for a file and it succeeded, it means that the unlocked file or corresponding database record has been found in database 13 of mainframe computer 12, has been retrieved therefrom, has been delivered to local intermediate computer 11, and has been locked to the requesting user. If the request was for a resource and it succeeded, it means that the resource has been found on mainframe computer 12. Once again, patch 21 causes this information to be printed, at step 319; saves the filename of the resource or locked file, at step 320; closes the port by performing a "close" call to operating system 20, at step 322; invokes the service-handling routine and forwards the original request to operating system 20, at step 331; and then exits, at step 333.

If the returned completion code indicates at step 318 that the SNAGET request failed because the requested file or database record was found but is locked by mainframe computer 12, patch 21 again causes information regarding the fact that the file is locked to be printed, closes the driver port, and forces an error return to the user, at steps 314-316, before exiting at step 333.

If the returned completion code indicates at step 318 that the SNAGET request failed, it means that the resource, file, or database record has not been found. Patch 21 causes this information to be printed on the PC's screen, at step 321; closes the driver port by performing a "close" call to operating system 20, at step 322; invokes the service-handling routine and forwards the original request to operating system 20, at step 331; and exits, at step 333. When operating system 20 attempts to satisfy the request, it fails, i.e., finds that the file or resource is not available, and so informs the user.

If the user request is found at step 303 to be an "exit" call, patch 21 checks information it has stored about requesting processes 200 to determine if this requesting process has any files open, at step 334. If not, patch 21 merely exits, at step 335. If requesting process 200 does have open files, patch 21 undertakes to close and unlock them. First, patch 21 opens the assigned driver port, at step 323, by performing an "open" operating system call to operating system 20 and passing as an argument the driver port's file descriptor. When operating system 20 returns, patch 21 writes into the port an "unlock" request along with the names of all of the files that are locked to the requesting user, at step 324, by performing a "write" call to operating system 20 and passing an UNLOCKREQ command and the filenames of the locked files as arguments, in order to release those files for use by other users. When operating system 20 returns with a completion code, patch 21 causes information indicating that the files have been unlocked to be printed on the PC's screen, at step 325. Patch 21 then closes the driver port, at step 326, by performing a "close" call to operating system 20 and passing the port's file descriptor as an argument. Patch 21 then opens driver 31, at step 327, in the same manner as at step 306. Patch 21 then writes the port number of the assigned port to driver 31, at step 328, to release the assigned port. It performs a "write" operating system call to operating system 20, passing it the file descriptor of driver 31 and the filename of the assigned driver port as arguments. Patch 21 then closes driver 31, at step 329, in the same manner as at step 308. Patch 21 also clears the flag that it had set at step 304, at step 330. Finally, patch 21 invokes the service-handling routine and forwards the user's exit request to operating system 20, at step 331; and exits, at step 333. Operating system 20 processes the user's exit request in a conventional manner.

Alternatively, the functionality of patch 21 may be implemented in the PC-resident portion of interface 22 software, instead of as a patch between interface 22 and operating system 20.

In the case of a user program 200 request for printer 16 services, the request is trapped by PC Interface 22 of a PC 10 and is forwarded thereby to PC Interface 22 on intermediate computer 11. On intermediate computer 11, interface 22 calls a line printer process (LPT) and passes to it as argument the filename of the file that is to be printed. The line printer process then proceeds to check for presence of printer 16 on local intermediate computer 11; and if it finds it, to satisfy the request. If the line printer process does not find printer 16 on local intermediate computer 11, it proceeds to obtain the requested service through driver 31 and request server 32, in a manner substantially identical to that diagramed for patch 20 in blocks 304-322. The LPT process writes to driver 31 a request of the form "RESRC 1 LPT 1 FILENAME". Unlike patch 21, however, the line printer process communicates with driver 31 directly through operating system 30 and not indirectly through operating system 20 and interface 22.

Driver (FIGS. 5-15)

While a local intermediate computer 11 appears as an extra disk drive—an auxiliary drive such as a virtual disk drive "D"—to operating system 20 of a PC 10, PC 10 is logged into intermediate computer 11 via interface 22 and appears to operating system 30 of intermediate computer 11 as a normal user process.

Driver 31 acts as an intermediary—a multiplexed conduit for communications—between a plurality of PC 10 user programs 200 and request server 32. Driver 31 also interfaces to request server 32 processes of intermediate computer 11, such as the line printer process, that makes use of services provided by request server 32. PC 10 communicates through PC Interface 22 with operating system 30 of intermediate computer 11, which in turn communicates with driver 31. Request server 32, which is an application-level process, also communicates with driver 31 through operating system 30.

Driver 31 appears as a conventional UNIX system character device driver to operating system 30 of intermediate computer 11. Illustratively, such drivers are described in Ch. 10 of Maurice J. Bach, *The Design of the UNIX Operating System*, Prentice-Hall, Inc., 1986.

Figure 5:
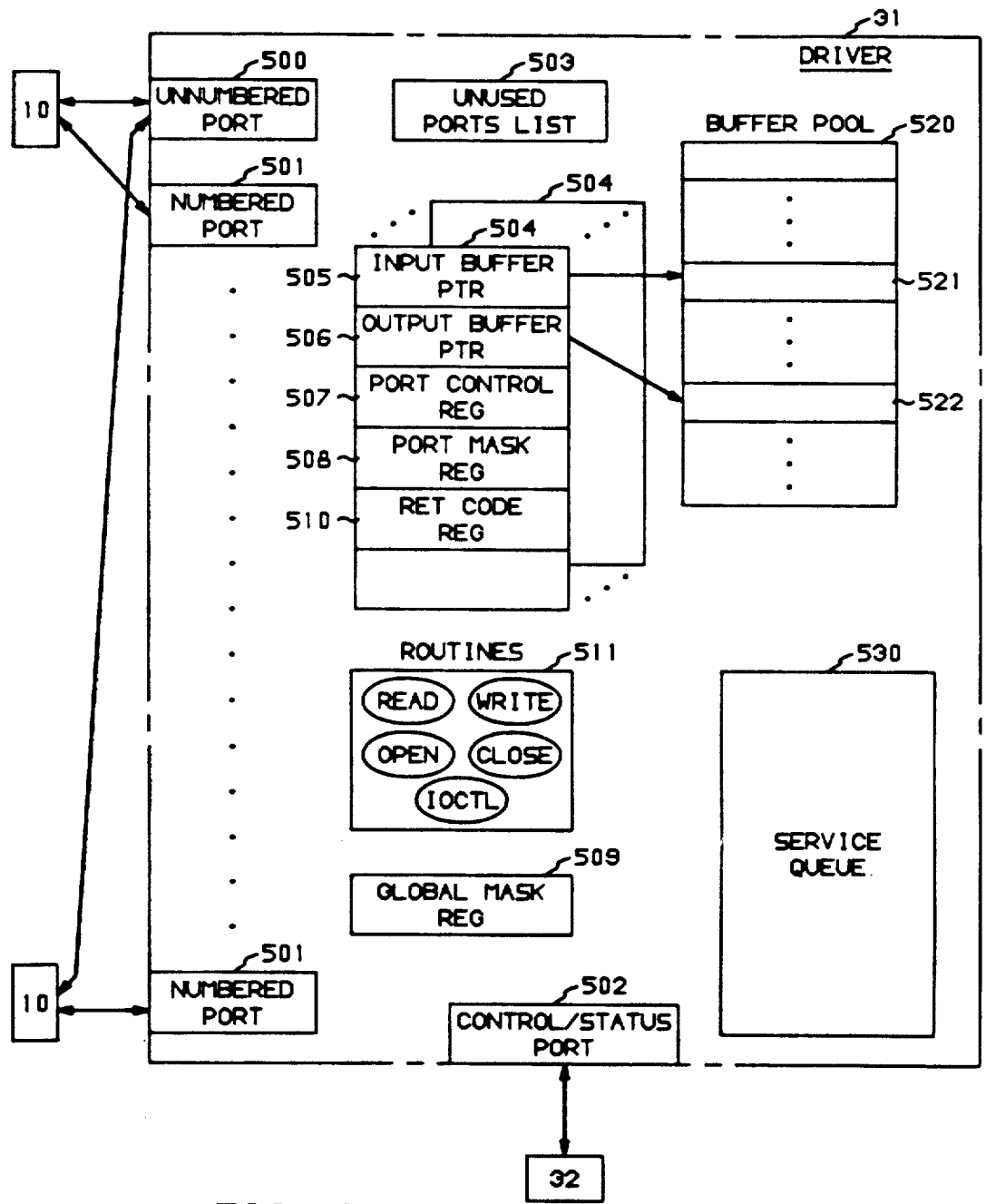
FIG. 5 is a block diagram of the driver of an intermediate computer of FIG. 1.

As shown in FIG. 5, driver 31 is a multi-ported driver. Numbered device ports 501 serve as entry points into driver 31 for PCs 10 and processes of intermediate computer 11, while a control/status port 502 serves as an entry point for request server 32. An unnumbered device port 500 is special, in that it is used by processes and PCs 10 to obtain numbered device ports 501 for use in communicating with request server 32. Device ports 500 and 501 look like ordinary sequential files to processes and to PCs 10. Thus, PC Interface 22 may read and write ports 500 and 501 via its file-serving capability. However, numbered ports 501 behave like FIFO buffers operating under a protocol defined by resource server 32 through control/status port 502.

Driver 31 includes a collection of operating system kernel routines 511 that handles standard UNIX system read, write, open, close, and input and output control (IOCTL) calls for a character device driver. Driver 31 allows a plurality of resource requests to be sent to resource server 32 by a plurality of processes and PCs 10 and responses to the requests to be returned, while enforcing sequentiality through the buffers, UNIX operating system primitives, and control/status port 502. Control/status port 502 is also used for programming the reaction of driver 31 to stimuli from numbered device ports 501.

An "unused ports" data structure 503 contains a list of numbered ports 501 that are not allocated to any process or PC 10. Accesses to driver 31 through unnumbered port 500 make use of this structure 503.

A buffer pool 520 includes a plurality of buffers for use by numbered ports 501. The buffers are used to store any information written to numbered ports 501 by processes, PCs 10, and by request server 32.

Each numbered port 501 has associated therewith a per-port data structure 504 that contains port-relevant information. Input buffer point 505 points to a buffer in pool 520 that is used as an input buffer 521 to hold requests passing from a PC 10 to request server 32. Output buffer pointer 506 points to a buffer in pool 520 that is used as an output buffer 522 to hold request responses passing from request server 32 to a PC 10. A PC 10 which writes to input buffer 521 faster than it is emptied is generally put to sleep so that buffer overflow does not occur. Also, any process that reads buffer 521 faster than it is filled is generally put to sleep. Output buffer 522 behaves in a like manner: a PC 10 which reads faster than buffer 522 is filled is generally put to sleep, and any process that writes buffers 522 faster than PC 10 reads it is generally also put to sleep. PCs and processes that unsuccessfully read and write numbered ports 501 receive standard operating system 30 return codes.

A tunable parameter controls the maximum amount of data that can be in input buffer 521; another tunable parameter controls the maximum amount of data that can be in output buffer 522. The tunable parameters may be changed either at system initialization through a master file or dynamically through an IOCTL system call.

Figure 6:
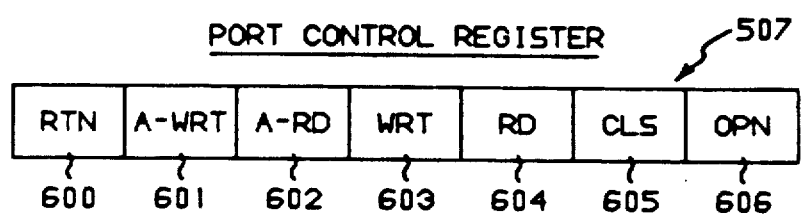
FIGS. 6-8 are block diagrams of the port control, port mask, and global mask registers, respectively, of the driver of FIG. 5.

Port control register 507 describes what actions are to be taken on a PC 10 by various operations incoming from a PC 10. Flag fields of register 507 are shown in FIG. 6. Their meanings are as follows:

RTN 600: if set, use return codes specified in return code register 510 on read and write system calls; otherwise send standard UNIX system return codes.

A-WRT 601: if set, put PC 10 to sleep on write of port 501 if input buffer 521 is full; otherwise return failure code.

A-RD 602: if set, put PC 10 to sleep on read of port 501 if output buffer 522 is empty; otherwise return failure code.

WRT 603: if set, put PC 10 to sleep on write of port 501; otherwise don't sleep.

RD 604: if set, put PC 10 to sleep on read of port 501; otherwise don't sleep.

CLS 605: if set, put PC 10 to sleep on close of port 501; otherwise don't sleep.

OPN 606: if set, put PC 10 to sleep on open of port 501; otherwise don't sleep.

Figure 7:
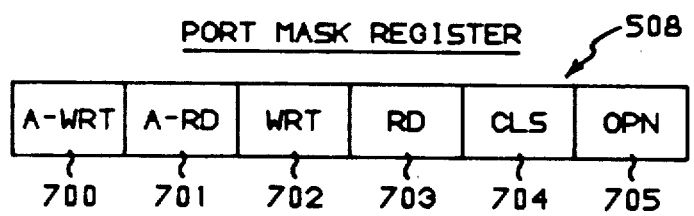

Port mask register 508 designates what operations performed on a numbered port 501 should cause a wakeup to be sent to anything (typically request server 32) sleeping on control/status port 502. Flag fields of register 508 are shown in FIG. 7. Their meanings are as follows:

A-WRT 700: if set, put request server 32 to sleep if request server 32 writes port 501 when output buffer 522 is full; otherwise don't sleep.

A-RD 701: if set, put request server 32 to sleep if request server 32 reads port 501 when input buffer 521 is empty; otherwise don't sleep.

WRT 702: if set, wakeup request server 32 on PC 10 write of port 501; otherwise don't wakeup.

RD 703: if set, wakeup request server 32 on PC 10 read of port 501; otherwise don't wakeup.

CLS 704: if set, wakeup request server 32 on PC 10 close of port 501; otherwise don't wakeup.

OPN 705: if set, wakeup request server 32 on PC 10 open of port 501; otherwise don't wakeup.

Figure 8:
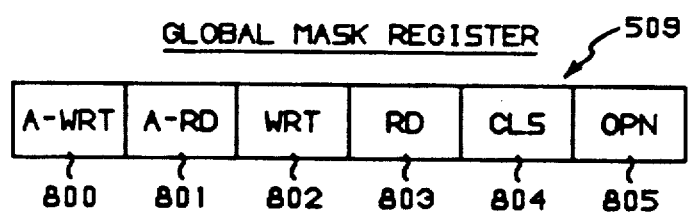

Bits which are set in global mask register 509 control global responses to operations performed on numbered ports 501. Global mask register 509 overrides individual port mask registers 508. Flag fields of register 509 are shown in FIG. 8. Their meanings are as follows:

A-WRT 800: if null, use port mask register 508 for control; if 01, put request server 32 to sleep on request server 32 write of port 501 if output buffer 522 is full; if 10, don't sleep.

A-RD 801: if null, use port mask register 508 for control; if 01, put request server 32 to sleep on request server 32 read of port 501 if input buffer 521 is empty; if 10, don't sleep.

WRT 802: if null, use port mask register 508 for control; if 01, wakeup request server 32 on PC 10 write of port 501; if 10, don't wakeup.

RD 803: if null, use port mask register 508 for control; if 01, wakeup request server 32 on PC 10 read of port 501; if 10, don't wake up.

CLS 804: if null, use port mask register 508 for control; if 01, wakeup request server 32 on PC 10 close of port 501; if 10, don't wakeup.

OPN 805: if null, use port mask register 508; if 01, wakeup request server 32 on PC 10 open of port 501; if 10, don't wakeup.

Return code register 510 holds values to be returned by functions when return codes other than standard UNIX system return codes are desired for read and write operations.

Service queue 530 keeps a list of numbered ports 501 waiting for service from request server 32. Various IOCTL calls (discussed below) performed by request server 32 return contents of service queue 530 to request server 32.

As discussed in conjunction with patch 21, the first thing that a PC 10 must do is to obtain a numbered port 501 for use in communicating with request server 32; then upon exit of a user program 300, it must relinquish the assigned numbered port 501. A process of intermediate computer 11 must proceed likewise to obtain access to request server 32 through driver 31. Driver 31 does not distinguish between PCs 10 and processes of intermediate computer 11. Consequently, the following discussion, while referring to PCs 10, will be understood to apply equally to any users of driver 31, such as processes of intermediate computer 11.

In order to obtain or relinquish a numbered port 501, PC 10 must enter driver 31 through the special unnumbered port 500. The system calls that are used to obtain and relinquish a numbered port 501 through unnumbered port 500 are the standard UNIX system open, close, read, and write calls.

These calls are also available to PCs 10 to perform on numbered ports 501 to obtain services from resource server 32. Open and close calls are likewise available to request server 32 to perform on control/status port 502. However, request server 32 does not have read and write calls available thereto, but must perform all operations on driver 31 via various types of the IOCTL call.

Routines 511 of driver 31 that handle the open, close, read, write, and IOCTL calls are diagramed in FIGS. 9-15.

Figure 9:
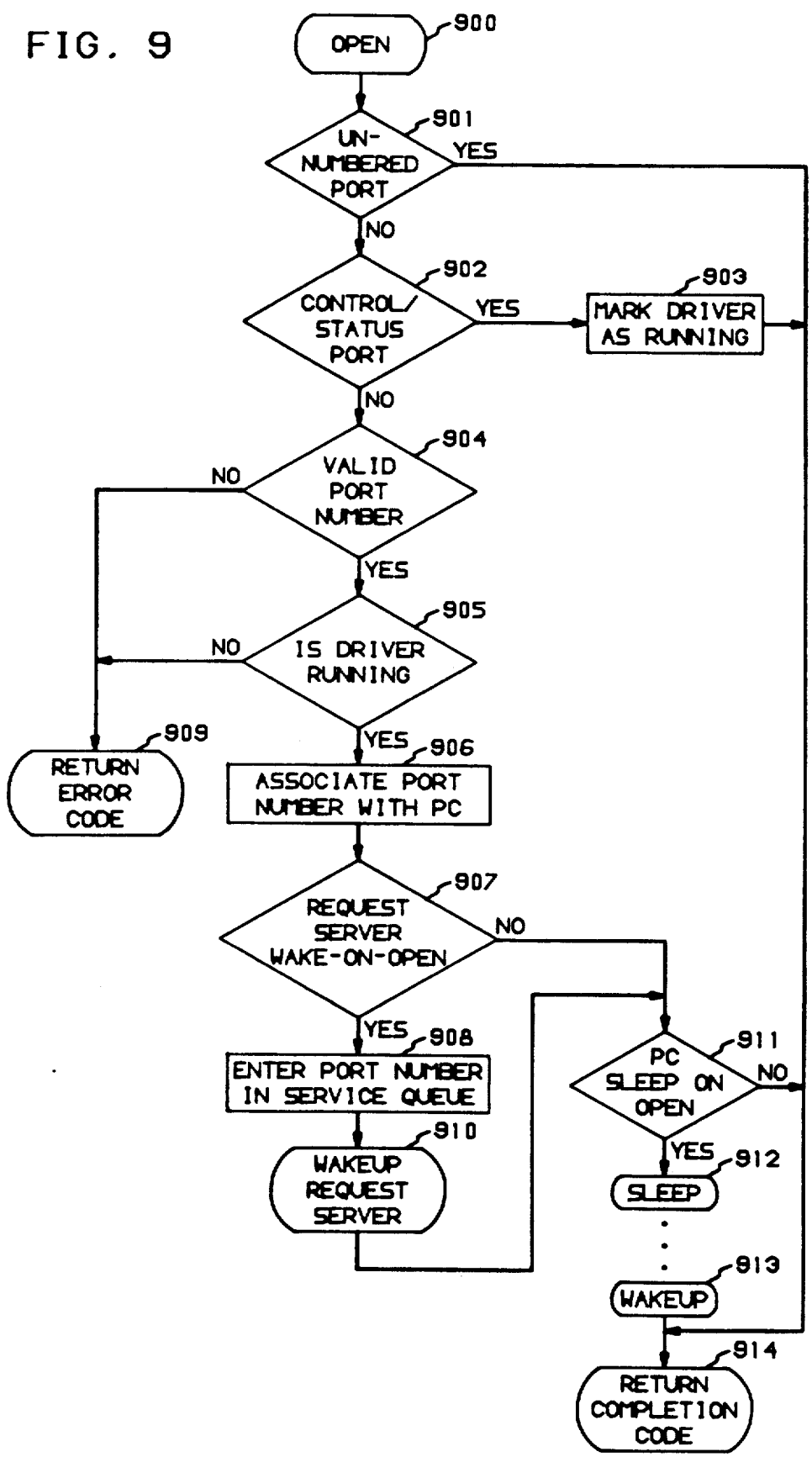
FIGS. 9-12 are flow diagrams of the open, close, read, and write routines, respectively, of the driver of FIG. 5.

As shown in FIG. 9, in response to being invoked by the "open" call-handling routine of operating system 30, at step 900, the open routine of driver 31 checks arguments received as part of its invocation to determine what kind of driver 31 port is being opened. If unnumbered port 500 is being opened, at step 901, operating system 30 will automatically connect requesting PC 10 to unnumbered port 500, and hence there is nothing left for driver 31 to do. Driver 31 therefore merely returns to operating system 30 with a completion code, at step 914.

If control/status port 502 is being opened, at step 902, the open routine internally marks driver 31 as running, at step 903, and then returns to operating system 30 with a completion code, at step 914.

If a numbered port 501 is being opened, the open routine checks, at step 904, whether the port number is valid, that is, whether it is a number of an existing port 501 and whether that port 501 has been allocated. If not, open routine returns to operating system 30 with an error return code, at step 909. If the port number is valid, the open routine checks whether driver 31 has been marked as running (see step 903), at step 905. If not, the open routine returns to operating system 30 with an error return code specified by RTN field 600 of register 507, at step 909. If driver 31 is running, the open routine associates that port 501 with the particular PC 10 that is opening it, at step 906, illustratively by entering the ID of that PC 10 in the port's per-port data structure 504.

The open routine then checks whether request server 32 is to be awakened in response to opening of port 501, at step 907. The open routine first checks OPN field 805 of global mask register 509; only if its value is null does it check OPN field 705 of port mask register 508 to make the determination. If request server 32 is not to be awakened, the open routine checks OPN bit 606 of port control register 507 of the opened port to determine if requesting PC 10 is to be put to sleep on open calls, at step 911. If not, the open routine merely returns to operating system 30 with a successful completion code, at step 914. If PC 10 is to sleep on open, the open routine calls on the sleep function of operating system 30 to put the context associated with that PC 10—including the open routine—to sleep, at step 912, and sleeps until the context that it is a part of is awakened by action of request server 32, at step 913, whereupon it returns to operating system 30 with a completion code, at step 914.

If request server 32 is to be awakened at step 907, the open routine enters the port number of the port that is being opened in service queue 530, at step 908. The open routine then wakes up request server 32, at step 910, by calling a wakeup function of operating system 30, and only then proceeds to step 911.

Figure 10:
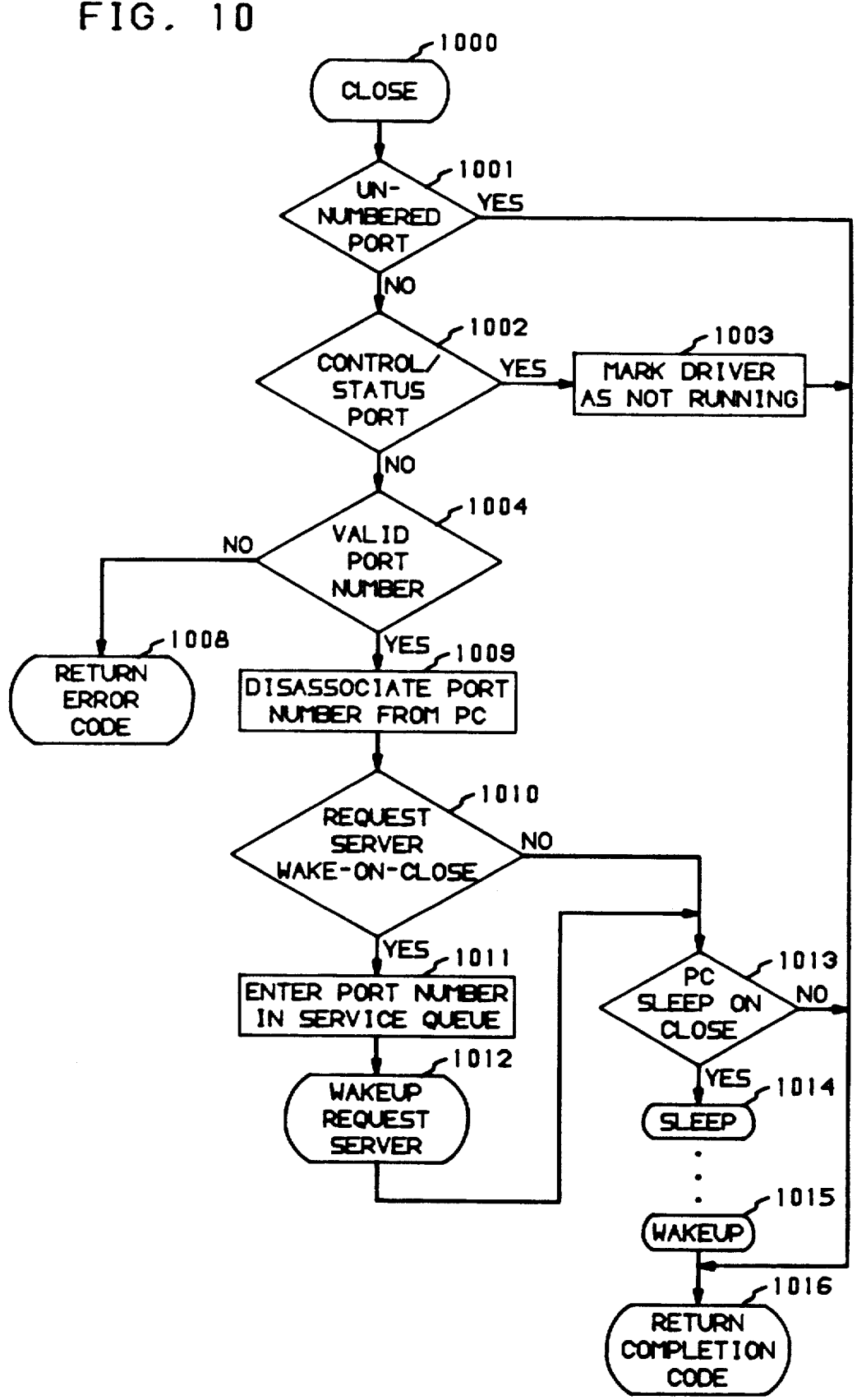

A "close" system call puts a port 500-502 in the closed state. As shown in FIG. 10, in response to being invoked by the "close" call-handling routine of operating system 30, at step 1000, the close routine of driver 31 checks arguments received as part of its invocation to determine which driver 31 port is being opened. If unnumbered port 500 is being opened, at step 1001, the "close" call-handling routine of operating system 30 performs all necessary activities, and hence there is nothing left for driver 31 to do. Driver 31 therefore merely returns to operating system 30 with a completion code, at step 1016.

If control/status port 502 is being closed, at step 1002, the close routine marks driver 31 as not running in a data structure (not shown) that contains global information about driver 31, at step 1003, and then returns to operating system 30 with a completion code, at step 1016.

If a numbered port 501 is being closed, the close routine checks, at step 1004, whether the port number is valid. If not, the close routine returns to operating system 30 with an error code, at step 1008.

If the port number is valid, the close routine cancels the association (see step 906 of FIG. 9) of the port 501 number with a PC 10, at step 1009. The close routine then checks whether request server 32 is to be awakened in response to closing of port 501, at step 1010. The close routine first checks CLS field 804 of global mask register 509; only if it value is null does it check CLS field 704 of port mask register 508 to make the decision. If request server 32 is not to be awakened, the close routine checks CLS bit 605 of port control register 507 of the closed port to determine if requesting PC 10 is to be put to sleep on close calls, at step 1013. If not, the close routine merely returns to operating system 30 with a completion code, at step 1016. If PC 10 is to sleep on close, the close routine calls on the sleep function of operating system 30 to put the context associated with that PC 10—including the close routine—to sleep, at sleep, at step 1014, and sleeps until the context that it is a part of is awakened by action of request server 32, at step 1015, whereupon it returns to operating system 30 with a successful completion code, at step 1016.

If request server 32 is to be awakened at step 1010, the close routine enters the port number of the port that is being closed in service queue 530, at step 1011. The close routine then wakes up request server 32, at step 1012, by calling a wakeup function of operating system 30, and only then proceeds to step 1013.

Figure 11:
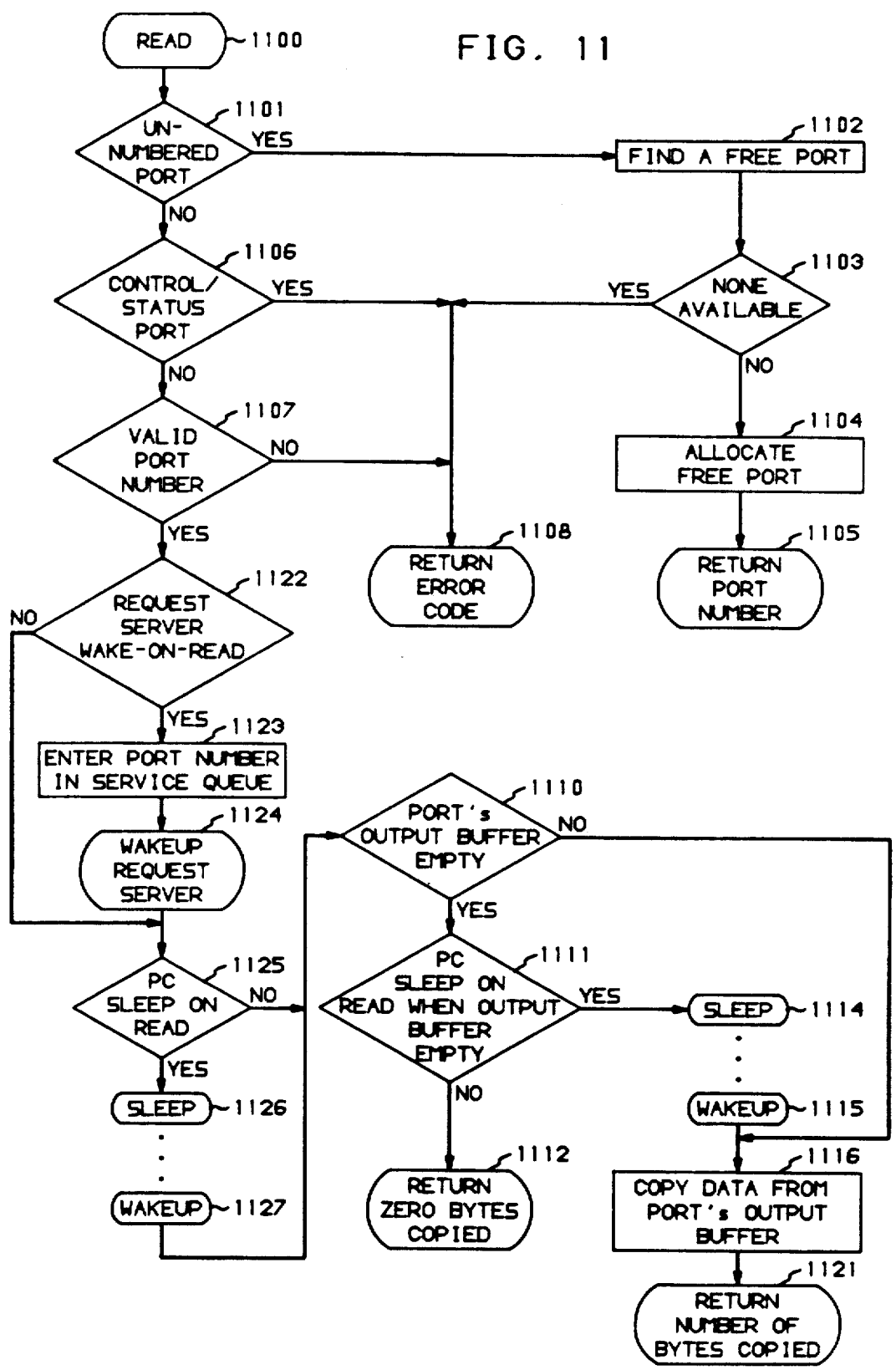

As shown in FIG. 11, in response to being invoked by the "read" call-handling routine of operating system 30, at step 1100, the read routine of driver 31 checks received arguments to determine which driver 31 port is being read. If it is unnumbered port 500, at step 1101, the read routine accesses "unused ports" structure 503 to obtain therefrom the number of a free port 501. If it determines, at step 1103, that no ports 501 are available, it returns to operating system 30 with an error code, at step 1108. If it obtains a free port 501, it allocates that port 501, at step 1104, illustratively by marking it in structure 503 as allocated, and then returns the port 501 number to operating system 30, at step 1105. This number serves as the minor device number of allocated port 501, and operating system 30 returns this number to requesting PC 10.

If control/status port 502 is being read, at step 1106, the read routine returns an error code to operating system 30, at step 1108: port 502 may be read only via an IOCTL call.

If a numbered port 501 is being read, the read routine checks, at step 1107, whether the port number is valid. If not, the read routine returns an error code, at step 1108.

If the port number is valid, the read routine checks whether request server 32 is to be awakened in response to reading of port 501, at step 1122. The read routine first checks RD field 803 of global mask register 509; only if its value is null does it check RD field 703 of port mask register 508 to make the determination. If requester server 32 is not to be awakened, the read routine checks RD bit 604 of register 507 to determine if requesting PC 10 is to be put to sleep on all reads, at step 1125. If, however, request server 32 is to be awakened at step 1122, the read routine enters in service queue 530 the number of port 501 that is being read, at step 1123, and then wakes up request server 32, at step 1124, by calling the wakeup function of operating system 30. Only then does the read routine proceed to step 1125.

If at step 1125 requesting PC 10 is to be put to sleep, the read routine calls the sleep function of operating system 30 to put the context associated with that PC 10—including the read routine—to sleep, at step 1126, and sleeps until the context that it is a part of is awakened by action of request server 32, at step 1127.

Following step 1127, or if requesting PC 10 is not to be put to sleep at step 1125, the read routine checks the port's output buffer 522, at step 1110, to determine whether it is empty. If so, no data is available to be read. Read routine therefore checks A-RD bit 602 of the port's control register 507, at step 1111, to determine what action to take. If bit 602 is not set, the read routine returns to operating system 30 with an indication that zero (none) bytes of data have been read, at step 1112. If bit 602 is set, the read routine calls the sleep function of operating system 30 to put the context of that PC 10 to sleep, at step 1114, and sleeps until the context is awakened by action of request server 32 writing data into the port's output buffer 522, at step 1115.

When it has awakened at step 1115, or if the port's output buffer 522 was found not to be empty at step 1110, the read routine copies data from output buffer 522 to a buffer associated with requesting PC 10 and specified as an argument of the call to the read routine, at step 1116. The read routine copies as many bytes as are available, up to a number specified by an argument of the call to the routine. The read routine then returns, at step 1121, to operating system 30 with the number of bytes of data that were copied at step 1116.

Figure 12:
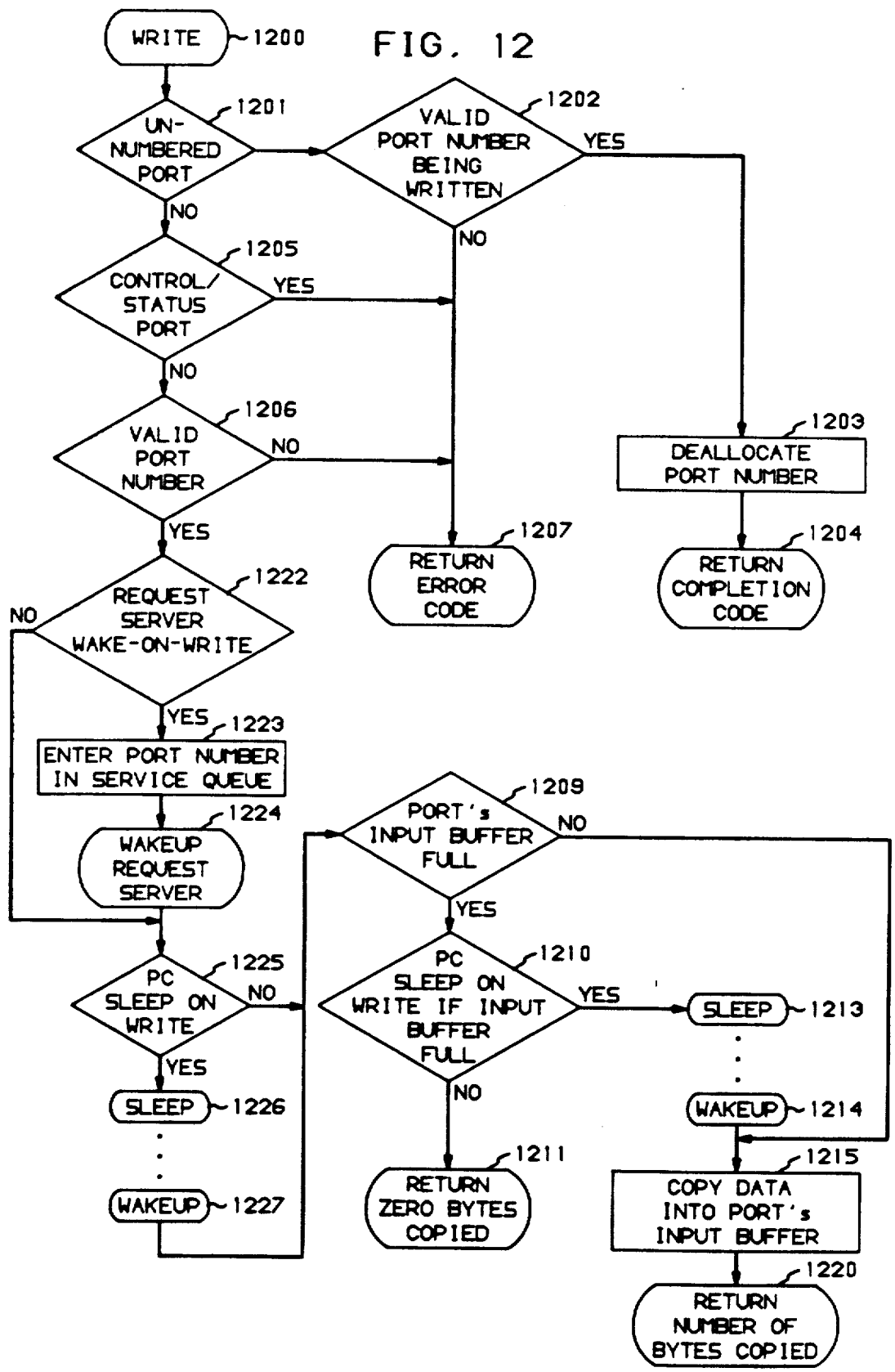
Figure 13:
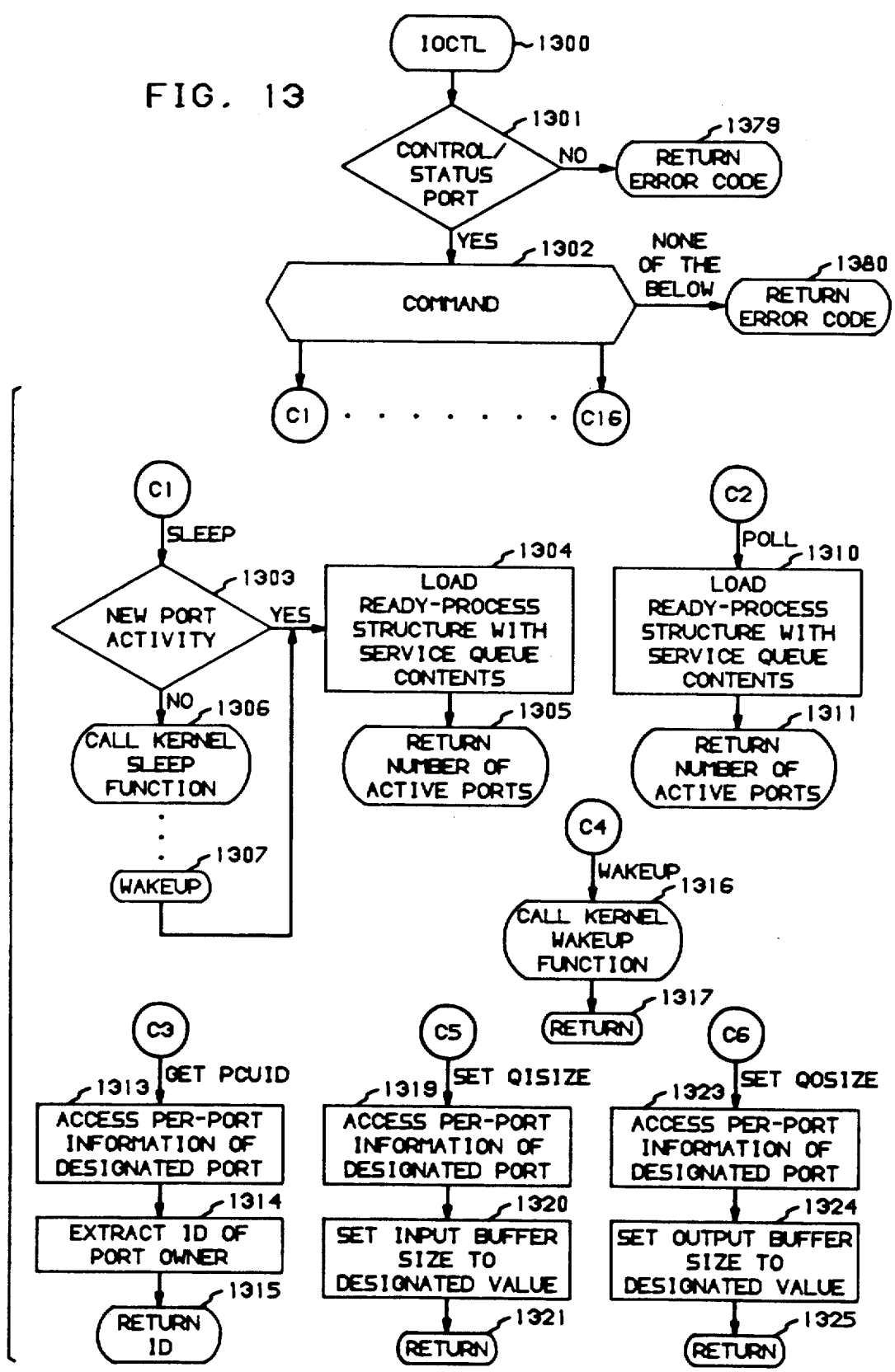
FIGS. 13-15 are flow diagrams of the IOCTL routines of the driver of FIG. 5.
Figure 14:
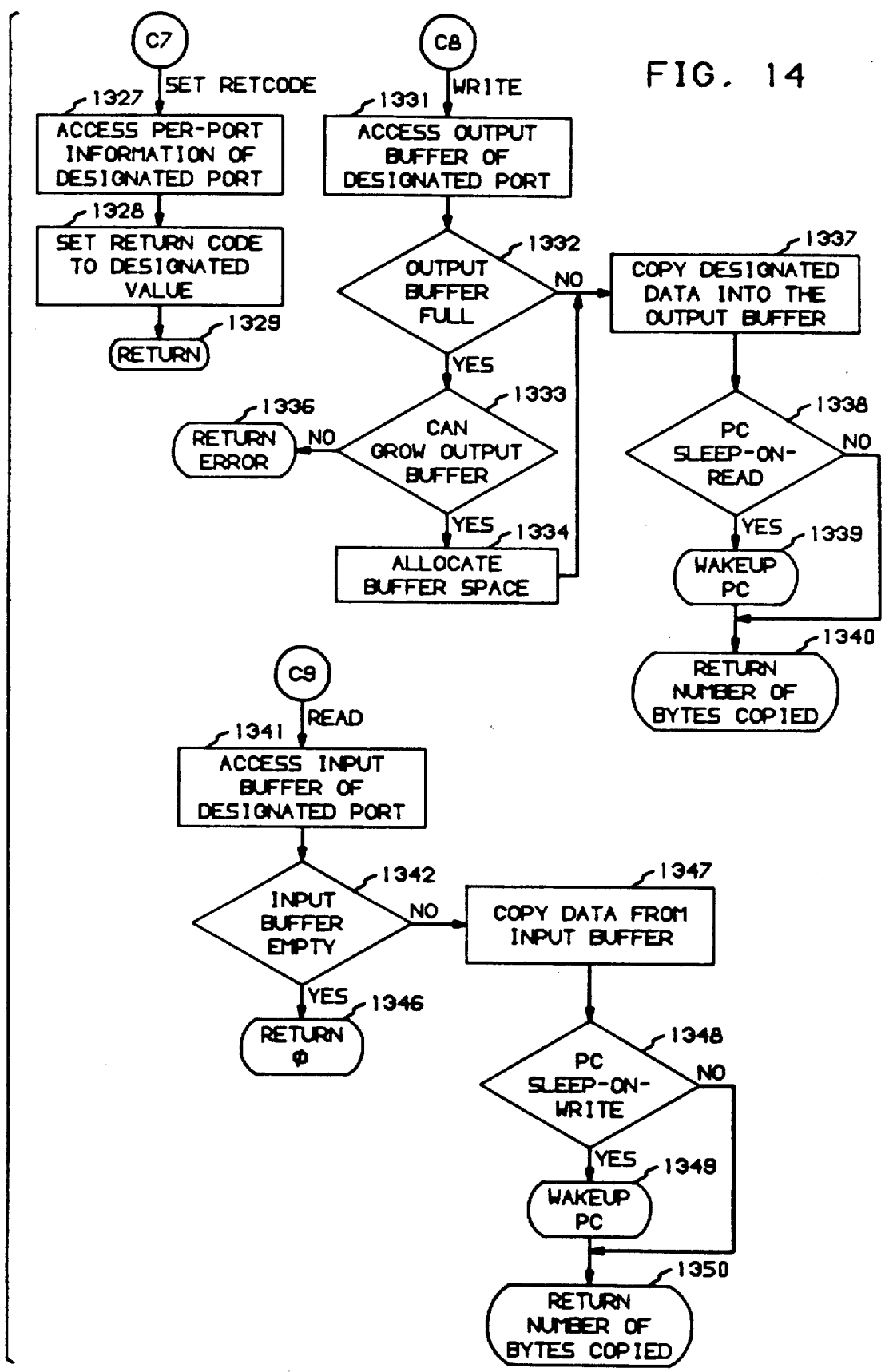
Figure 15:
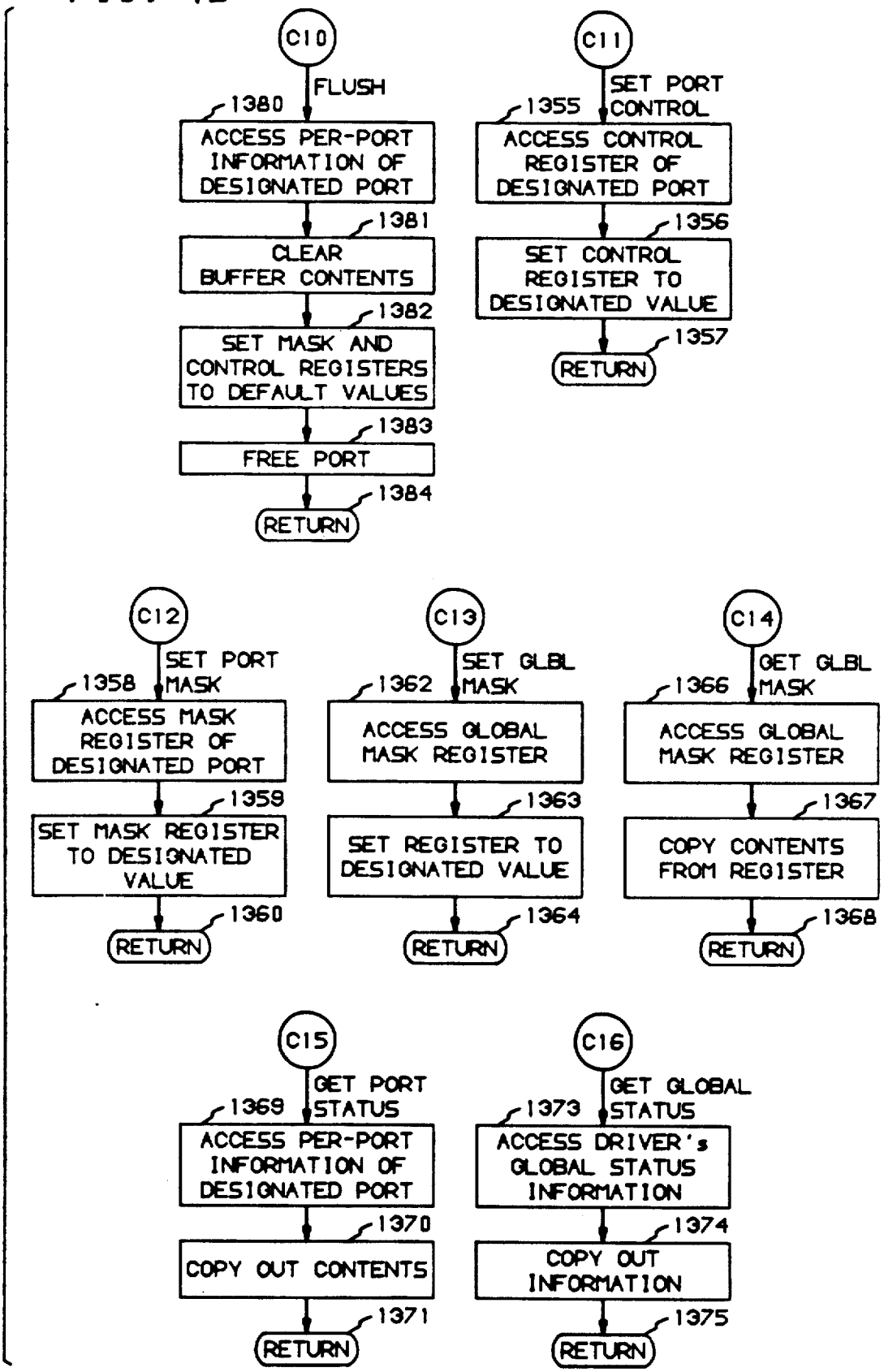

As shown in FIG. 12, in response to being invoked by the "write" call-handling routine of operating system 30, at step 1200, the write routine of driver 31 checks received arguments to determine which driver 31 port is being written. If it is unnumbered port 500, at step 1201, the write routine checks the port 501 number passed as an argument to determine if it is valid, at step 1202. If so, the write routine deallocates the port 501 number, at step 1203, by marking it as a free port 501 available for allocation to PCs 10. The write routine then returns to operating system 30 with a completion code, at step 1204. If the port number is found at step 1202 not to be valid, the write routine returns an error return code, at step 1207.

If control/status port 502 is being written, the write routine returns an error code to operating system 30, at step 1207: port 502 may be written only via an IOCTL call.

If a numbered port 501 is being written, the write routine checks, at step 1206, whether the port number is valid. If not, the write routine returns an error code, at step 1207.

If the port number is valid, the write routine checks whether request server 32 is to be awakened in response to writing of port 501, at step 1222. The write routine first checks WRT field 802 of global mask register 509; only if its value is null does it check WRT field 702 of port mask register 508 to make the determination. If request server 32 is not to be awakened, the write routine checks WRT bit 603 of register 507 to determine if requesting PC 10 is to be put to sleep on all writes, at step 1225. If, however, request server 32 is to be awakened at step 1222, the write routine enters in service queue 530 the number of port 501 that is being written, at step 1223, and then wakes up request server 32, at step 1224, by calling the wakeup function of operating system 30. Only then does the write routine proceed to step 1225.

If at step 1225 requesting PC 10 is to be put to sleep, the write routine calls the sleep function of operating system 30 to put the context associated with that PC 10—including the write routine—to sleep, at step 1226, and sleeps until the context that it is a part of is awakened by action of request server 32, at step 1227.

Following step 1227, or if requesting PC 10 is not to be put to sleep at step 1225, the write routine checks the port's input buffer 521, at step 1209, to determine whether it is full. If so, no storage space is available to accept written data. The write routine therefore checks the A-WRT bit 601 of the port's control register 508, at step 1210, to determine what action to take. If bit 601 is not set, the write routine returns to operating system 30 with an indication that zero (non) bytes of data have been written, at step 1211. If bit 601 is set, the write routine calls the sleep function of operating system 30 to put the context of that PC 10 to sleep, at step 1213, and sleeps until the context is awakened by action of request server 32 reading data from the port's input buffer 521, at step 1214.

When it has awakened, at step 1214, or if the port's input buffer 521 was found not to be empty at step 1209, the write routine copies data into input buffer 521 from a buffer associated with requesting PC 10 and specified as an argument of the call to the write route, at step 1215. The write routine copies as many bytes for which space is available in input buffer 521, up to a number specified by an argument of the call to the routine. The write routine then returns, at step 1220, to operating system 30 with the number of bytes of data that were copied at step 1215.

The interface between driver 31 and request server 32 comprises standard "open" and "close" calls of control/status port 502, and a plurality of IOCTL system calls of port 502. The IOCTL calls are diagrammed in FIGS. 13-15.

In response to being invoked by the IOCTL call-handling routine of operating system 30, at step 1300, the IOCTL routine of driver 31 checks arguments received as part of its invocation to determine what kind of driver 31 port is being opened, at step 1301. If it is not control/status port 502, IOCTL routine returns an error code to operating system 30, at step 1379. If it is control status port 502, the IOCTL routine checks the command that it received as an argument, at step 1302, to determine what kind of IOCTL call this is, and the handles it accordingly. If it is not one of the recognized calls, the routine returns an error code, at step 1380.

An IOCTL (Sleep) call puts the calling process, usually request server 32, to sleep. It is awakened by subsequent operations according to global mask register 509. The IOCTL call includes as an argument a pointer to an empty ready-process structure. On return, this structure is filled with the contents of service queue 530, which includes a list of all ports 501 which woke up request server 32. Associated with each listed port 501 is a reason field, which is a bit field specifying the reason why request server 32 was awakened (i.e., an open, close, read, or write system call having been made on a port 501). The return code specifies the number of entries in the structure. In response to the call, the IOCTL routine checks service queue 530 to determine if there has been new port 501 activity that would cause request server 32 to wake up, at step 1303. If so, the routine does not put request server 32 to sleep, but loads the ready-process structure with contents of service queue 530, at step 1304, and then returns with a code specifying the number of entries in the structure, at step 1305. If no new port 501 activity is indicated at step 1303, the IOCTL routine calls the sleep function of the kernel operating system 30 to put the context associated with request server 32—including the sleep routine—to sleep, at step 1306, and sleeps until that context is awakened by new port activity, at step 1307. The sleep function then proceeds to step 1304 to return contents of service queue 530.

An IOCTL (Poll) call includes as an argument a pointer to the empty ready-process structure, and returns in it a list of ports 501 that should cause request server 32 to wake up. In the case where request server 32 is already running, there can also be port 501 activity that would ordinarily wake it up, but, since request-server 32 is already awake, it cannot be woken up. This system call is provided to get the list of these ports 501. In response to the call, the IOCTL routine loads the ready-process structure with contents of service queue 530, at step 1310, and then returns with a code specifying the number of entries in the structure, at step 1311.

An IOCTL (PCUID) call enables request server 32 to determine the owner of a port 501. The call causes the IOCTL routine to access per-port information 504 of designated port 501, at step 1313, to extract therefrom the unique user ID of the port's owner, at step 1314, and to return the ID to request server 32, at step 1315.

IOCTL (Wakeup) call wakes up anything sleeping on a numbered port 501 or control/status port 502, whichever specified as an argument. The call causes the IOCTL routine to call the wakeup function of the kernel of operating system 30 to cause the wakeup, at step 1316. The routine then returns to request server 32, at step 1317.

An IOCTL (Set Qisize) call changes the size of a port's input buffer 521. The port number and the buffer size are specified by the call. The IOCTL routine accesses per-port information 504 of designated port 501, at step 1319, sets the input buffer size entry therein to the designated value, at step 1320, and then returns, at step 1321.

An IOCTL (Set Qosize) call changes the size of a port's output buffer 522. The port number and the buffer size are specified by the call. The IOCTL routine accesses per-port information 504 of designated port 501, at step 1323, sets the output buffer size entry therein to the designated value, at step 1324, and then returns, at step 1325.

An IOCTL (Set Retcode) call sets the return code register (not shown) for a port 501. If RTN bit 600 in port control register 507 is set, the value of the return code register is returned to a PC 10 on reads and writes. The call identifies port 501 whose return code register value is to be set, and the return code itself. The IOCTL routine accesses the return code register in per-port information 504 of designated port 501, at step 1327, sets the code therein to the designated value, at step 1328, and then returns, at step 1329.

An IOCTL (Write) call writes data to a specified port 501. The call includes as an argument a pointer to a read/write structure that includes the port ID, a pointer to the data, and the number of data bytes. The IOCTL routine accesses output buffer 522 of designated port 501, at step 1331, and checks it, at step 1332. If output buffer 522 is full, the IOCTL routine checks for availability of unused memory space in buffer pool 520 to determine whether output buffer 522 may be expanded in size, at step 1333. If output buffer 522 cannot be expanded, the IOCTL routine returns an error code, at step 1336. If output buffer 522 can be expanded, the routine allocates memory space thereto to increase its size, at step 1334.

Following step 1334, or it output buffer 522 is not found to be full at step 1332, the IOCTL routine copies the pointed-to-data into output buffer 522, at step 1337. The routine then checks port control register 507 to determine if a PC 10 may be asleep waiting to read from this port, at step 1338. If so, the routine wakes up any sleeping PC 10, at sep 1339, by calling the wakeup function of operating system 30; if not, or following step 1339, the routine returns with the number of bytes copied into output buffer 522, at step 1340.

An IOCTL (Read) call reads data from a specified port 501. This call also includes as an argument a pointer to the read/write structure. The IOCTL routine accesses input buffer 521 of designated port 501, at step 1341, and checks it, at step 1342. If input buffer 521 is empty, the IOCTL routine returns a return code indicating "zero bytes copied", at step 1346.

If input buffer 521 is not found to be empty at step 1342, the IOCTL routine copies data from input buffer 521 into a pointed-to memory area, at step 1347. The routine then checks port control register 507 to determine if a PC 10 may be asleep waiting to write to this port, at step 1348. If so, the routine wakes up the sleeping PC 10, at step 1349, by calling the wakeup function of operating system 30; if not, or following step 1349, the routine returns with the number of bytes copied into input buffer 521, at step 1350.

An IOCTL (Flush) call frees a port 501 for use by another PC 10. The call causes the IOCTL routine to access per-port information 504 of a port 501 identified as an argument, at step 1380. Using pointers 505 and 506, the routine accesses input buffer 521 and output buffer 522 of that port and clears their contents, at step 1381. The routine also sets contents of port control register 507 and port mask register 508 of that port to default values, at step 1382. The routine then frees that port 501, at step 1383, by breaking the association between that port 501 and a PC 10 (that was established at step 906 of FIG. 9), and deallocating the port by returning its number to unused port list 503. The routine then returns, at step 1384.

Port control register 507 provides a means for specifying what action will be taken on a PC 10 when the PC does something to port 501. Register 507 is set by means of an IOCTL (Set-Port-Control) call, which includes as an argument a pointer to a port-control data structure. The port-control structure includes the port ID of affected port 501 and the new contents of that port's control register 507. The call causes the IOCTL routine to access control register 507 of designated port 501, at step 1355, and to set its contents to the designated new value, at step 1356. The routine then returns, at step 1357.

Port mask register 508 provides a means for specifying what action will be taken on request server 32 when a PC 10 does something to port 501. Register 508 is set by means of an IOCTL (Set-Port-Mask) call, which includes as an argument a pointer to a port-mask data structure. This structure includes the port ID of affected port 501 and the new contents of that port's mask register 508. The call causes the IOCTL routine to access mask register 508 of designated port 501, at step 1358, and to set its contents to the designated new value, at step 1359. The routine then returns, at step 1360.

Global mask register 509 provides a means for overriding port mask register 508. Register 509 is looked-to first to determine what action is to be taken. Register 509 is set by means of an IOCTL (Set-Glbl-Mask) call, which contains the new register 509 contents as an argument. The call causes the IOCTL routine to access global mask register 509, at step 1362, and to set its contents to the designated new value, at step 1363. The routine then returns, at step 1364.

Register 509 is read by means of an IOCTL (Get-Glbl-Mask) call, which includes as an argument a pointer to a buffer into which register 509 contents are to be returned. The call causes the IOCTL routine to access global mask register 509, at step 1366, and to copy register 509 contents into the designated buffer, at step 1367. The routine then returns, at step 1368.

An IOCTL (Get-Port-Status) system call allows request server 32 to query driver 31 about the state of its ports 501. The call includes as an argument a pointer to a port-status data structure that includes fields for the port number of a port 501 being queried, the state of port 501, the contents of port control register 507, the contents of port mask register 508, the number of bytes of data in the port's input buffer 521, and the number of bytes of data in the port's output buffer 522. The port number is filled in by request server 32. In response to the call, the IOCTL routine access per-port information 504 of the designated port 501, at step 1369, copies the relevant contents thereof into the fields of the port-status data structure, at step 1370, and then returns, at step 1371.

An IOCTL (Get-Global-Status) system call allows request server 32 to query driver 31 about the driver's global state. The call includes as an argument a pointer to a glbl-status data structure that includes fields for the size of free buffer pool 520, the number of free ports 501, the size of input buffers 521, and the size of output buffers 522. In response to the call, the IOCTL routine accesses the driver global information, at step 1373, copies the information into the glbl-status data structure, at step 1374, and then returns, at step 1375.

Request Server (FIGS. 16–25)

Request server 32 is an application-level interface between driver 31 and processes such as NETSVR 33 and APISVR 34 that provide requested services across the network of computers 11 and 12. Though it runs at user-level, internally it is structured like an operating system. Through driver 31, request server 32 has direct access to operating system 30 kernel functions, such as sleep and wakeup, that are typically unavailable to user-level processes. Request server 32 augments UNIX operating system calls with other functions to support file and resource serving. The job of request server 32 is to accept service requests from PCs 10 (and from other processes) forwarded by driver 31, to interpret and to project actions that must be taken as a result of these requests, and to schedule and perform these actions on behalf of PCs 10.

Figure 16:
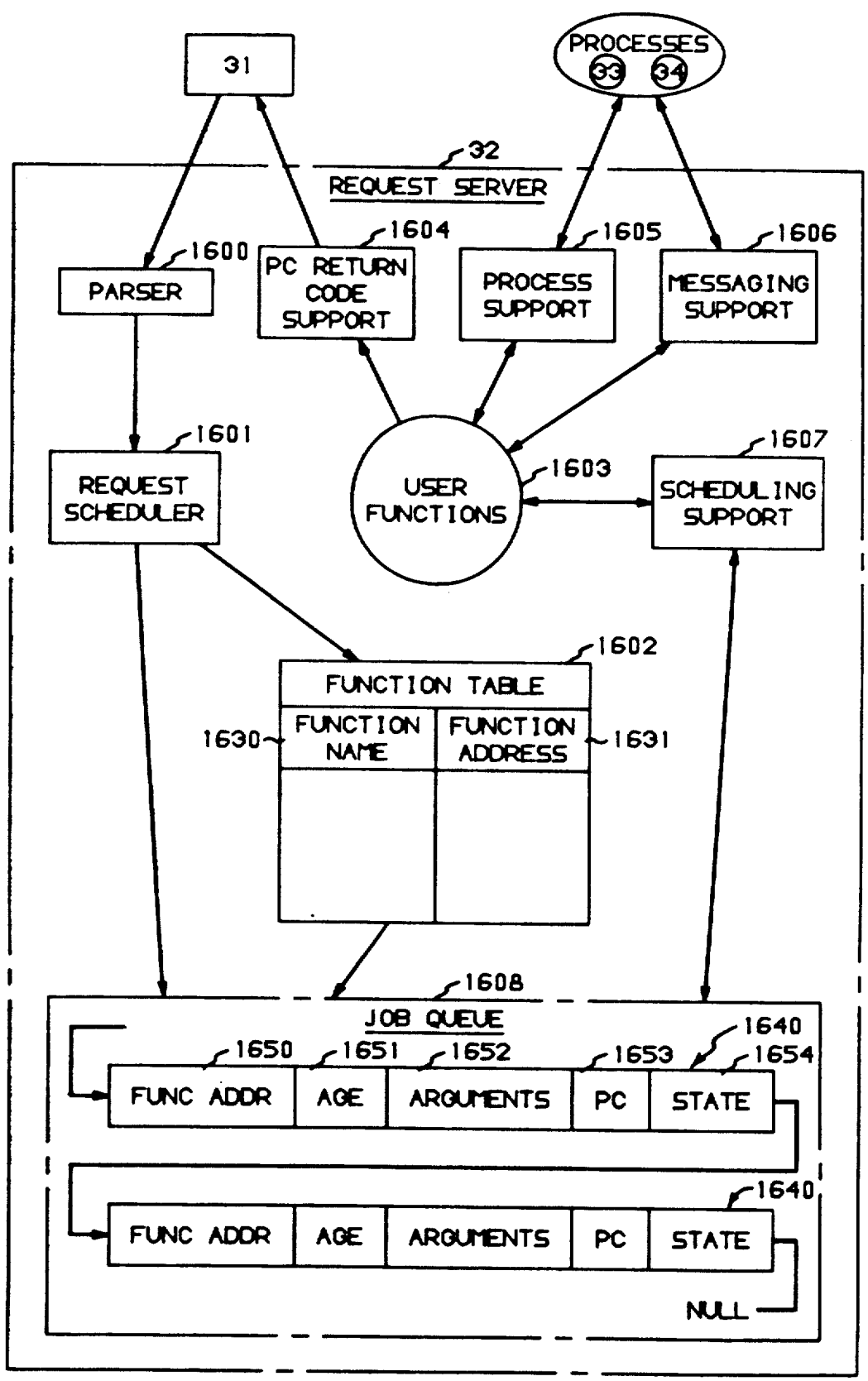
FIG. 16 is a block diagram of the request server of an intermediate computer of FIG. 1.
Figure 17:
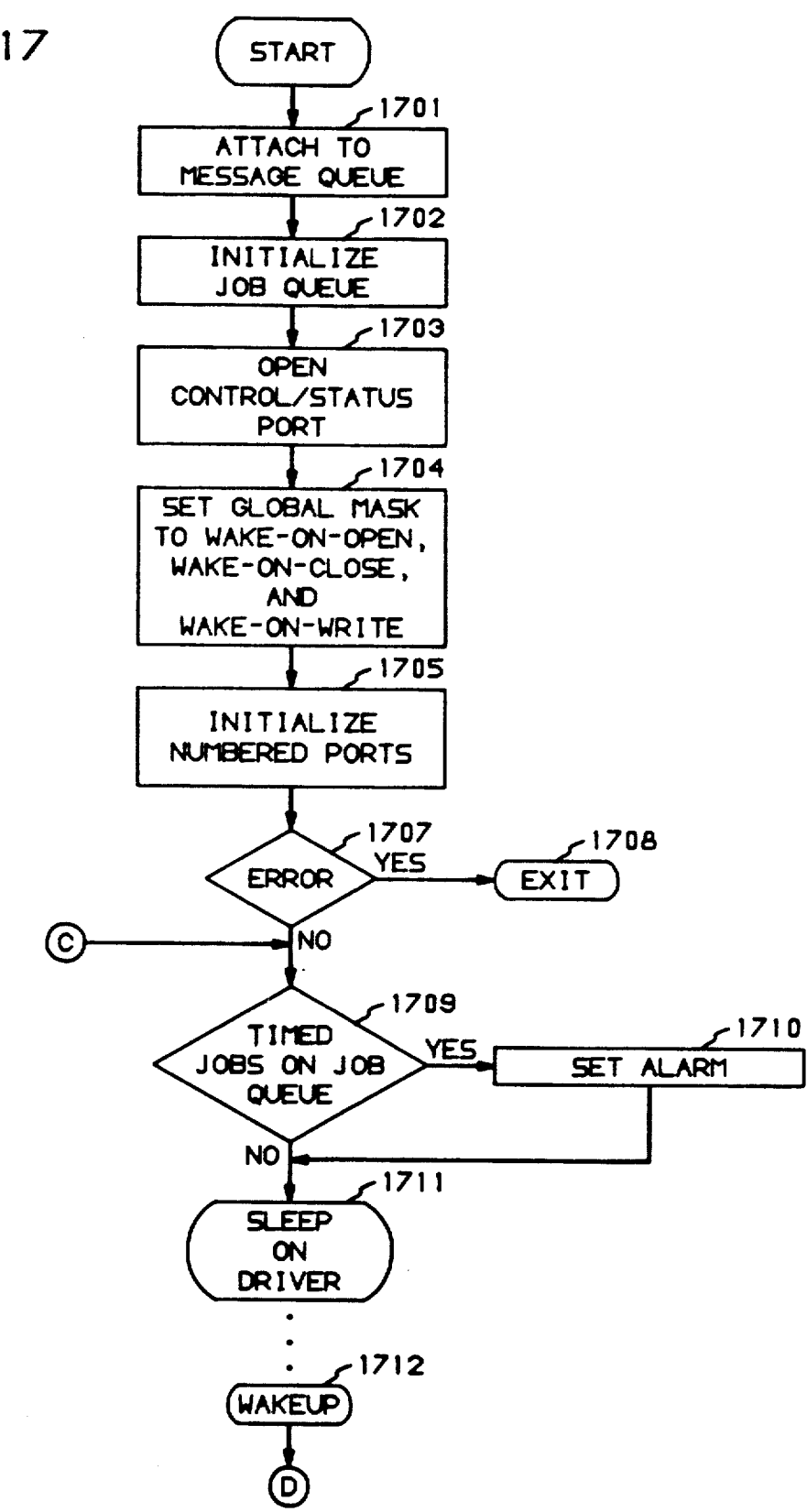
FIGS. 17-20 are a flow diagram of the request scheduler of the request server of FIG. 16.
Figure 18:
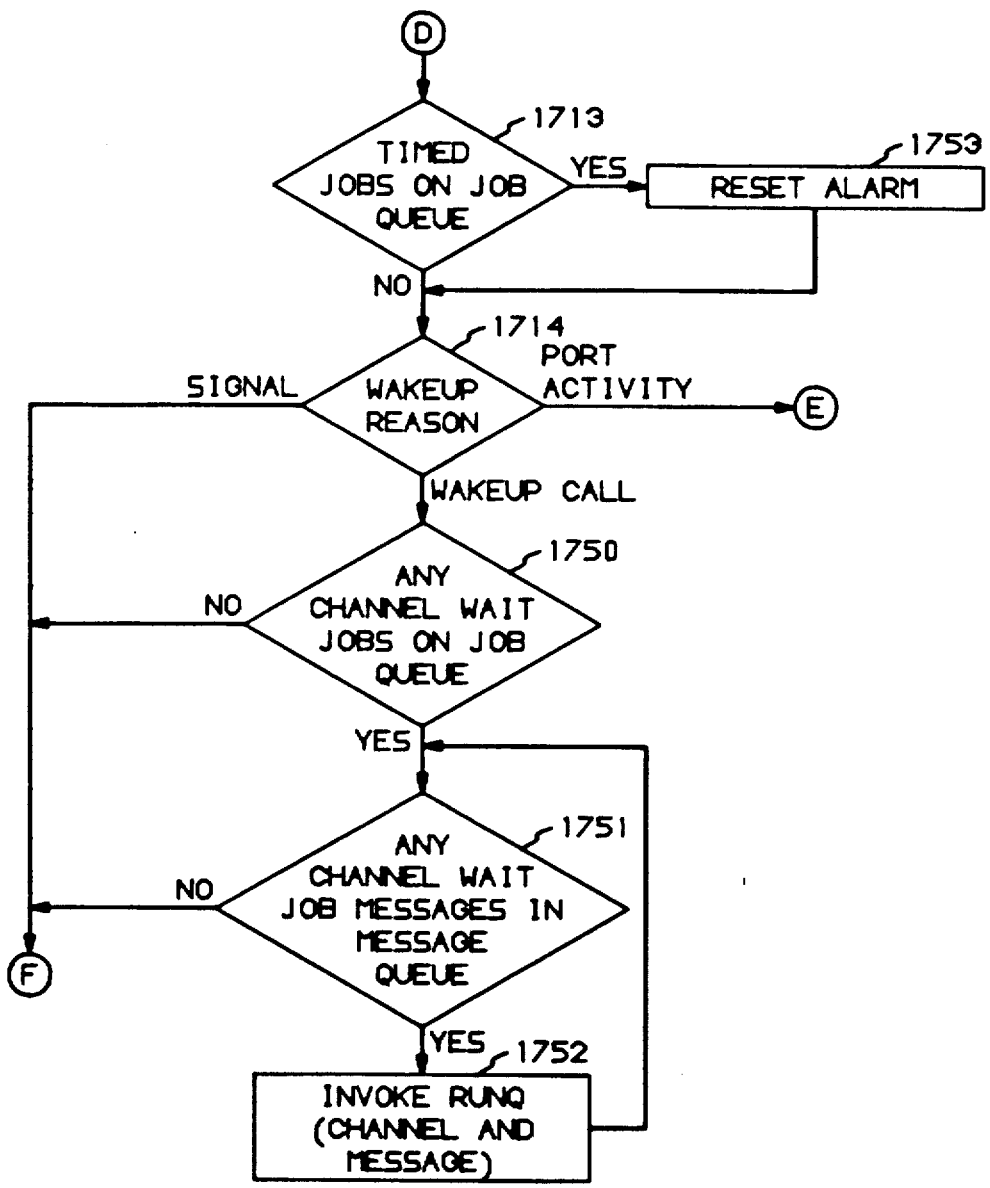
Figure 19:
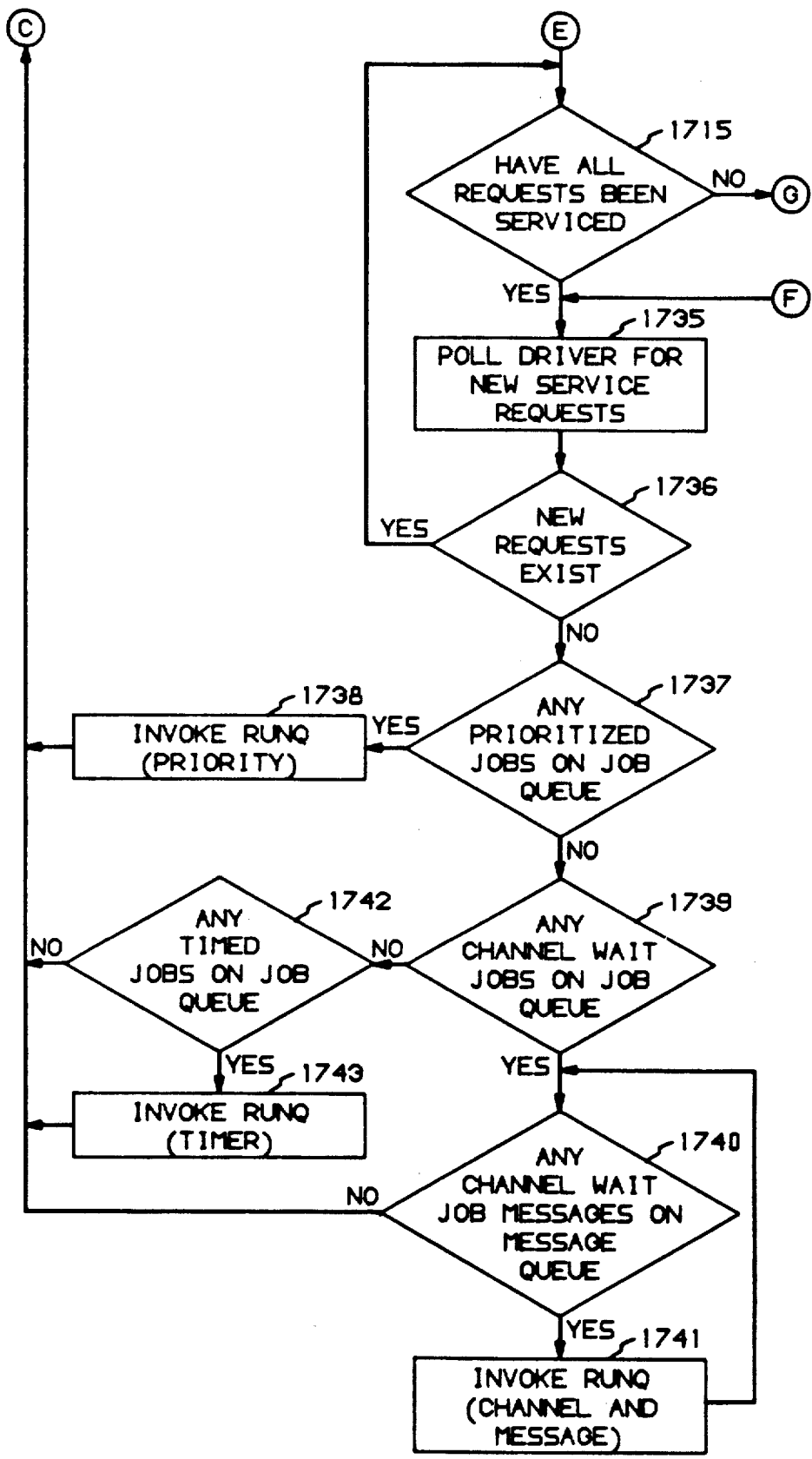
Figure 20:
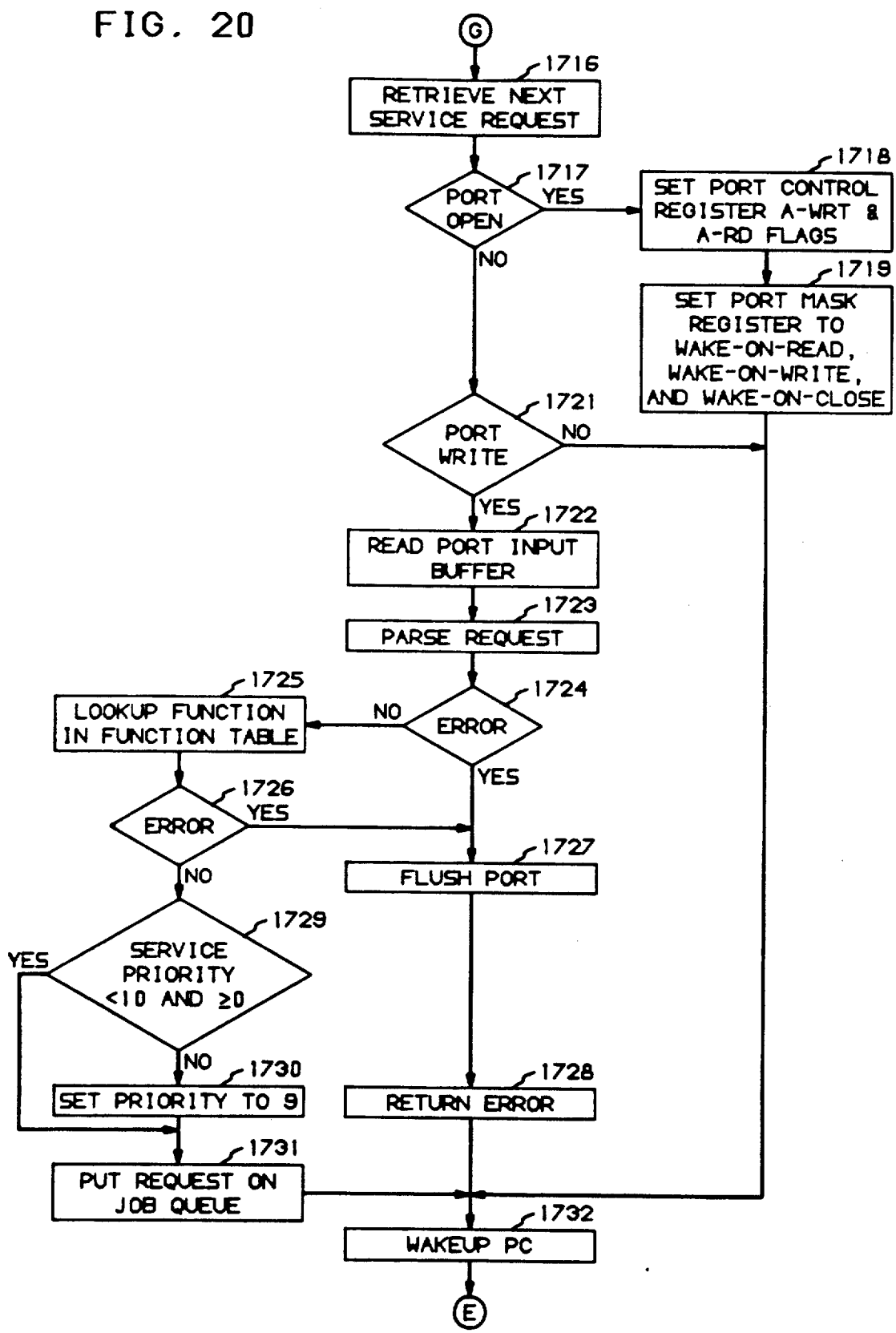

As shown in FIG. 16, request server 32 includes: a parser 1600 which dissects received requests into their component fields, in a conventional manner; a request scheduler 1601 which runs in a loop to store incoming parsed requests in a job queue 1608 and schedules stored jobs for execution; a function table 1602 which stores the addresses of various functions for purposes of reference and calls by request scheduler 1601; user functions 1603 which perform the actual work requested by PCs 10; PC return code support functions 1604 for returning status information from request server 32 to PCs 10; process support functions 1605 which allow user function 1603 to start new processes; messaging support functions 1606 for inter-process communication between request server 32 and other processes such as NETSVR 33 and APISVR 34; and scheduling support functions 1607 for those user functions 1603 which need to remain in the system for an extended period of time or that require periodic invocation at the application level.

Function table 1602 contains function names 1630 and associated function addresses 1631 of user and support functions in a one-to-one correspondence. Function names of requests received from parser 1600 are looked up in table 1602 by request scheduler 1601 and the associated function addresses are stored in job queue 1608. A null namer pointer terminates table 1602; it has an error routine associated therewith, which is called when a requested function is not found in table 1602.

The error routine returns an error message to requesting PC 10.

PC return code support functions 1604 allow return of status to ports 501. A PCRETURN routine returns information to output buffer 522 of a numbered port 501 and wakes up the associated PC 10 if the character count specified by a service request does not correspond with the number of characters loaded into output buffer 522. It is called with arguments specifying a numbered port 501 and a pointer to a data string to be loaded into the port's output buffer 522. Routine PCWAKEUP wakes up PC 10 and returns the character count of output buffer 522 contents regardless of its correspondence with the count specified by the service request. It is called with an argument specifying a numbered port 501.

Process support functions 1605 comprise a STARTPROC routine which allows a user function to conventionally FORK and EXEC another process running under operating system 30. The STARTPROC routine is called with PROC-NAME, NUM-ARGS, (NO)-WAIT, AND ARG(S) as arguments. The PROC-NAME is looked for in the PATH variable in the conventional operating system 30 environment, and is executed. The NUM-ARG(S) gives the total number of ARG(S) to be passed to the command. As many ARG(S) may be passed as desired. The (NO)WAIT specifies whether or not to wait for the process to finish executing. WAIT means wait until the process has finished: NOWAIT indicates spawn the process and immediately return. The WAIT option returns the return code from the finished process. If the NOWAIT option is set, upon return either the process number of the new process or a failure code is returned to the calling function. In addition, STARTPROC causes the conventional SIGCLD signal of operating system 30 to be ignored, so that zombie processes will not be created by this call.

Messaging support functions 1606 provide a conventional operating system 30 message queue-based interface between request server 32 and other processes such as a NETSVR 33 and APISVR 34. Messaging support functions 1606 includes a SENDMESSAGE routine which receives as arguments a channel number (described below), and a message of any length that is to be sent through that channel to a process. There is no need for a receive message function, since receiving is taken care of by the channel wait job mechanism, described below.

Job queue 1608 is structured as a linked list of entries 1640, each one of which defines a job such as a PC 10 request. Each entry 1640 comprises a plurality of fields 1650-1654 into which parser 1600 dissects each received request. Function address field 1650 contains the address, obtained from table 1602, of a function that corresponds to the request. Arguments field 1652 contains a pointer to a string consisting of the arguments being passed to the function. PC field 1653 identifies numbered port 501 that is the source of the job. State field 1654 identifies the job type: prioritized, timed, or channel wait. And the meaning of age field 1651 depends upon the job type as identified by field 1654. For a prioritized job, age field 1651 holds the job's priority number; for a timed job, age field 1651 holds the time when the job is to be run; and for a channel wait job, age field 1651 holds the corresponding channel number.

Prioritized jobs include all service requests incoming from patches 21 of PCs 10. They are automatically designated as such when they are generated by patches 21. Illustratively, patches 21 automatically assign to basic service requests a predetermined priority. In this illustrative example, PC service requests are assigned a priority of 1. Prioritized jobs are placed on job queue 1608 by request scheduler 1601 through invocation of a PUTQ function of scheduling support functions 1607. When selected for execution based on priority, they are removed from job queue 1608. When the function specified by field 1650 is called, it receives as arguments fields 1652 and 1653.

Timed jobs are called on the basis of real time. These jobs are placed in job queue 1608 by a user function 1603 through invocation of a TIMEOUT function of scheduling support functions 1607. The format through which a timed job is invoked includes the wait time, the name of a function to be called on expiration of the time, the number of a port 501 that is invoking this function, and a pointer to a user-initialized string which may contain anything that needs to be passed to the called function on invocation. The function is removed from job queue 1608 after the wait time has expired, and that indicated function is then executed. Functions which are to remain in job queue 1608 must be rescheduled by action of the timed-out function.

Channel wait jobs are those which are waiting for occurrence of an event, usually one external to request server 31. They are set-up as responses to prioritized jobs by user functions 1603: a prioritized job representing a PC 10 request invokes a user function 1603 that may spawn one or more channel wait jobs to await completion of asynchronous tasks, while completion of an asynchronous task (indicated when a message for that channel arrives in the message queue) causes the responding portion—the channel wait job—to be invoked.

The format through which a channel wait job is invoked includes the name of the function to be called when the event occurs, a channel number, the number of port 501 that is waiting (sleeping) on the job, and a pointer to a string of information to be passed to the called function on invocation. A channel number is merely a unique number that serves to uniquely identify a job in the message queue of the message queue-based interface provided by messaging support functions 1606. Scheduling support functions 1607 include a GETCHANNEL function that may be called to return a unique channel number. Illustratively, GETCHANNEL generates unique channel numbers simply by starting with a number and incrementing it each time that GETCHANNEL is called. A channel wait job is placed in job queue 1608 by a user function 1603 through invocation of a CHANNEL function of scheduling support functions 1607. Besides occupying age field 1651 in a job queue 1608 entry 1640, the channel number is used as the message type in the message queue. When a message is received in the message queue with a type matching the channel number of a channel wait job, that channel wait job is run and is removed from job queue 1608.

Request scheduler 1601 is responsible for arranging priorities on incoming requests, invoking appropriate user functions 1603, and handling job queue 1608 and associated states. When awakened by occurrence of an asynchronous event, request scheduler checks for receipt by driver 31 of new requests, places the new requests on job queue 1608, and runs jobs from job queue 1608 that are appropriate to be run in response to occurrence of the particular event. Request scheduler 1601 is diagramed in FIGS. 17-20.

At initialization, scheduler 1601 uses messaging support functions 1606 to attach request server 32 to the message queue, at step 1701, in a conventional UNIX system manner. Scheduler 1601 also initializes job queue 1608, at step 1702. Scheduler 1601 then opens control/status port 502, at step 1703, and by means of an IOCTL call sets global mask register 509 to awaken request server 32 on numbered port 501 open, close, and write operations, at step 1704. In addition, scheduler 1601 initializes all numbered ports 501 of driver 31, at step 1705. Activities performed here include setting the size of input buffers 521 and output buffers 522, and setting port control registers 507 to sleep on open, sleep on close, sleep on read if output buffer 522 is empty, do not sleep on write if input buffer 521 is full, and to return conventional codes.

If at any time during the initialization procedure of steps 1701-1705 scheduler 1601 detects an error, it exits, as suggested by steps 1707-1708.

After initialization, scheduler 1601 uses scheduling support functions 1607 to check for presence of timed jobs on job queue 1608, at step 1709. If such jobs were to exit on queue 1608, request server 32 would set an alarm, at step 1710, via the conventional UNIX system signaling method. However, job queue 1608 was just initialized, so no jobs exist thereon, and scheduler 1601 puts request server 32 to sleep on driver 31 to await numbered port 501 activity, at step 1711, by means of an IOCTL (Sleep) call.

Request server 32 is awakened, at step 1712, by activity on a numbered port 501 or the posting of a wakeup call to driver 31 control/status port 502. Upon waking up, scheduler 1601 uses scheduling support functions 1607 to check for presence of timed jobs on job queue 1608, at step 1713. If timed jobs are present, scheduler 1601 resets the standard UNIX system ALARM function, at step 1753, by means of the SIGALRM signal, in order to prevent the alarm from going off while scheduler 1601 is performing subsequent activities. After step 1753, or if no timed jobs are present on job queue 1608, scheduler 1601 checks a value returned to it as part of the wakeup to determine what caused it to be awakened, at step 1714.

If the returned value is greater than 0, it means that request server 32 was awakened as a result of activity on a numbered port 501. Scheduler 1601 therefore checks contents of the ready-process structure associated with the sleep, which contains contents of driver 31 service queue 530, to determine if it is empty, that is, if all requests have been serviced, at step 1715. Since servicing of requests has not commenced at this point, all requests will not have been serviced, so scheduler 1601 proceeds to step 1716.

At step 1716, scheduler 1601 retrieves from the ready-process structure the next service request. Scheduler 1601 then checks the reason field of the request to determine what port activity caused the wakeup, at steps 1717 and 1721.

If it is found, at step 1717, that the wakeup was caused by a port "open" call, scheduler 1601 uses IOCTL (Set Port Control) call to set A-WRT and A-RD flags 601 and 602 of port control register 507 of requesting port 501, to put PC 10 associated with that port 501 to sleep on writes if the port's input buffer 521 is full and on reads if the port's output buffer 522 is empty, at step 1718. Scheduler 1601 also sets port mark register 508 to wakeup request server 32 on reads, writes, and closes of that port 501, at step 1719. Scheduler 1601 then issues an IOCTL (Wakeup) call to requesting port 501, at step 1732.

If it is found at step 1721 that the wakeup was caused by a port "write" call, scheduler 1601 uses IOCTL (Read) call to read input buffer 521 of requesting port 501, at step 1722, in order to obtain a PC request therefrom. Scheduler 1601 calls on parser 1600 to parse the request, at step 1723, and checks whether parser 1600 reports any errors, at step 1724. If parser 1600 reports error, scheduler 1601 uses an IOCTL (Flush) call to clear out buffers 521 and 522 of requesting port 501, at step 1727, and uses an IOCTL (Write) call to write an error notice for PC 10 into output buffer 522 of requesting port 501, at step 1728.

If parser 1600 reports no error at step 1724, and instead passes the parsed request to scheduler 1601, scheduler 1601 looks up the requested user function in function table 1602, at step 1725. If it does not find it in table 1602, as indicated at step 1726, scheduler 1601 proceeds to steps 1727 and 1728 to flush buffers 521 and 522 of requesting port 501 and to return an error notice to the user. If it finds the requested user function in table 1602, scheduler 1606 checks the value of age field 1651 of the request—which contains the priority of the request—to determine its validity, at step 1729. If the priority value is not less than 10 and greater than or equal to 0, it is invalid, but scheduler 1601 merely sets it to a value of 9, at step 1730, which is the lowest priority. If the priority is found to be valid at step 1729, or following step 1730, scheduler 1601 calls on scheduling support function PUTQ to place the request on job queue 1608, at step 1731.

PUTQ responds by calling on operating system 30 to allocate memory space for a new queue entry 1640, fills entry fields with request information, links the new entry to the list of jobs that make up job queue 1608, and administers any global variables associated with job queue 1608.

Following the above-described activities performed for port opens and writes, or if it is found at step 1717-1720 that the wakeup was caused by port activity other than an open or a write (that is, by a port read or a port close), scheduler 1601 issues an IOCTL (Wakeup) call to requesting port 501 to wakeup any entity, such as a PC 10, sleeping thereon, at step 1732. Scheduler 1610 then returns to step 1715 to determine if all pending requests have been serviced.

If scheduled 1601 finds at step 1715 that all pending requests indicated by the sleep ready-process structure have been serviced, it issues an IOCTL (Poll) call to driver 31 to determine if any new requests have been made since scheduler 1601 was woken up, at step 1735. Just as did IOCTL (Sleep, IOCTL (Poll) returns contents of service queue 530 in the ready-process structure. Scheduler 1601 then checks contents of the structure to determine if there are new service requests, at step 1736. If so, scheduler 1601 returns to steep 1715 to service these requests.

If there are no new service requests, as determined at step 1736, scheduler 1601 checks whether job queue 1608 contains any prioritized jobs, at step 1737. Illustratively, it does so by checking the global variables maintained by PUTQ, mentioned above. If it finds that prioritized jobs exist, it invokes a RUNQ routine of scheduling support functions 1607, passing to it a job type of PRIORITY as an argument, at step 1738, to cause the prioritized jobs to be run. Routine RUNQ is diagramed in FIG. 21.

IF it finds at step 1737 that there are no prioritized jobs, scheduler 1601 checks whether job queue 1608 contains any channel wait jobs, at step 1739. If so, scheduler 1601 checks the message queue to determine if it contains any messages for channel wait jobs, at step 1740. Illustratively, it does so by calling a messaging support function 1606, which then searches through the message queue and returns the first message that it finds addressed to request server 32. If there are messages for channel wait jobs in the message queue (that is, a message is returned to scheduler 1601), scheduler 1601 invokes the RUNQ routine of FIG. 21 and passes to it a job type of CHANNEL and the received message as arguments, at step 1741. When RUNQ returns, scheduler 1601 returns to step 1740 to check whether there are more messages for channel wait jobs in the message queue.

If job queue 1608 is found at step 1739 to contain no channel wait jobs, scheduler 1601 checks whether job queue 1608 contains any timed jobs, at step 1742. If so, scheduler invokes the RUNQ routine of FIG. 21 and passes to it a job type of TIMER as an argument, at step 1743.

If there are no timed jobs on job queue 1608, or if no message for a channel wait job is found in the message queue at step 1740, or following return of RUNQ at step 1738 or 1743, scheduler 1601 returns to step 1709 to set the alarm for any timed jobs that may exist and to go back to sleep on driver 32.

If the value returned to scheduler 1601 at step 1714 as part of request server 32 wakeup is equal to 0, it means that request server 32 was awakened as a result of a "wakeup" call made on control/status port 502. An IOCTL (Wakeup) call identifying control/status port 502 may be issued to control/status port 502 at any time to wake up request server 32. Using this method, another process in the system that wants request server 32 to read the message queue may wake it up. This allows an asynchronous event to trigger immediate service to processes performing various functions.

In response to the wakeup call, scheduler 1601 checks, at step 1750, whether job queue 1608 contains any channel wait jobs. If so, scheduler 1601 checks the message queue to determine if it contains any messages for channel wait jobs, at step 1751. If so, scheduler 1601 invokes the RUNQ routine of FIG. 21 and passes to it a job type of channel and the found message as arguments, at step 1752. When RUNQ returns, scheduler 1601 returns to step 1751 to check whether there are more messages for channel wait jobs in the message queue.

If job queue 1608 is found at step 1750 to contain no channel wait jobs, or when no messages for channel wait jobs are found in the message queue at step 1751, scheduler 1601 proceeds to step 1735 to poll driver 32 for new service requests.

If the value returned to scheduler 1601 at step 1714 as part of request server 32 wakeup is less than 0, it means that request server 32 was awakened as a result of receipt of a signal, such as the timed job alarm timing out. As a result of having timed out, the ALARM function will have called the RUNQ routine of FIG. 21 with TIMER as an argument, so timed-out timed jobs will have been run, and nothing remains for scheduler 1601 to do but to eventually restart the ALARM function at step 1709. Before returning to step 1709, however, scheduler 1601 proceeds to step 1735 to poll driver 32 for new service requests.

Figure 21:
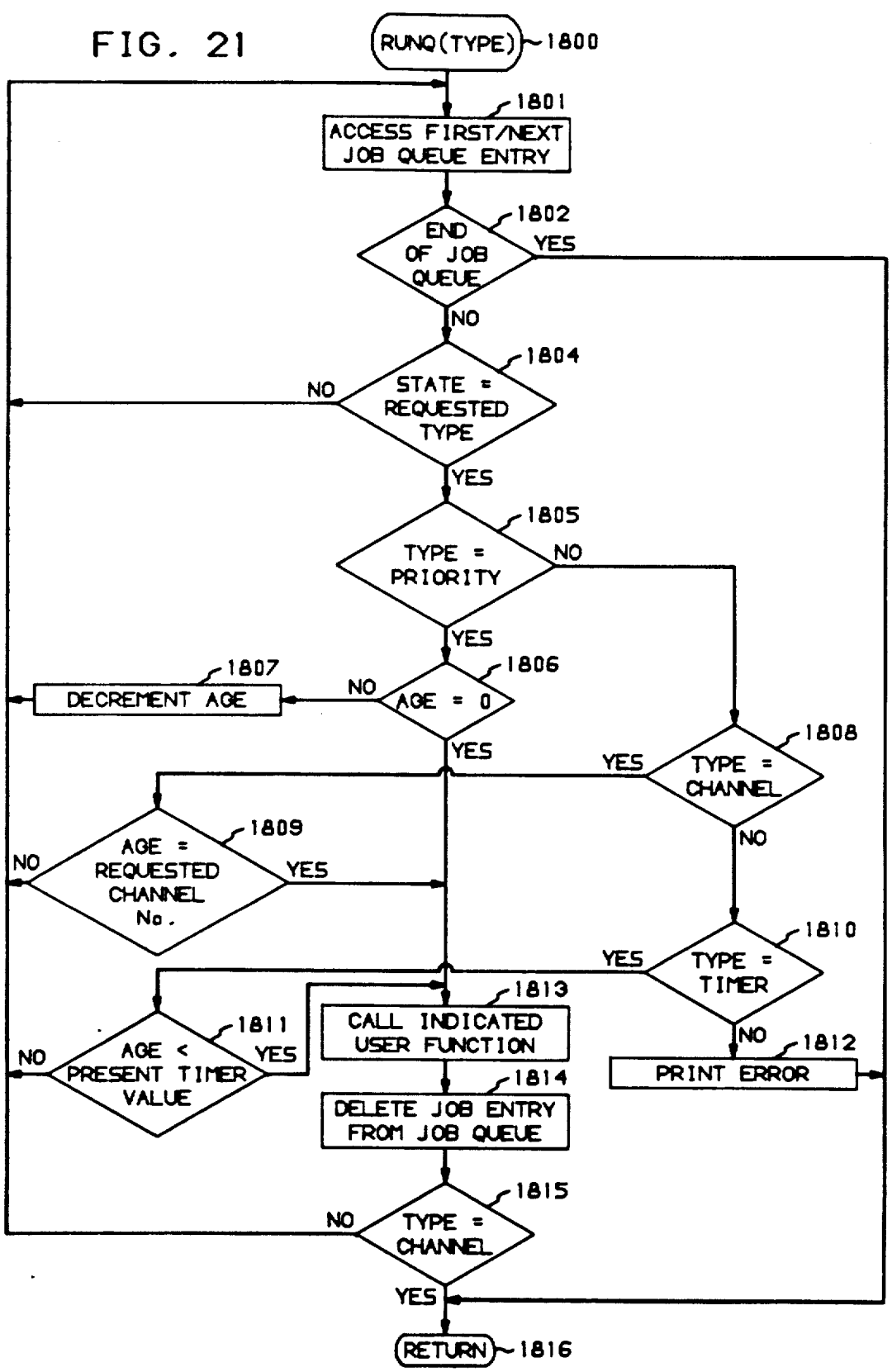
FIG. 21 is a flow diagram of a RUNQ routine of the scheduling support functions of the request server of FIG. 16.

FIG. 21 flowcharts the RUNQ routine. Upon being called, at step 1800, with a job type as an argument, RUNQ searches job queue 1608 for the requested job and, upon finding it, runs it. Starting with the first entry 1640 at the beginning of job queue 1608, RUNQ sequentially accesses a queue entry 1640, at step 1801, and checks whether it is a null entry, that, is whether this is the end of job queue 1608, at step 1802. If so, RUNQ merely returns, at step 1816.

If the accessed entry 1640 is not a null entry, RUNQ checks the contents of state field 1654 thereof to determine whether it identifies the job to be of the type that was passed to RUNQ as an argument, at step 1804. If not, RUNQ returns to step 1801 to retrieve and examine the next sequential queue entry 1640. But if the job is of the desired type, further activity of RUNQ depends on the type of job it is, as suggested by steps 1805, 1808, and 1810.

If the job is a prioritized job, as determined at step 1805, RUNQ checks the entry's age field 1651 which contains the job's priority, to determine if it is zero, at step 1806. If not, RUNQ decrements age field 1651, at step 1807, to heighten the job's priority, and returns to step 1801 to retrieve and examine the next sequential queue entry 1640. If the job priority is zero, RUNQ calls the one of the user functions 1603 that is identified by function address field 1650 of entry 1640 to run the job, at step 1813, passing to it arguments field 1652 and PC field 1653 as arguments. RUNQ then deletes that entry 1640 from job queue 1608 at step 1814. As suggested in step 1815, if the run job is a channel wait job, RUNQ returns to scheduler 1601, at step 1816; otherwise RUNQ returns to step 1801 to retrieve and examine the next sequential job queue entry 1640.

If the job is a channel wait job, as determined at step 1808, RUNQ checks the entry's age field 1651, which contains the job's channel number, to determine if it matches the channel number that RUNQ receives as an argument. If so, RUNQ proceeds to step 1813 to run the channel wait job; if not, RUNQ returns to step 1801 to retrieve and examine the next sequential job queue entry 1640.

If the job is a timed job, as determined at step 1810, RUNQ checks the entry's age field 1651, which indicates the time at which the job is to be run, and compares it with the present value of the alarm timer, at step 1811. If the timer value exceeds the age field value, it is not yet time to run the job, so RUNQ returns to step 1801 to retrieve and examine the next sequential job queue entry 1640. Otherwise, RUNQ proceeds to step 1813 to run the timed job.

If the job is no known type, RUNQ logs and prints an error on a display console, at step 1812, and then returns to scheduler 1601, at step 1816.

User functions 1603 vary from system to system. They are provided to meet the needs of the particular system based on system structure and the application that it is being put to. However, for purposes of completeness of system description, illustrative examples of these functions are briefly described below.

Figure 22:
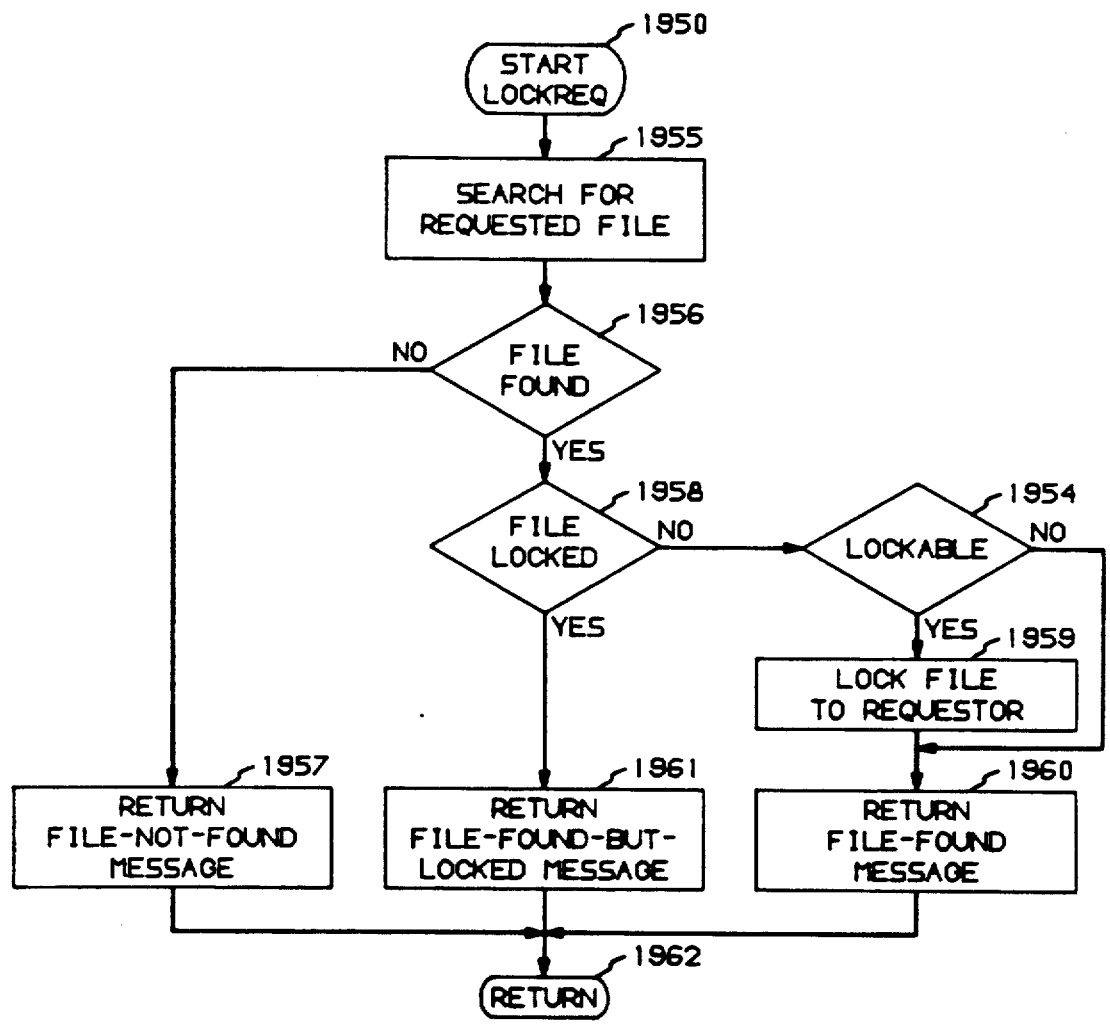
FIG. 22 is a flow diagram of a LOCKREQ function of the user functions of the request server of FIG. 16.

A LOCKREQ user function, flowcharted in FIG. 22, is invoked by request scheduler 1601 in response to a LOCKREQ request, at step 1950. The function searches for the requested file in the local file system, at step 1955. If the file is not found, at step 1956, the LOCKREQ function calls on functions 1604 to return a "file not found" message to the requesting PC 10, at step 1957, and then returns, at step 1962.

If the file is found at step 1956, the LOCKREQ function checks whether it is locked to a user, at step 1958. If the file is locked, the function calls on functions 1604 to return a "file found but locked" message to the requesting PC 10, at step 1961, and then returns, at step 1962.

If the file is found not to be locked at step 1958, the LOCKREQ function checks the file's descriptive information to determine whether the file is a lockable file, at step 1954. If so, the function locks it, at step 1959, illustratively by associating the ID of the requesting PC 10 with the file in the filesystem. Following step 1959, or if the file is found to not be lockable at step 1954, the LOCKREQ function then calls on functions 1604 to return a "file found" message to the requesting PC 10, at step 1960, and then returns, at step 1962.

An UNLOCKREQ user function (not shown) is invoked by request scheduler 1601 in response to an UNLOCKREQ request. As was explained in conjunction with patch 21, this request is generated by patch 21 when a PC 10 user program 200 exits. The FILENAMES of all files locked to a exiting user program 200 accompany the request and are passed to the UNLOCKREQ function as arguments. The UNLOCKREQ function searches for the files in the local filesystem and unlocks them, illustratively by deassociating the present owner ID from the files and instead associating a default owner ID with each of the files.

The NETGET user function is invoked by a RESRCGET function (FIG. 24), or by request scheduler 1601 when it becomes ready to process a job queue 1608 entry 1640 comprising a NETGET request from a PC 10. The structure of the NETGET function substantially resembles the structure of the SNAGET function, which is invoked by request scheduler 1601 when it becomes ready to process a job queue 1608 entry 1640 comprising a SNAGET request from a PC 10. Consequently, both the SNAGET and the NETGET function are illustrated jointly by FIG. 23.

If this is the first NETGET request processed by request server 32, as determined as step 1901, no NETSVR 33 requestor process exists, and so the user function must create it. Similarly, if this is the first SNAGET request processed by request server 32, no APISVR 34 process exists, and so the user function must create it. The user function first allocates a channel by calling the GETCHANNEL routine of scheduling support functions 1607, at step 1902. Then, by means of a call to process support functions 1605, the user function creates the server process 33 or 34, at step 1903, and passes to it as arguments an ID of the message queue of messaging support functions 1606 and the channel ID that it obtained from GETCHANNEL to use for communications outbound from request server 32 to the newly-created server process 33 or 34, at step 1904.

Now that server process 33 or 34 has been created, or if it has been found to exist at step 1901, a request may be sent thereto. A call is made to GETCHANNEL to allocate another channel, at step 1905, to handle communications inbound from server process 33 or 34. The user function then examines the request, at step 1906, parsing it to derive arguments therefrom and to determine what type of action will be required when server process 33 or 34 finishes serving the request. The user function then selects another user function and creates therefrom a channel wait job to await the return of a communication from server process 33 or 34, at step 1907. The user function then calls the CHANNEL routine of scheduling support functions 1607 to place the channel wait job on job queue 1608, at step 1908. The inbound channel ID is placed in the job's AGE field 1651. The user function calls upon messaging support functions 1606 to call server process 33 or 34 over the outbound channel and to pass the request and the inbound channel ID to server process 33 or 34 as arguments, at step 1907. Finally, the user function returns to request scheduler 1601, at step 1910.

When server process 33 or 34 is done with its task, it returns a message of type CHANNEL in the message queue, and issues an IOCTL (Wakeup) call to port 502 of driver 31 to wake up anything sleeping on port 502.

As was described previously in FIG. 18, the wakeup call causes scheduler 1601 to run the channel wait job, at step 1920, that is associated with that channel, including calling the user function identified by that channel wait job, at step 1921, to service the return message. When the function is completed, it uses return code support functions 1604 to return status back to the requesting PC 10, at step 1922, and then returns to request scheduler 1601, at step 1923.

As was described in conjunction with patch 21, the printer request that is written into driver 32 by the LPT process illustratively takes the form "RESRC 1 LPT 1 FILENAME", where RESRC is a command specifying a user function 1603 which is to be called as a prioritized job having a priority of 1, LPT is a command specifying a function to be called on other intermediate computers 11, which is to be called as a prioritized job having a priority of 1, and FILENAME is the name of the file that is to be printed.

The printer request is an illustrative example of a resource request. Resource requests may originate with PCs 10 or processes running on intermediate computers 11. They take the form of the resource-request identifier RESCR and a priority, followed by a resource-class identifier (of which LPT is an example) and a priority, followed by arguments and, optionally, subclass identifiers.

When request server 32 is ready to process a job comprising a resource request, request scheduler 1601 calls a RESRCGET function of user functions 1603 and passes to it the subclass and arguments portion (e.g., the "LPT 1 FILENAME" portion) of the request as an argument. The RESRCGET function is diagramed in FIG. 24.

Figure 23:
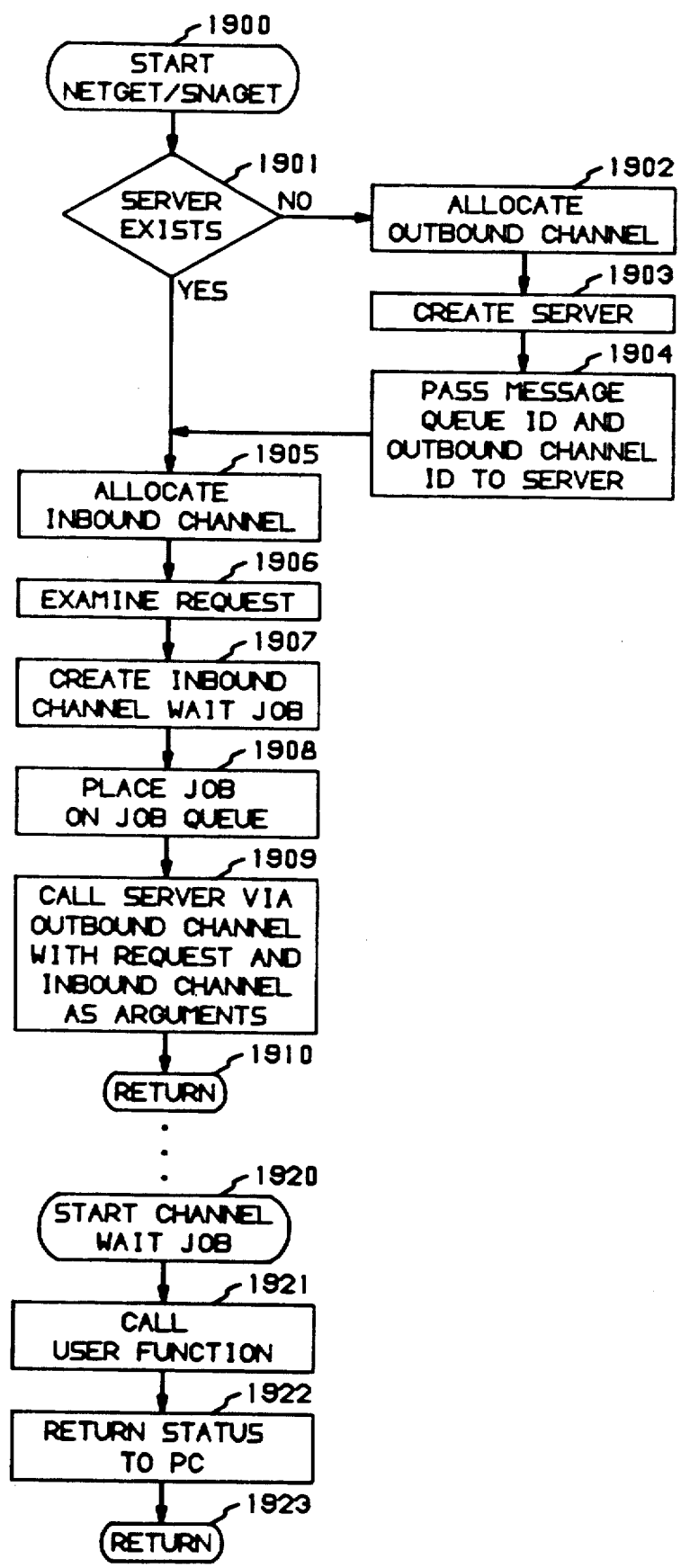
FIG. 23 is a flow diagram of NETGET and SNAGET functions of the user functions of the request server of FIG. 16.
Figure 24:
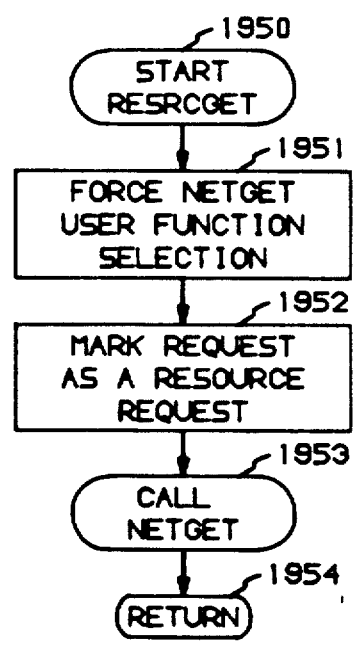
FIG. 24 is a flow diagram of a RESRCGET function of the user functions of the request server of FIG. 16.

Upon being invoked, at step 1950, RESRCGET sets a variable which is passed to the NETGET user function of FIG. 23 to a particular value, in order to force NETGET to select (at step 1907) a particular user function from which to create an inbound channel wait job, at step 1951. RESRCGET then adds a predefined prefix character to the request in order to mark the request as a resource request, at step 1952. Finally, RESRCGET calls the NETGET function with the above-mentioned variable and the request as arguments, at step 1953. RESRCGET then returns, at step 1954.

Referring back to FIG .23, the user function from which RESRCGET forces NETGET to create the channel wait job at step 1907 is executed at step 1921. This function merely checks whether the requested resource has been found by NETSVR 33: if so, it causes a "pass" status to be returned at step 1922; if not, it causes a "fail" status to be returned.

Figure 25:
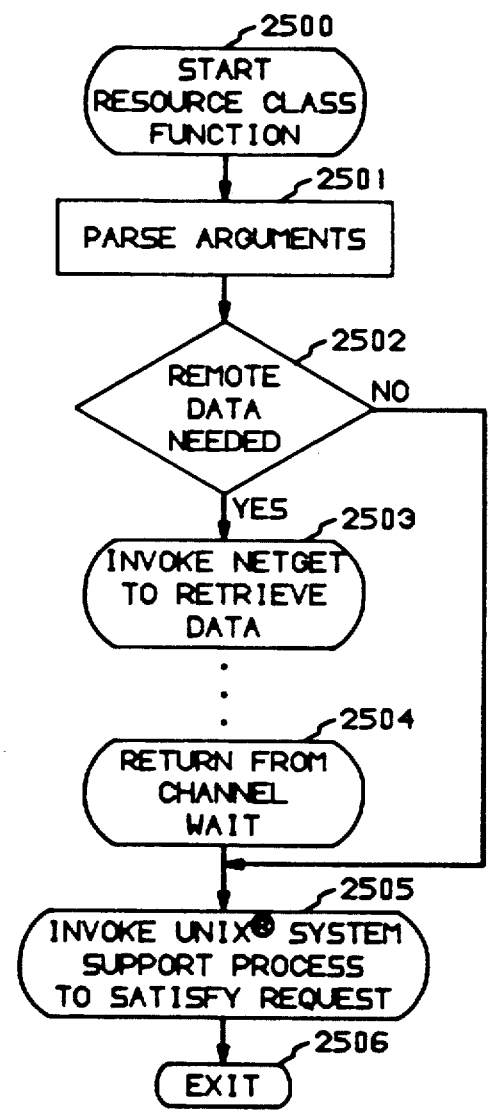
FIG. 25 is a flow diagram of a general resource class function of the user functions of the request server of FIG. 16.

The resources class user function of FIG. 25 is discussed below following discussion of NETSVR 33 of FIGS. 26-31.

Server Processes (FIGS. 26-36)

NETSVR 33 comprises two functional parts: an acceptor which accepts request from NETSVRs 33 on other intermediate computers 11, and a requestor which generates requests to NETSVRs 33 on other intermediate computers 11.

Figure 26:
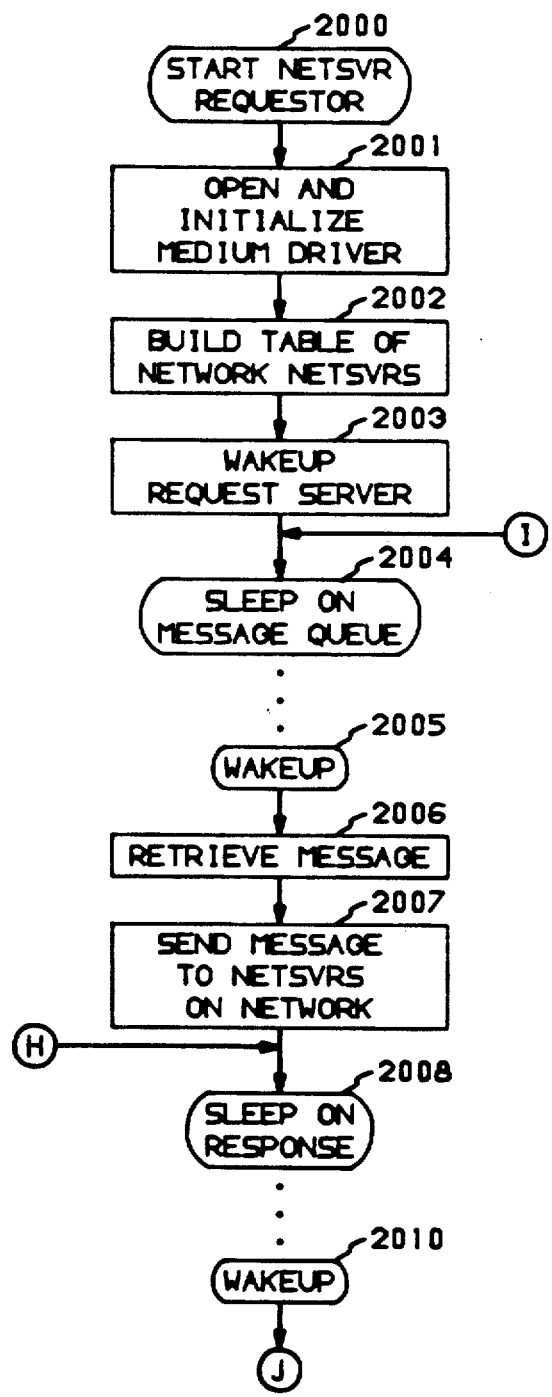
FIGS. 26-27 are a flow diagram of a requestor portion of the NETSVR of FIG. 1.
Figure 27:
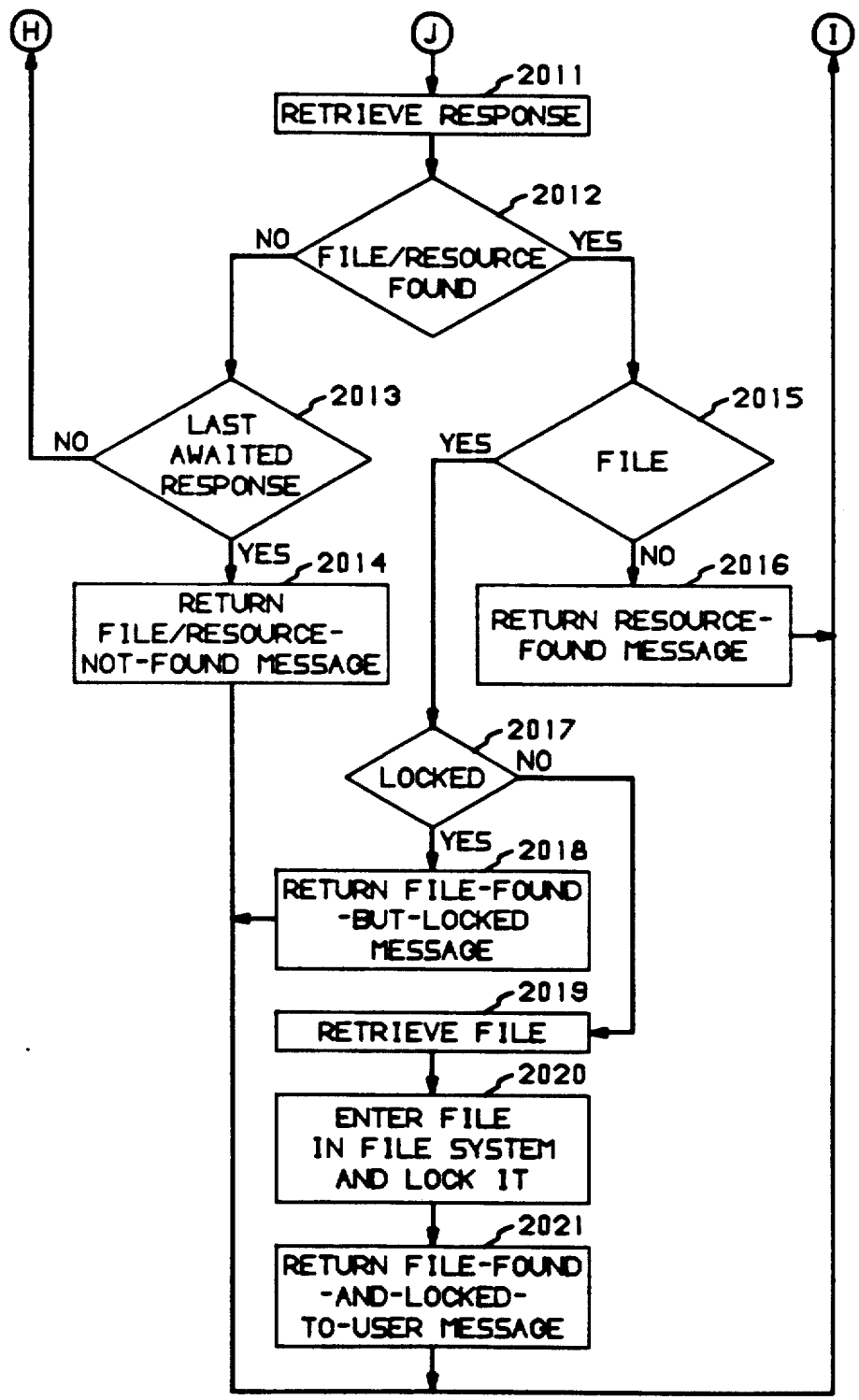
Figure 28:
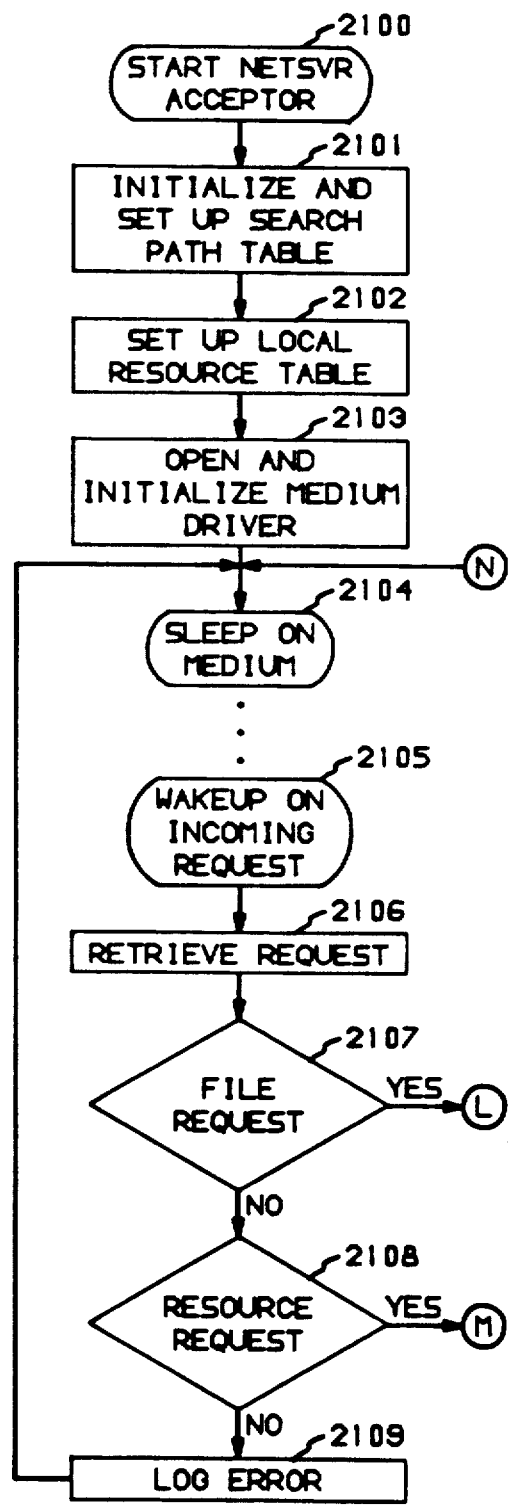
FIGS. 28-31 are a flow diagram of an acceptor portion of the NETSVR of FIG. 1, including an RASSIST process.
Figure 29:
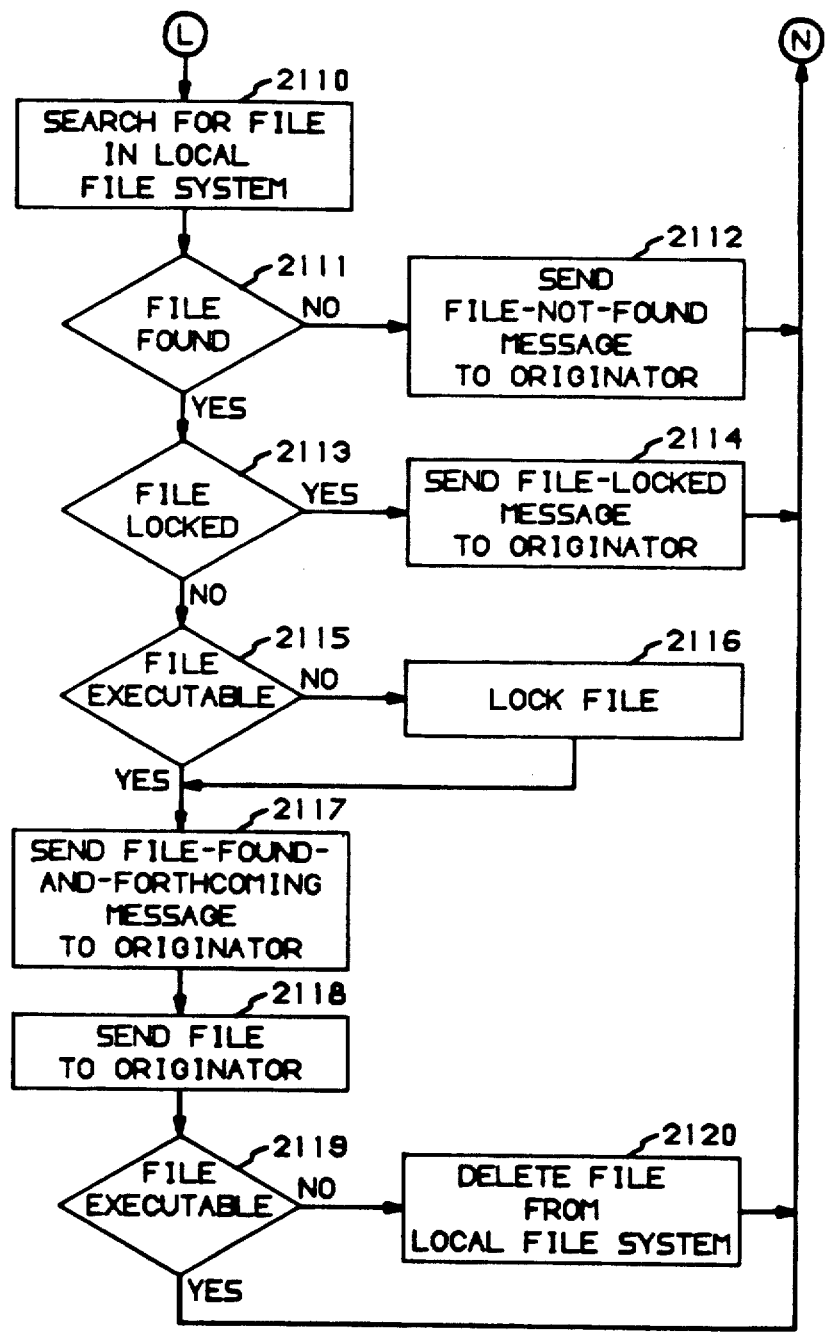
Figure 30:
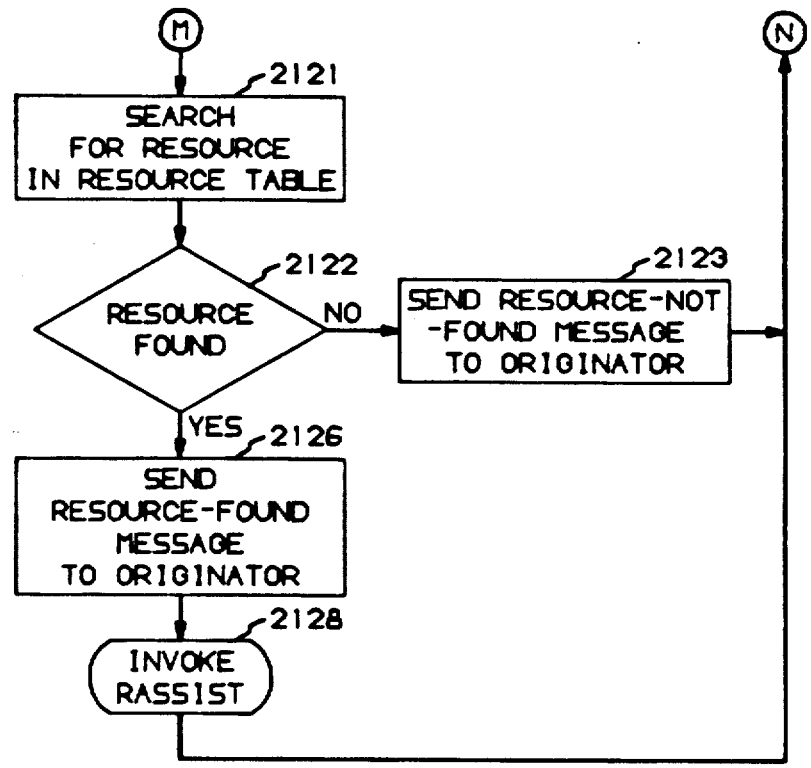
Figure 31:
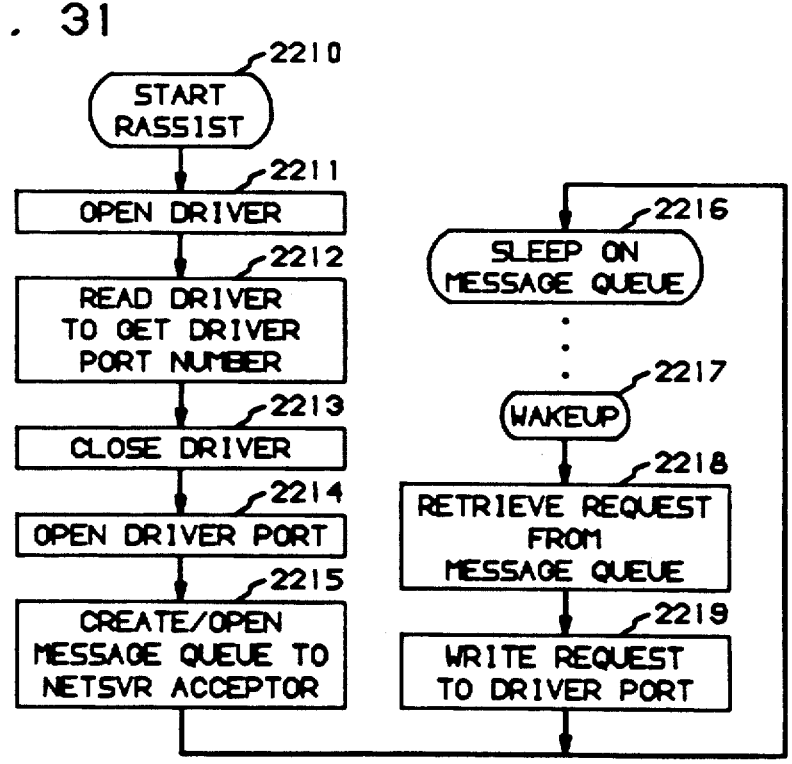

The NETSVR requestor is diagramed in FIGS. 26-27. In response to being started, at step 2000, by the first NETGET all, the requestor opens and initializes a driver of 3BNET medium 14 in operating system 30, at step 2001, in a conventional manner. It then builds for its own use a table listing all NETSVR entities (that is, computers 11 that include a copy of NETSVR 33) connected to medium 14, at step 2002. It obtains this information from a file of operating system 30, in a conventional manner. The requestor then wakes up request server 32, at step 2003, by issuing an IOCTL (Wakeup) call designating status/control port 502 to port 502 of driver 31. The requestor then goes to sleep on the message queue, at step 2004, to await receipt of requests from request server 32.

When the message queue receives a request from request server 32, the requestor is awakened, at step 2005. It retrieves the message from the message queue, at step 2006, and causes it to be sent to all NETSVR entities—including its own—connected to medium 14, at step 2007, through conventional interaction with the driver of medium 14. The requestor then sleeps while awaiting responses to the request, at step 2008.

When a response is received, the requestor is awakened, at step 2010. The requestor retrieves the received response from the driver of medium 14, at step 2011, and checks the response, at step 2012, to determine whether the requested file or resource was found. If it was not found, the requestor checks whether this is the last awaited response, at step 2013, that is, whether responses from all other network NETSVR entities have already been received. If so, the requestor returns a message to request server 32 through the message queue, indicating that the requested file or resource was not found, at step 2014, and then goes back to sleep on the message queue awaiting new requests from the resource server 32, at step 2004. If this is not the last expected response, at step 2013, the requestor merely goes back to sleep to await further responses, at step 2008.

If the response indicates at step 2012 that the file or resource was found, the requestor checks whether the requested item is a file or a resource at step 2015. If it is a resource, the requestor returns, at step 2016, a message to request server 32 stating that the resource was found. The requestor then goes to sleep on message queue at step 2004.

If the requested item is determined at step 2015 to be a file, the requestor checks the response, at step 2017, to determine if it is locked to a user. If so, it returns a message so indicating to request server 32, at step 2018, and then returns to sleep on the message queue, at step 2004.

If the file is not locked to a user, as determined at step 2017, it will have been sent as part of the response and placed by medium 14 in a buffer. The requestor therefore retrieves the film from the buffer, at step 2019, enters it in the file system of the local intermediate computer 11, and locks it to the requesting user, at step 2020. The requestor then returns a message through the message queue to request server 32 that the file has been found and is locked and available to the requesting user, at step 2021. The requestor then again goes to sleep on the message queue, at step 2004.

The NETSVR acceptor is diagramed in FIGS. 28-31. The acceptor is created and started at initialization of intermediate computer 11 on which it resides. In response to being started, at step 2100, the acceptor initializes itself and sets up a local search-path table, at step 2101. The table defines alternative search paths that the acceptor can follow in searching for a file with a given filename. The acceptor obtains this information from a file of operating system 30. The acceptor also sets up a local resource table which specifies locally-available resources, at step 2102. The acceptor also obtains this information from a file of operating system 30. The acceptor then opens and initializes the driver of medium 14 in operating system 30, at step 2103, in a conventional manner. The acceptor then goes to sleep awaiting receipt across medium 14 of requests from NETSVRs 33 of other intermediate computers 11, at step 2104.

When a request is received, the acceptor is awakened, at step 2105. It retrieves the request from a buffer of medium 14, at step 2106, and examines it, at steps 2107 and 2108 to determine if it is a request for a file or for a resource, respectively. The acceptor recognizes resources requests by their identifying prefix character that has been added by the RESRCGET function. If the request is for neither the acceptor logs an error, at step 2109, the goes back to sleep to await a new request, at step 2104. (Because the request is thus aborted, the NETSVR requestor that originated the request will not receive a response thereto. It will timeout under control of operating system 30 and cause a failure return code to be returned to PC 10 that originated the request. This should never happen except under catastrophic system failure.)

If the request is for a file, as determined at step 2107, the acceptor uses the local search path table entries to search for the file in the local file system, at step 2110. If it does not find the file, at step 2111, it sends a negative response message to the request originator, at step 2112 and goes to sleep to await a new request, at step 2104.

If the file is found, at step 2111, the acceptor checks whether it is locked, at step 2113. If so, the acceptor sends a message so indicating to the request originator, at step 2115, and goes to sleep to await a new request, at step 2104.

If the found file is found not to be locked, at step 2113, the acceptor checks, at step 2115, whether the file is executable, that is, whether it is a program file. If not, the acceptor locks the file, at step 2116. After locking the file at step 2116, or if the file is found to be executable at step 2115, the acceptor interacts with medium 14 and sends a positive response message, at step 2117, along with a copy of the file, at step 2118, across medium 14 to the request originator. As suggested at step 2119, if the file is a data file (that is, not an executable file), the acceptor deletes it from the local file system, at step 2120. After the deletion, or if the file is an executable file, the acceptor goes back to sleep to await a new request, a step 2104.

If the request is found at step 2108 to be a request for a resource, the acceptor searches the resource table, at step 2121, to determine, at step 2122, if the resource is locally available. If the resource is not found in the table, the acceptor interacts with the driver of medium 14 to cause a message to that effect to be sent to the network entity that was the source of the request, a step 2123, and then goes to sleep to await a new request, at step 2104. If the resource is found in the table, the acceptor send a "resource found" message to the request originator, at step 2126. The acceptor then calls a function RASSIST to write the request to a numbered port 501 of driver 31, at step 2128. The acceptor then goes back to sleep to await a new request, at step 2104.

As was discussed previously, in the section dealing with patch 21, a process may contain a numbered port 501, open it, and write it, in the manner of a PC 10. The RASSIST function is such a process. It functions as an extension of the NETSVR acceptor process, and is implemented as a separate process merely as a performance enhancement, to keep the acceptor from sleeping on driver 31. RASSIST is diagramed in FIG. 31.

The RASSIST function is started, at step 2210, at initialization of intermediate computer 11 that is resides on. It opens unnumbered port 500 of driver 31, at step 2211, and reads it to obtain therefrom a numbered port 501, at step 2212. RASSIST then closes unnumbered port 500, at step 2213, and opens the assigned numbered port 501, at step 2214. In the conventional UNIX system manner, RASSIST creates and opens a message queue to the NETSVR acceptor, at step 2215. This queue has a fixed identity, so the NETSVR acceptor may assume its existence and hence need not be notified thereof. RASSIST then goes to sleep on the message queue, at step 2216, waiting for input.

When the NETSVR acceptor writes a request into the queue, RASSIST is awakened, at step 2217. It retrieves the request from the message queue, at step 2218, and writes it into the numbered port 501 which it opened at step 22145. RASSIST then returns to sleep on the message queue, at step 2216. The resource request that was written by RASSIST to driver 31 is now treated as a local request at the intermediate computer 11 where the requested resource is located. The request that is written into local driver 31 is the resource class and arguments portion of the original resource request, i.e., it is no longer preceded by the resource request identifier RESRC. Hence, when request server 32 retrieves this request from job queue 1608, it does not invoke the RESRCGET function, but instead invokes the user function which corresponds to the resource class portion of the request.

A typical resource class user function is flowcharted in FIG. 25. Upon being invoked, at step 2500, the user function passes the arguments portion of the request, at step 2501, to determine, at step 2502, whether it requires remotely-available data to satisfy the request (e.g., the request was to print a file which is not locally available). If not, the user function invokes UNIX system support processes, such as the conventional UNIX system driver for that class of resource, to satisfy the request in a conventional UNIX system manner, at step 2505. When the request is satisfied, the function exits, at step 2506.

If remote data is found to be required at step 2502, the user function invokes the NETGET user function of FIG. 23, at step 2503, to initiate a search for, and to obtain, the file containing the required data, in the manner described above. After execution of the NETGET function, when the channel wait job thereof returns to the resource class user function, at step 2504, the user function proceeds to step 2505 to satisfy the request.

Figure 32:
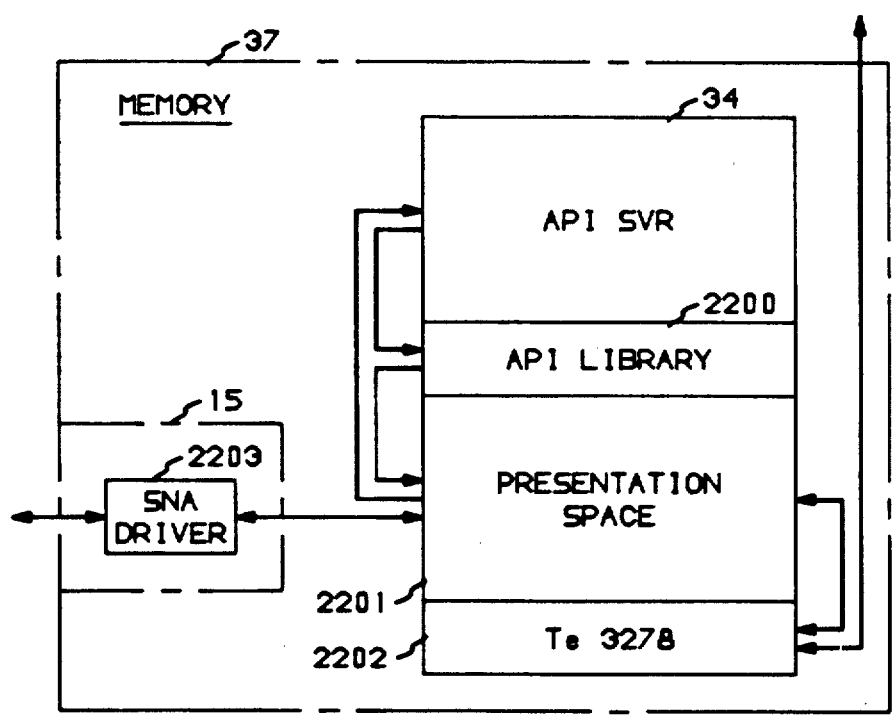
FIG. 32 is a block diagram of an APISVR-related portion of the memory of an intermediate computer of FIG. 1.
Figure 33:
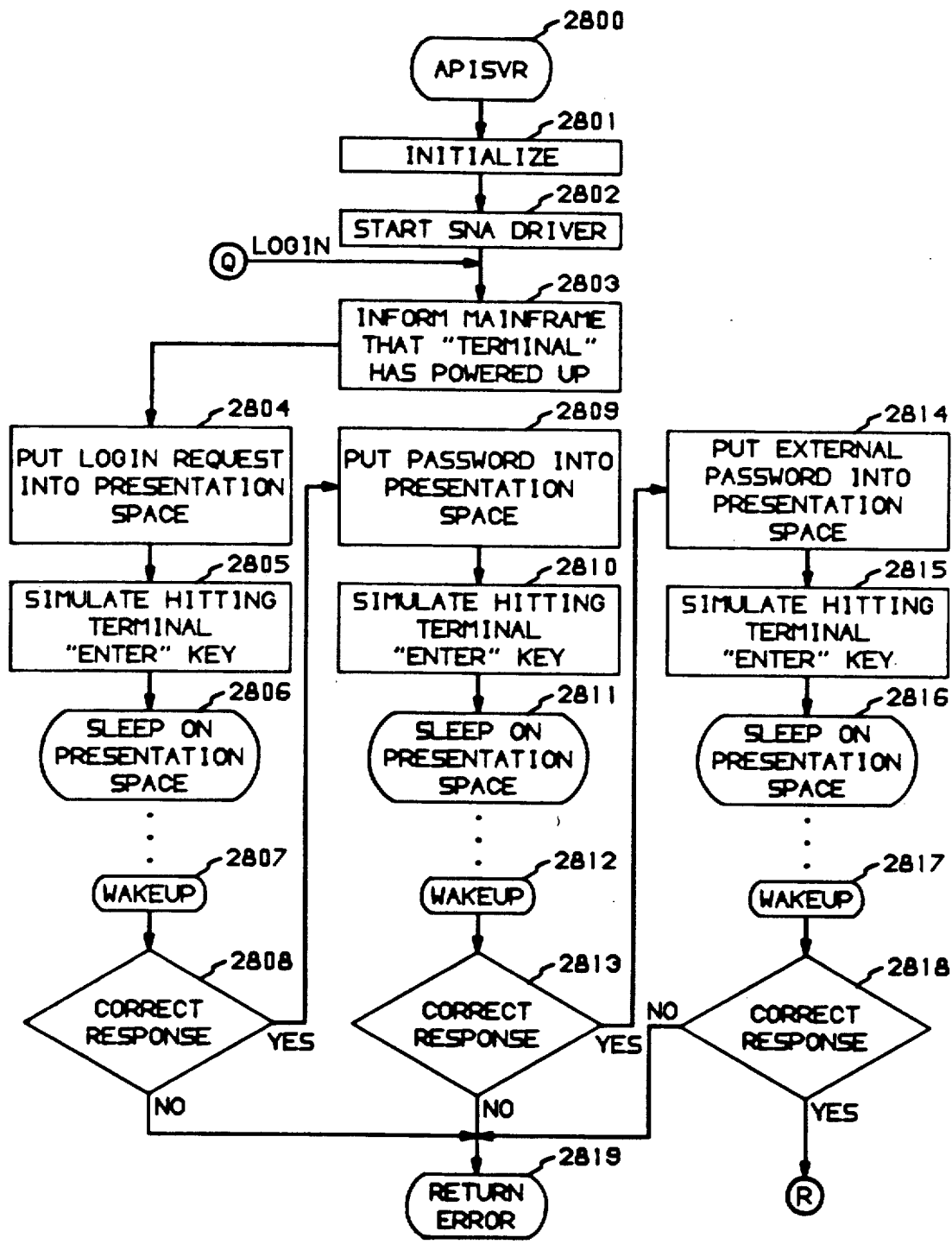
FIGS. 33-36 are a block diagram of the APISVR of FIG. 1.
Figure 34:
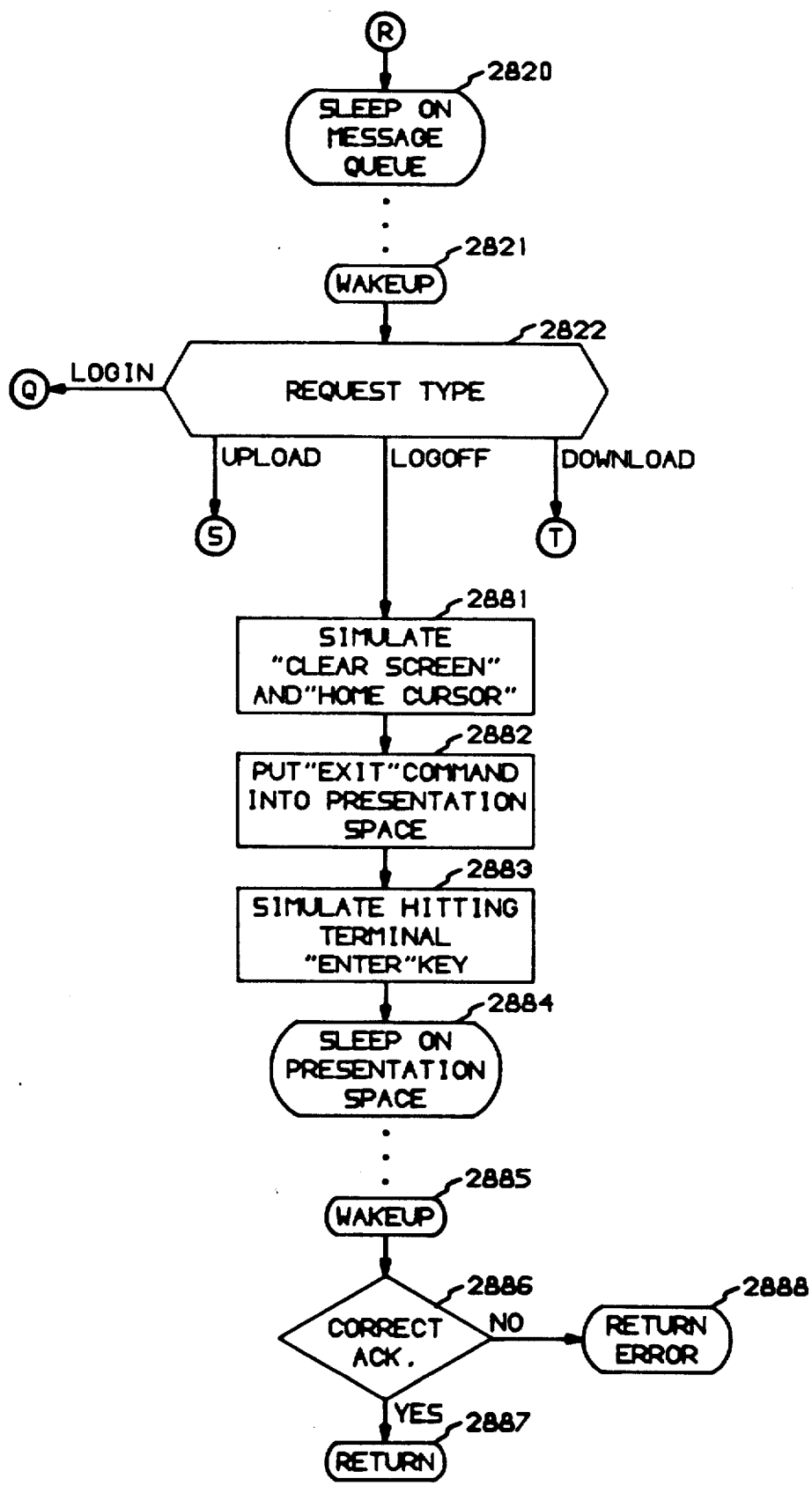
Figure 35:
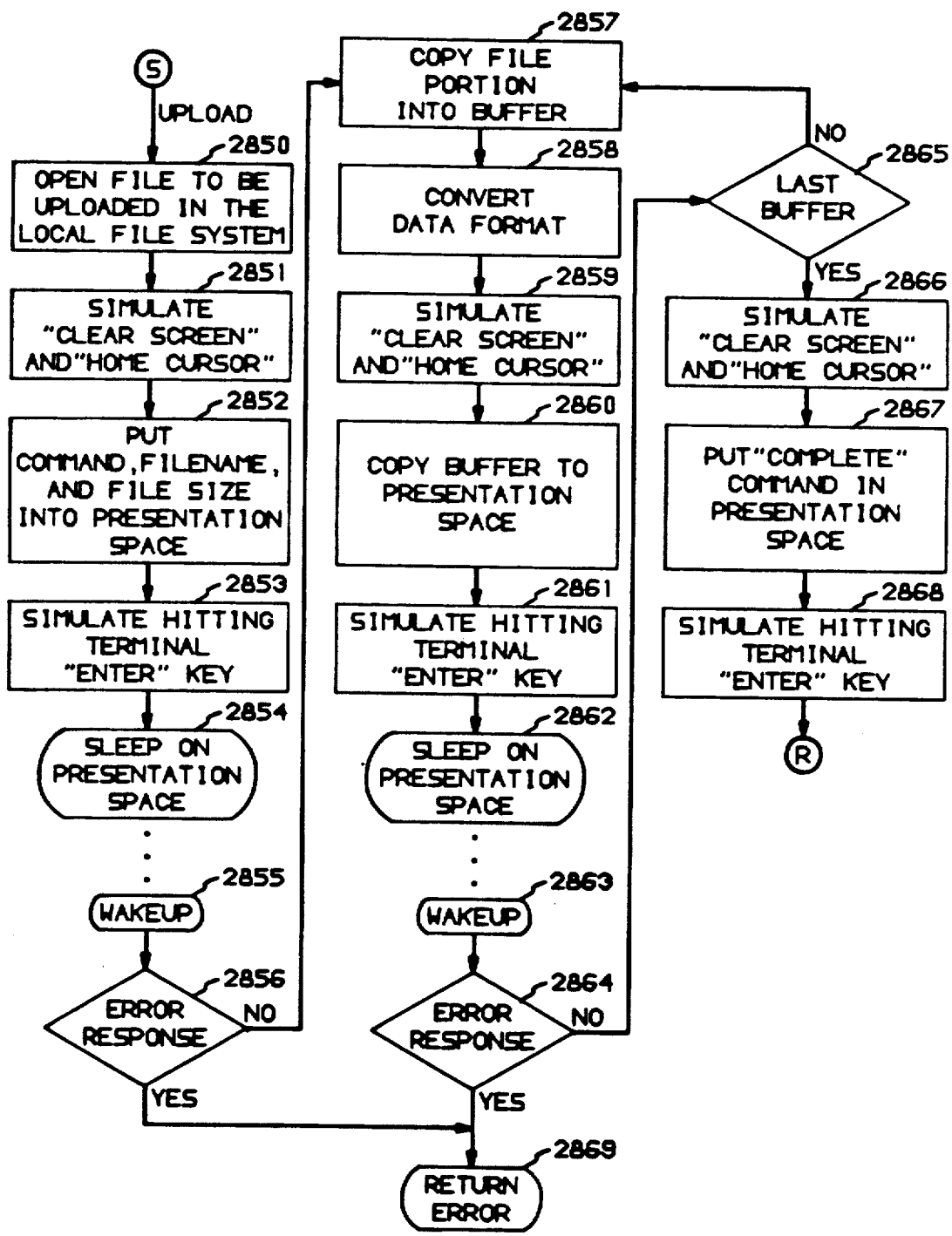
Figure 36:
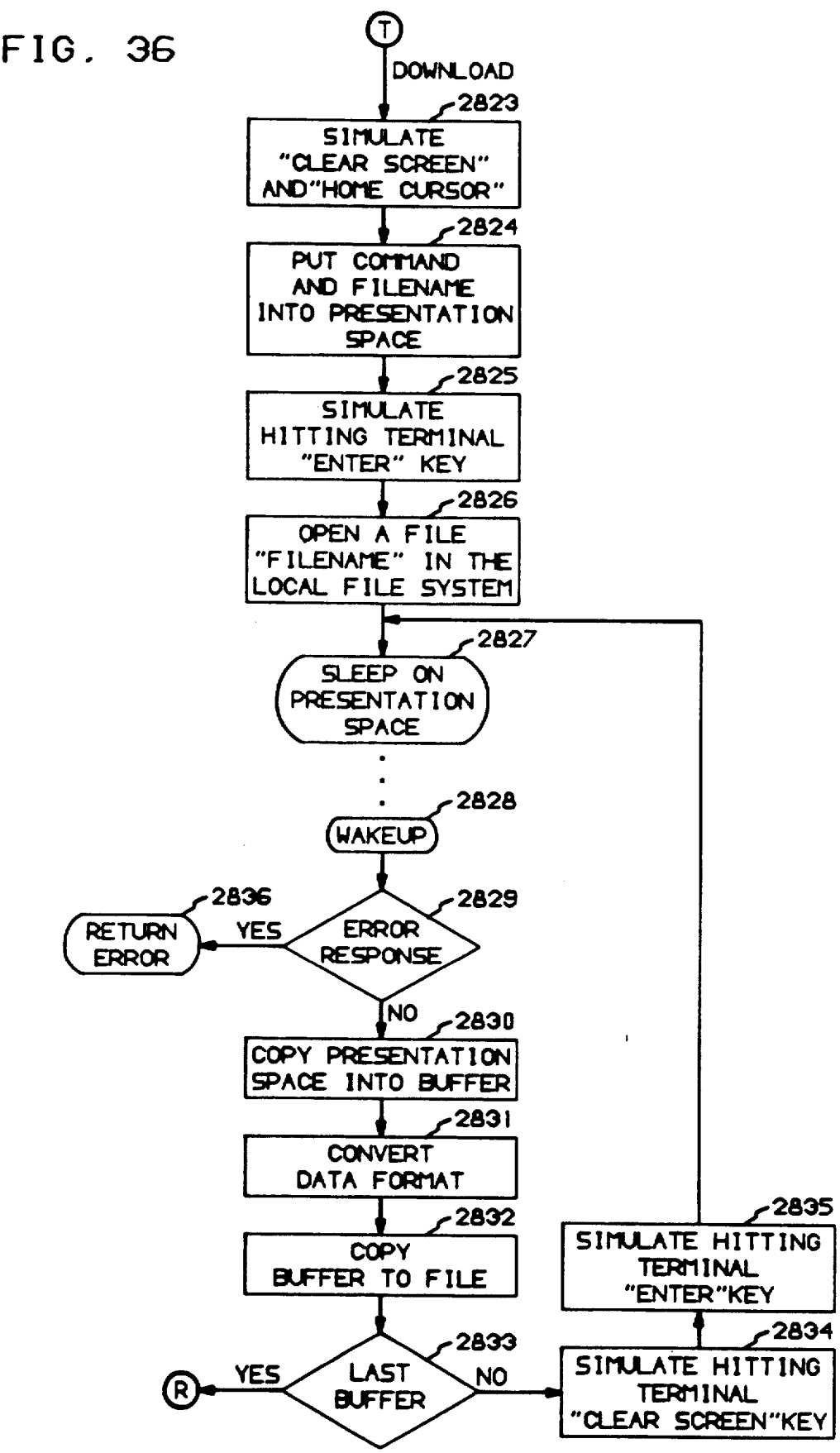

As shown in FIG. 32, APISVR 34 is a user-level process that performs calls into a library 2200 of routines which provide an Applications Program Interface (API) to IBM's SNA I/O system connected to a mainframe computer 12, over an SNA link 15 comprising an SNA driver 2203. APISVR uses space in memory 37 of intermediate computer 11 that is linked at compile time to API library 2200 to serve as presentation space 2201 for SNA driver 2203.

Since, in this illustrative example, intermediate computer 11 is a UNIX system-based machine, a user console (not shown) communicates with SNA driver 2203 through an AT&T Te3278 terminal emulator 2202, which, from the perspective of mainframe computer 12, makes the console appear as a 3278 terminal. Terminal emulator 2202 performs protocol conversion on presentation space 2201 and maps it from SNA input and output format into UNIX system character I/O format.

APISVR 34 is flowcharted in FIGS. 33–36. When APISVR 34 is created, at step 2800, it initializes presentation space 2201 and stores the message queue ID and control channel ID that are passed to it at creation, at step 2801. It then starts running SNA driver 2203, in a conventional manner, at step 2802, and therethrough logs into mainframe computer 12, at steps 2803–2819, using API library 2200 to do so. APISVR 34 then goes to sleep on the message queue of messaging support functions 1600, at step 2820, to await receipt of a request from the invoking user function.

The login procedure is as follows. First, APISVR 34 causes mainframe computer 12 to be informed that a "terminal" has powered up, at step 2803. Then APISVR causes a login request to be placed into presentation space 2201, at step 2804; and causes hitting of a terminal "enter" key to be simulated, at step 2805, to cause mainframe computer 12 to accept contents of presentation space 2201. APISVR 34 then goes to sleep on presentation space 2201, at step 2806.

When computer 12 returns a response in presentation space 2201, APISVR 34 is awakened, at step 2807. It checks the response to determine if it is a correct password prompt, at step 2808. If not, APISVR 34 returns an error to the invoking user function and quits, at step 2819. If the response is correct, APISVR 34 causes a password to be put into presentation space 2201, at step 2809; causes hitting of a terminal "enter" key to be simulated, at step 2810; and then goes to sleep on presentation space 2201, at step 2811.

In response, computer 12 accepts the password from presentation space 2201. When computer 12 returns a response in presentation space 2201, APISVR 34 is awakened, at step 2812. It checks the response to determine if it is a correct external password prompt, at step 2813. If not, APISVR 34 returns an error to the invoking user function and quits, at step 2819. If the response is correct, APISVR 34 causes an external (security) password to be put into presentation space 2201, at step 2814; causes hitting of a terminal "enter" key to be simulated, at step 2815; and goes to sleep on presentation space 2201, at step 2816.

Computer 12 accepts the password and returns a response in presentation space 2201. In response, APISVR 34 is awakened, at step 2817, and it checks the response, at step 2818, to determine if it is a correct prompt from the application that was intended to be activated by the login. If not, APISVR 34 returns an error to the invoking user function and quits, at step 2819; if so, APISVR 34 goes to sleep on the message queue, at step 2820.

When a request (for example, from request server 32) arrives in the message queue, APISVR is awakened, at step 2821. It retrieves the request and examines it to determine what kind of request it is, at step 2822.

If it is a login request, APISVR 34 merely returns to step 2803.

If it is a request to download a named file from database 13 of mainframe computer 12, APISVR uses API library 2200 in a conventional manner to obtain the requested file, at steps 2823-2836.

In response to the download request, APISVR 34 causes "clear screen" and "home cursor" terminal actions to be simulated, at step 2823, to indicate to mainframe computer 12 that it should accept the whole presentation space 2201 and not just particular fields thereof. APISVR 34 then causes a command requesting retrieval of a file, and the filename of the requested file, to be put in presentation space 2201, at step 2824, and causes hitting of a terminal "enter" key to be simulated, at step 2825. APISVR 34 then opens in the local file system a file having a filename of the requested file, at step 2826, and goes to sleep on presentation space 2201, at step 2827.

When computer 12 accepts contents of presentation space 2201 and returns a response thereto, APISVR 34 is awakened, at step 2828. APISVR 34 checks whether the response is an error code of file date, at step 2829. If it is in error code, APISVR 34 returns with an error code to the invoking user function, at step 2836. If the response is file data, APISVR 34 copies contents of presentation space 2201 into a buffer, at step 2830, and converts the data from format used by computer 12 to format used by computer 11, at step 2831. APISVR 34 then copies the converted file data from the buffer into the file that is opened at step 2826, at step 2832.

Part of the information returned by computer 12 with the last file data is an "end of data" command, and APISVR 34 checks the returned information to determine if it includes this command or if there is another buffer full of data to be received, at step 2833. If there is more data to be received, APISVR 34 causes hitting of a terminal "clear screen" key to be simulated, at step 2834, to cause computer 12 to return the next buffer full of file data, and causes hitting of a terminal "enter" key to be simulated, at step 2835. APISVR 34 then returns to step 2827.

The download function is the only APISVR 34 function invokable directly as a consequence of a PC 10 request. However, APISVR 34 provides additional logoff and upload functions, as well as the login and download functions, to processes of intermediate computer 11. In both cases, APISVR 34 uses API library 2200 in a conventional manner to perform these functions.

The upload function, shown at steps 2850-2869, transfers a file from the file system of intermediate computer 11 to database 13 of mainframe computer 12. In response to an upload request, APISVR 34 opens in the local file system the file which is to be uploaded, at step 2850. APISVR 34 then causes "clear screen" and "home cursor" terminal actions to be simulated, at step 2851; causes a command requesting storage of a file, the name of the file, and the size of the file, to be put into presentation space 2201, at step 2852; and causes hitting of a terminal "enter" key to be simulated, at step 2853. APISVR 34 then sleeps on presentation space 2201, at step 2854.

When computer 12 accepts contents of presentation space 2201 and returns a response thereto, APISVR 34 is awakened, at step 2855. APISVR 34 checks the response to determine if it is an error response or a correct prompt for file data, at step 2856. If it is an error response, APISVR 34 returns an error code to the invoking user function, at step 2869. If the response is a correct prompt, APISVR 34 copies into a buffer as much of the file as will fit into presentation space 2201, at step 2857, and converts the data from format used by intermediate computer 11 to format used by mainframe computer 12, at step 2858. APISVR 34 then causes "clear screen" and "home cursor" terminal actions to be simulated, at step 2859; copies the converted file data from the buffer into presentation space 2201, at step 2860; causes hitting of a terminal "enter" key to be simulated, at step 2861; and goes to sleep on presentation space 2201, at step 2862.

When computer 12 accepts the data from presentation space 2201 and returns an acknowledgment, APISVR 34 is awakened, at step 2863. It checks the acknowledgment, at step 2864, to determine if there has been an error. If so, APISVR 34 returns an error code to the invoking user function, at step 2869; if not, APISVR 34 checks whether all file data has been sent to computer 12 or if there is another buffer full of data to be sent, at step 2865. If there is more data to send, APISVR 34 returns to step 2857. If all data has been sent, APISVR 34 causes "clear screen" and "home cursor" terminal actions to be simulated, at step 2866; causes a completion command to be put in presentation space 2201 to inform computer 12 that it has received the whole file, at step 2867; causes hitting of a terminal "enter" key to be simulated, at step 2868; and then returns to step 2820 to await another request.

The logoff function, shown at steps 2881-2888, terminates a session of intermediate computer 11 with mainframe computer 12. In response to a logoff request, APISVR 34 causes "clear screen" and "home cursor" terminal actions to be simulated, at step 2881. APISVR 34 then causes an exit command to be put into presentation space 2201, at step 2882; causes hitting of a terminal "enter" key to be simulated, at step 2883; and goes to sleep on presentation space 2201, at step 2884.

When computer 12 accepts contents of presentation space 2201, it responds thereto with an acknowledgment. This causes APISVR 34 to awaken, at step 2885, and to check the acknowledgment to determine therefrom if computer 12 properly terminated the session, at step 2886. If not, APISVR 34 returns an error code to its invoker, at step 2888. If the session was properly terminated, APISVR 34 returns a success code to its invoker, at step 2887.

APPENDIX

Attached hereto as a microfiche appendix and made part hereof is the C-language source code listing of the various system entities 21 and 31-34 that have been described above.

Of course, it should be understood that various changes and modifications to the illustrative embodiment described above will be apparent to those skilled in the art. Such changes and modifications can be made without departing from the spirit and scope of the invention and without diminishing its attendant advantages. It is therefore intended that all such changes and modifications be covered by the following claims.

What is claimed is:

1. An apparatus comprising:
   a first computer including operating system means responsive to service requests for providing to users services that are accessible to the operating system means;
   a second computer communicatively connected to the first computer;
   at least one third computer communicatively connected to the second computer;
   first means in the first computer for trapping a user's request to the operating system means for a service and notifying the second computer of the request, without intervention of the user, including
   operating system kernel-level process means for trapping the service request, and for causing the operating system means to communicate notice of the trapped service request from the first means to a fourth means of the second computer;
   second means in the second computer responsive to receipt of the request notice for ensuring, in cooperation with the second and third computers, accessibility of the service to the operating system means without intervention of the user, including
   operating system kernel-level driver fourth means for receiving and collecting request notices from the first means and passing received requests to third means,
   application-level process third means for determining which one of the second and the third computers has the requested service and causing the second computer to make the requested service accessible to the operating system means through the second computer from the computer that has the requested service, and for notifying the fourth means of the accessibility,
   the fourth means for receiving from the third means the notices of service accessibility each in response to an associated request and passing the received notices of service accessibility to the first means, to notify the first means of the accessibility;
   the first means responsive to receipt of the notice of accessibility for passing the trapped request to the operating system means, without intervention of the user, and including operating system kernel-level process means for causing the operating system means to communicate notice of the service accessibility from the fourth means to the first means, and for passing the service request to the operating system means to cause the operating system means to satisfy the request; and
   the operating system means responsive to receipt of the passed trapped request for providing the requested service to the user in an identical manner irrespective of whether the requested service has been accessible to the operating system means prior to operation of the second means or has been made accessible to the operating system means by the operation of the second means.

2. The apparatus of claim 1 wherein
   service requests include requests for files; and wherein
   the third means include
   means for determining which one of the second and the third computers the requested file is located on, for transferring the requested file from a third computer to the second computer, if the file is determined to be located on the third computer, and for making the file accessible on the second computer to the operating system means.

3. The apparatus of claim 1 wherein
   service requests include requests for resources; and wherein
   the third means include
   means for determining which one of the second and the third computers the requested resource is located on, for making the resource accessible on the second computer to the operating system means if the resource is determined to be located on the second computer, and for making the resource accessible on the third computer through the second computer to the operating system means if the resource is determined to be located on the third computer.

4. The apparatus of claim 1 wherein
   the second computer includes an operating environment; wherein
   the at least one third computer comprises
   a computer having an operating environment same as the operating environment included in the second computer, and
   a computer having an operating environment different from the operating environment included in the second computer, and wherein
   the third means comprise
   means for determining whether the second computer has the requested service,
   means responsive to a determination that the second computer does not have the requested service, for determining whether the third computer having the operating environment same as the second computer has the requested service, and
   means responsive to a determination that the third computer having the operating environment same as the second computer does not have the requested service, for determining whether the third computer having the operating environment different from the second computer has the requested service.

5. The apparatus of claim 1 further including
   a plurality of the first computers, and
   a plurality of the second computers, communicatively connected to each other and each communicatively connected to a different group of the first computers; wherein
   the first means of each first computer notify only the connected second computer of a trapped user request; and wherein
   the second means of each second computer ensure accessibility of a requested service to the operating system means of the first computers of the group to which that second computer is connected.

6. The apparatus of claim 1 including
   a plurality of the first computers each including operating system means responsive to service requests for providing to users services that are accessible to the operating system means; wherein
   the second computer is communicatively connected to the first computers,
   there are first means in each first computer, each for trapping said user's request and notifying the second computers of the request, and each responsive to receipt of the notice of accessibility for passing the trapped request to the operating system means, and the fourth means are for receiving and collecting request notices from the first means of a plurality of the first computers and passing the received requests to third means, and are further for distributing the received notices of service accessibility each to the first means from which the associated request was received.

7. A method of providing services to user programs on a first computer having an operating system means for providing services that are accessible to the operating system means, in response to service requests, comprising the steps of:

trapping a service request of a user program residing at application level of the first computer, by a first arrangement residing on the first computer at the operating system kernel level of the first computer, transparently to the requesting program;

notifying of the request a second arrangement of a second computer coupled to the first computer, the second arrangement residing at operating system kernel-level of the second computer;

passing the request notice from the second arrangement to a third arrangement of the second computer residing on the second computer at application level of the second computer;

ensuring accessibility of the service to the operating system means by action of the third arrangement, transparently to the requesting program, in response to receipt of the request notice, including the steps of determining accessibility of the requested service on the second computer, determining accessibility of the requested service on a third computer coupled to the second computer, in response to determination of inaccessibility of the service on the second computer, arranging for accessibility of the requested service to the operating system means through the second computer, and notifying the second arrangement by the third arrangement of the accessibility of the requested service;

passing the notice of accessibility from the second arrangement to the first arrangement;

passing the trapped request from the first arrangement to the operating system means without intervention of the user program, in response to receipt of the notice of accessibility; and providing the requested service to the user program by operation of the operating system means, in response to receipt by the operating system means of the passed trapped request, the operating system means providing the requested service to the user program in an identical manner irrespective of whether the requested service has been accessible to the operating system means prior to operation of the third arrangement or has been made accessible to the operating system means by the operation of the third arrangement.

8. The method of claim 7 wherein the step of determining accessibility of the requested service on a third computer comprises the steps of:

determining accessibility of the requested service on a third computer which includes an operating environment same as an operating environment included in the second computer, in response to determination of inaccessibility of the service on the second computer; and determining accessibility of the requested service on a third computer which includes an operating environment different from the operating environment included in the second computer, in response to determination of inaccessibility of the service on the third computer which includes the operating environment same as the operating environment included in the second computer.

9. The method of claim 7 wherein the step of determining accessibility of the requested service on the third computer comprises the steps of:

notifying the first computer of inaccessibility of the service on the second computer, in response to determination of the inaccessibility; and requesting from the first computer the second computer to determine accessibility of the service on the third computer, without intervention of the user, in response to the notice of inaccessibility.

10. A method of providing services to users on a first computer having an operating system means for providing services that are accessible to the operating system means, in response to service requests, comprising the steps of:

trapping on the first computer a user's request to the operating system means for a service, without intervention of the user;

notifying of the request a second computer coupled to the first computer;

in response to the notice, ensuring accessibility of the service to the operating system means by action of the second computer, without intervention of the user, including the steps of determining accessibility of the requested service on the second computer, firstly notifying the first computer of inaccessibility of the requested service on the second computer, in response to determination of the inaccessibility, firstly requesting the second computer from the first computer to determine accessibility of the service on a third computer which includes an operating environment same as an operating environment included in the second computer, without intervention of the user, in response to the first notice of inaccessibility, determining accessibility of the requested service on the third computer coupled to the second computer and which includes the operating environment included in the second computer, in response to the first request, secondly notifying the first computer of inaccessibility of the requested service on the third computer, in response to determination of the inaccessibility, secondly requesting the second computer from the first computer to determine accessibility of the service on a third computer which includes an operating environment different from the operating environment included in the second computer, without intervention of the user, in response to the second notice of inaccessibility, determining accessibility of the requested service on the third computer coupled to the second computer and which includes the operating environment different from the operating environment included in the second computer, in response to the second request, and arranging for accessibility of the requested service to the operating system means through the second computer;

notifying the first computer of the accessibility of the service, in response to determining that the service is accessible on one of the second and the third computers;

passing the trapped request to the operating system means without intervention of the user, in response to the accessibility notice; and providing the requested service to the user by operation of the operating system means, in response to receipt by the operating system means of the passed trapped request, the operating system means providing the requested service to the user in an identical manner irrespective of whether the requested service has been accessible to the operating system means prior to operation of the second computer or has been made accessible to the operating system means by the operation of the second computer.

* * * * *